US009887975B1

(12) United States Patent
Gifford et al.

(10) Patent No.: US 9,887,975 B1
(45) Date of Patent: Feb. 6, 2018

(54) SYSTEMS AND METHODS FOR DELEGATED CRYPTOGRAPHY

(71) Applicant: KryptCo, Inc., Weston, MA (US)

(72) Inventors: David Gifford, Cambridge, MA (US); Kevin Churan King, Cambridge, MA (US); Alex Grinman, Chestnut Hill, MA (US)

(73) Assignee: KryptCo, Inc., Weston, MA (US)

( * ) Notice: Subject to any disclaimer, the term of this patent is extended or adjusted under 35 U.S.C. 154(b) by 0 days.

(21) Appl. No.: 15/668,550

(22) Filed: Aug. 3, 2017

Related U.S. Application Data

(60) Provisional application No. 62/441,088, filed on Dec. 30, 2016, provisional application No. 62/370,613, filed on Aug. 3, 2016.

(51) Int. Cl.
*H04L 29/06* (2006.01)
*H04L 9/08* (2006.01)
*H04L 9/32* (2006.01)

(52) U.S. Cl.
CPC ............ *H04L 63/062* (2013.01); *H04L 9/083* (2013.01); *H04L 9/0877* (2013.01); *H04L 9/088* (2013.01); *H04L 9/3263* (2013.01)

(58) Field of Classification Search
CPC ..... H04L 63/062; H04L 9/083; H04L 9/0877; H04L 9/088; H04L 9/3263
USPC .......................................................... 713/155
See application file for complete search history.

(56) References Cited

U.S. PATENT DOCUMENTS

| | | | |
|---|---|---|---|
| 7,324,976 B2 | 1/2008 | Gupta et al. |
| 7,356,693 B2 | 4/2008 | Kivinen et al. |
| 7,925,878 B2 | 4/2011 | Merrien et al. |
| 8,538,020 B1 | 9/2013 | Miller |
| 8,560,852 B2 | 10/2013 | HongQian et al. |
| 8,763,077 B2 | 6/2014 | Oberheide et al. |
| 8,782,774 B1 | 7/2014 | Pahl et al. |
| 8,874,915 B1 | 10/2014 | Rodoper et al. |
| 9,282,085 B2 | 3/2016 | Oberheide et al. |
| 9,367,697 B1 | 6/2016 | Roth et al. |

(Continued)

FOREIGN PATENT DOCUMENTS

| | | |
|---|---|---|
| WO | WO-2003/049400 | 6/2003 |
| WO | WO-2014/105914 | 7/2014 |

OTHER PUBLICATIONS

"Data Encryption for Enterprises," <https://safenet.gemalto.com/data-encryption/> Aug. 31, 2016 (6 pages).

(Continued)

*Primary Examiner* — Michael S McNally
(74) *Attorney, Agent, or Firm* — Wilmer Cutler Pickering Hale and Dorr LLP

(57) ABSTRACT

In some embodiments, an authentication method comprises receiving a request for a digital signature of data from a delegate computer over a secure channel using cryptography to provide authentication, wherein the secure channel comprises at least one wireless communications link; displaying information derived from the data; prompting a user for approval of the request with information derived from the data; in response to receiving approval from the user, creating the digital signature of the data using one or more private keys stored in a key enclave; and sending the digital signature to the delegate computer over the secure channel.

21 Claims, 34 Drawing Sheets

(56) References Cited

U.S. PATENT DOCUMENTS

| | | | | |
|---|---|---|---|---|
| 9,722,987 | B2 | 8/2017 | Ylonen | |
| 2003/0014629 | A1* | 1/2003 | Zuccherato | H04L 9/3268 713/156 |
| 2004/0128190 | A1* | 7/2004 | Campo | G06Q 50/26 705/12 |
| 2004/0171369 | A1* | 9/2004 | Little | G06Q 10/107 455/410 |
| 2004/0186912 | A1* | 9/2004 | Harlow | G06Q 20/40 709/237 |
| 2004/0205330 | A1* | 10/2004 | Godfrey | G06Q 10/107 713/150 |
| 2005/0021969 | A1 | 1/2005 | Williams et al. | |
| 2005/0144142 | A1* | 6/2005 | Takayama | G06Q 20/04 705/64 |
| 2005/0169476 | A1* | 8/2005 | Little | H04L 51/38 380/255 |
| 2006/0156013 | A1 | 7/2006 | Beeson | |
| 2007/0028094 | A1* | 2/2007 | Sugiyama | H04L 9/08 713/155 |
| 2007/0033643 | A1 | 2/2007 | Rossi et al. | |
| 2009/0097661 | A1 | 4/2009 | Orsini et al. | |
| 2010/0202616 | A1* | 8/2010 | Peirce | H04L 63/0823 380/277 |
| 2012/0265988 | A1 | 10/2012 | Ehrensvard | |
| 2013/0061291 | A1 | 3/2013 | Hegg et al. | |
| 2013/0117554 | A1 | 5/2013 | Ylonen | |
| 2013/0191631 | A1 | 7/2013 | Ylonen et al. | |
| 2014/0143543 | A1 | 5/2014 | Aikas et al. | |
| 2014/0208096 | A1 | 7/2014 | Brandwine et al. | |
| 2014/0229737 | A1 | 8/2014 | Roth et al. | |
| 2014/0230007 | A1 | 8/2014 | Roth et al. | |
| 2014/0232524 | A1* | 8/2014 | Nakai | B60R 25/24 340/5.61 |
| 2014/0297592 | A1 | 10/2014 | Ohtake et al. | |
| 2014/0357187 | A1 | 12/2014 | Ehrensvard | |
| 2015/0013000 | A1 | 1/2015 | Linnakangas et al. | |
| 2015/0030313 | A1 | 1/2015 | Tammisalo et al. | |
| 2015/0188949 | A1 | 7/2015 | Mahaffey et al. | |
| 2015/0244716 | A1 | 8/2015 | Potlapally et al. | |
| 2016/0205169 | A1 | 7/2016 | Koum et al. | |
| 2016/0294562 | A1 | 10/2016 | Oberheide et al. | |

OTHER PUBLICATIONS

"Duo Unix—Two-Factor Authentication for SSH with PAM Support (pam_duo)," <https://duo.com/docs/duounix> Jul. 8, 2016 (13 pages).

"Keybase Key Exchange (KEX) Protocol," <https://keybase.io> Apr. 27, 2017 (5 pages).

"Ledger Wallet Bitcoin & Altcoins," <https://www.ledgerwallet.com> Nov. 21, 2014 (5 pages).

"Make your device smarter and be a part of a larger ecosystem," <https://www.fidesmo.com> Apr. 13, 2013 (2 pages).

"Tap and you're on your way," <https://www.fidesmo.com> Apr. 13, 2013 (2 pages).

"U2F Token for USB," <https://u2fzero.com> Apr. 11, 2017 (2 pages).

"WhatsApp Web," <https://web.whatsapp.com/> Jan. 21, 2015 (1 page).

International Search Report and Written Opinion for PCT Application No. PCT/US17/45344 dated Oct. 13, 2017 (23 pages).

Nitrokey, "Protect emails, files, hard drives, server certificates and online accounts using a physical USB key," <https://www.nitrokey.com/> Jan. 1, 2015 (7 pages).

Pietig, "Functional Specification of the OpenPGP application on ISO Smart Card Operating Systems," 60 pages (Dec. 10, 2014).

Preveil, "Encryption you'll actually use. For email, files, and more," <https://www.preveil.com/> Oct. 5, 2016 (3 pages).

SatoshiLabs, "TREZOR Firmware 1.3.6—GPG Signing, SSH Login Updates and Advanced Transaction Features for Segwit," <http://doc.satoshilabs.com/trezor-user/index.html> Jun. 22, 2016 (1 page).

Spark Innovations Inc., "SC4 HSM: Fully open USB2 hardware-secure module," <https://sc4.us/hsm/> 2015 (2 pages).

Sullivan, "Keyless SSL: The Nitty Gritty Technical Details," 13 pages (Sep. 19, 2014).

Yubico, "YubiKey NEO: NFC Security Key," <https://www.yubico.com/products/yubikey-hardware/yubikey-neo/> Nov. 8, 2012 (7 pages).

* cited by examiner 200
201
202
203
204
205
206
207
SMS Challenge
Email Challenge
Sign SMS confirmation code and email nonce to create proofs
Publish Profile With Email + Phone proofs
Web-of-Trust PKI (WOTPKI)

401
402
403
404
405
Kevin King
Success!
OK
Send
space
return

```
cloud-vm:~ % kr me
Authenticated as Bank Co. <admin@bank.co>
cloud-vm:~ % kr access -i server.log.kr
Access List:
    Bank Co. <admin@bank.co>
cloud-vm:~ % kr decrypt -i server.log.kr | grep 73.238.59.120
73.238.59.120 - - [03/May/2016:22:16:03 +0000] "GET / HTTP/1.1"
73.238.59.120 - - [03/May/2016:22:16:03 +0000] "GET /css/main.css HTTP/1.1"
73.238.59.120 - - [03/May/2016:22:16:03 +0000] "GET /css/font-awesome.min.css HTTP/1.1"
```

1401 → (points to `admin@bank.co` in first block)
1402 → (points to `server.log.kr`)
1403 → (points to `server.log.kr` in decrypt line)

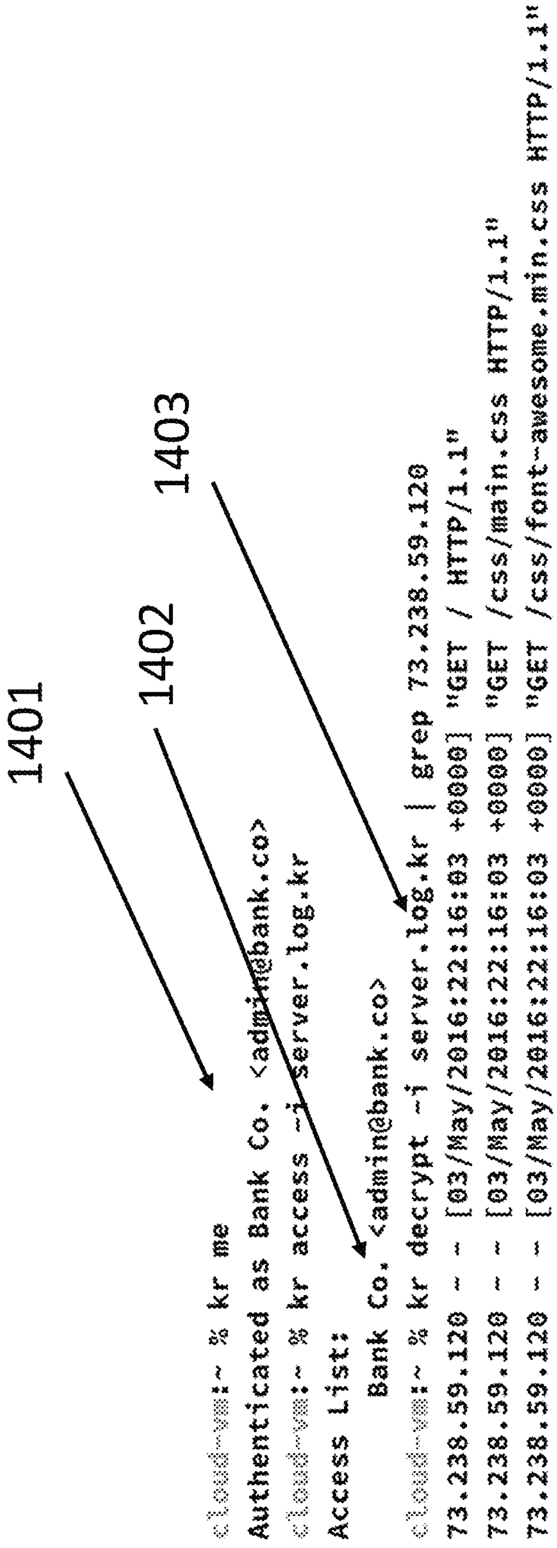

FIG14

Figure 16:
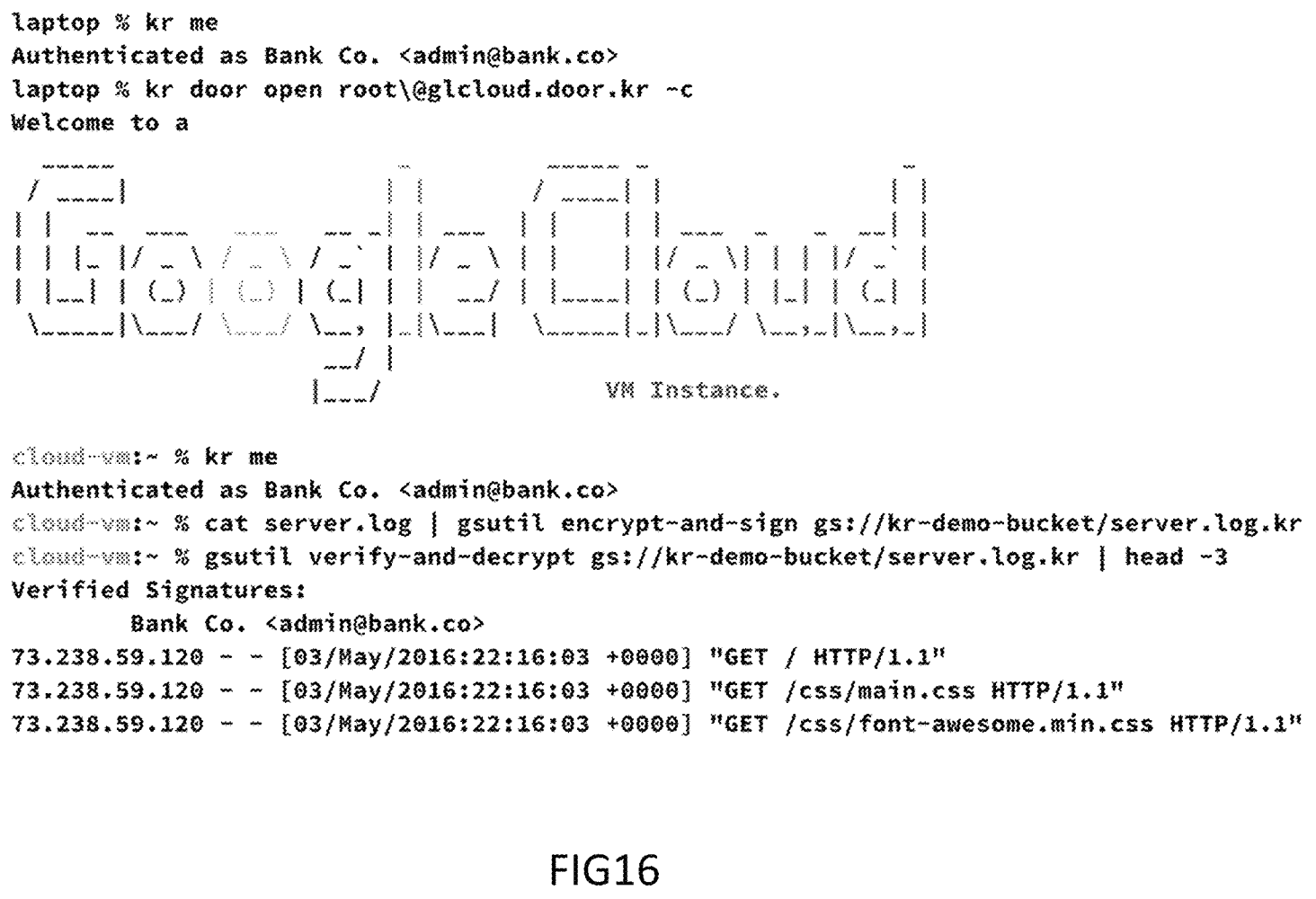

```
laptop % kr me
Authenticated as Bank Co. <admin@bank.co>
laptop % kr door open root\@glcloud.door.kr ~c
Welcome to a

                                         VM Instance.

cloud-vm:~ % kr me
Authenticated as Bank Co. <admin@bank.co>
cloud-vm:~ % cat server.log | gsutil encrypt-and-sign gs://kr-demo-bucket/server.log.kr
cloud-vm:~ % gsutil verify-and-decrypt gs://kr-demo-bucket/server.log.kr | head -3
Verified Signatures:
        Bank Co. <admin@bank.co>
73.238.59.120 - - [03/May/2016:22:16:03 +0000] "GET / HTTP/1.1"
73.238.59.120 - - [03/May/2016:22:16:03 +0000] "GET /css/main.css HTTP/1.1"
73.238.59.120 - - [03/May/2016:22:16:03 +0000] "GET /css/font-awesome.min.css HTTP/1.1"
```

FIG22H
2200B
2209
2208
11:46 AM
92%
Back
Details
ALEX@SLICE
When should Kryptonite ask for your approval?
Unpair
ACCESS LOGS
$ ssh root@alexgr.in exit 69
$ ssh root@alexgr.in exit 22
$ ssh root@alexgr.in exit 61
$ ssh root@alexgr.in exit 62
$ ssh root@alexgr.in exit 81
$ ssh root@alexgr.in exit 7
$ ssh root@alexgr.in exit 92
$ ssh root@alexgr.in exit 13
$ ssh root@alexgr.in exit 31

SYSTEMS AND METHODS FOR DELEGATED CRYPTOGRAPHY

CROSS-REFERENCE TO RELATED APPLICATIONS

The present application claims priority to U.S. Provisional Patent Application No. 62/370,613 filed Aug. 3, 2016 and U.S. Provisional Patent Application No. 62/441,088 filed Dec. 30, 2016, the disclosures of which are incorporated herein in their entirety by reference thereto.

INCORPORATION BY REFERENCE

All reference cited herein are incorporated herein in their entirety by reference thereto.

COMPUTER PROGRAM LISTING APPENDIX

This application contains a Computer Program Listing Appendix, which is hereby incorporated by reference in its entirety.

TECHNICAL FIELD

Disclosed apparatuses, systems, and methods relate generally to cryptographic applications including encryption, digital signing, and key management.

BACKGROUND

A fundamental problem with deploying cryptographic systems is the protection and management of cryptographic keys that are used to encrypt, decrypt, sign, and verify data. Generally cryptographic keys are kept in the same location as where the cryptographic operations are performed. This can mean duplicating keys on many devices, and giving unfettered access to private keys that are essential to the security of the system. Signatures performed using these private keys can prove that a principal possesses access to said private key, thus allowing access to a Protected Resource such as a remote server.

SUMMARY

In some embodiments, an authentication method comprises receiving a request for a digital signature of data from a delegate computer over a secure channel using cryptography to provide authentication, wherein the secure channel comprises at least one wireless communications link; displaying information derived from the data; prompting a user for approval of the request with information derived from the data; in response to receiving approval from the user, creating the digital signature of the data using one or more private keys stored in a key enclave; and sending the digital signature to the delegate computer over the secure channel.

In some embodiments, the authentication method further comprises reading a first key displayed on the delegate computer with a camera, wherein the first key is a public key; sending a second key to the delegate computer; and securing communication with the delegate computer using at least one of the first and second keys or one or more keys derived from the first and second keys.

In some embodiments, the authentication method further comprises receiving during a confirmation stage a message from the delegate computer secured using at least one of the first and second keys or one or more keys derived from the first and second keys; and confirming the secure channel in response to receiving the message from the delegate computer.

In some embodiments, the authentication method further comprises displaying a first key, wherein the first key is a public key; receiving a second key from the delegate computer; and securing communication with the delegate computer using at least one of the first and second keys or one or more keys derived from the first and second keys.

In some embodiments, the authentication method further comprises sending during a confirmation stage a message to the delegate computer secured using at least one of the first and second keys or one or more keys derived from the first and second keys.

In some embodiments, the data is SSH session data. In some embodiments, the receiving a request for the digital signature of data from the delegate computer comprises receiving from the delegate computer a signature request that contains a host signature of an SSH session identifier; and the sending the digital signature to the delegate computer comprises sending the digital signature to the delegate computer in response to successfully verifying the host signature; and the method further comprises verifying that the host signature is a signature of the SSH session identifier, wherein the verifying comprises using at least one public key in a list of known host keys stored on at least one of the key enclave or a computer distinct from the key enclave and the delegate computer.

In some embodiments, the one or more approved signature requests are recorded in a log. In some embodiments, the one or more approved signature requests are recorded in a log stored on the key enclave. In some embodiments, the one or more approved signature requests are recorded in a log stored on a computer distinct from the key enclave and the delegate computer. In some embodiments, the data is a Git commit object. In some embodiments, the data is a Git tag object.

In some embodiments, the authentication method further comprises computing a hash of the data; and computing the digital signature using the hash. In some embodiments, the authentication method further comprises receiving during a specified time interval a request for a second digital signature of second data from the delegate computer over the secure channel; and sending the second digital signature to the delegate computer over the secure channel without requiring approval from the user. In some embodiments, the authentication method further comprises connecting to the delegate computer using a routing service.

In some embodiments, a verification method comprises receiving a request from a delegate computer for verification of a digital signature over a secure channel using cryptography to provide authentication, wherein the secure channel comprises at least one wireless communications link; and verifying the digital signature using at least one of one or more public keys stored in a key enclave or data derived from the one or more public keys stored in the key enclave.

In some embodiments, the verification method further comprises sending the delegate computer a response to the request for verification of the digital signature, wherein the one or more public keys are stored with an associated level of trust and the response comprises the level of trust. In some embodiments, the verification method further comprises reading a first key displayed on the delegate computer with a camera, wherein the first key is a public key; sending a second key to the delegate computer; and securing communication with the delegate computer using at least one of the first and second keys or one or more keys derived from the first and second keys.

In some embodiments, the verification method further comprises receiving during a confirmation stage a message from the delegate computer secured using at least one of the first and second keys or one or more keys derived from the first and second keys; and confirming the secure channel in response to receiving the message from the delegate computer. In some embodiments, the verification method further comprises connecting to the delegate computer using a routing service.

In some embodiments, a verification method comprises receiving a request from a delegate computer for at least one of one or more public keys or data derived from the one or more public keys over a secure channel using cryptography to provide authentication, wherein the secure channel comprises at least one wireless communications link and the one or more public keys are stored in a key enclave; and sending at least one of one or more public keys or data derived from the one or more public keys to the delegate computer.

In some embodiments, the one or more public keys are stored with an associated level of trust; and sending the at least one of one or more public keys or data derived from the one or more public keys to the delegate computer comprises sending the level of trust. In some embodiments, a verification method further comprises connecting to the delegate computer using a routing service.

These and other aspects and embodiments of the disclosure are illustrated and described below.

BRIEF DESCRIPTION OF THE DRAWINGS

Exemplary embodiments are described with reference to the following figures, which are presented for the purpose of illustration only and are not intended to be limiting.

FIG. 14 shows an embodiment where kr commands show the currently delegated identity, an access control list on a file, and the filtered decryption of a file according to an exemplary embodiment.

FIG. 16 shows kr functionality and delegated identities accessed using third-party cloud command line tools according to an exemplary embodiment.

DETAILED DESCRIPTION

Figures 1A, 1B, 1C:
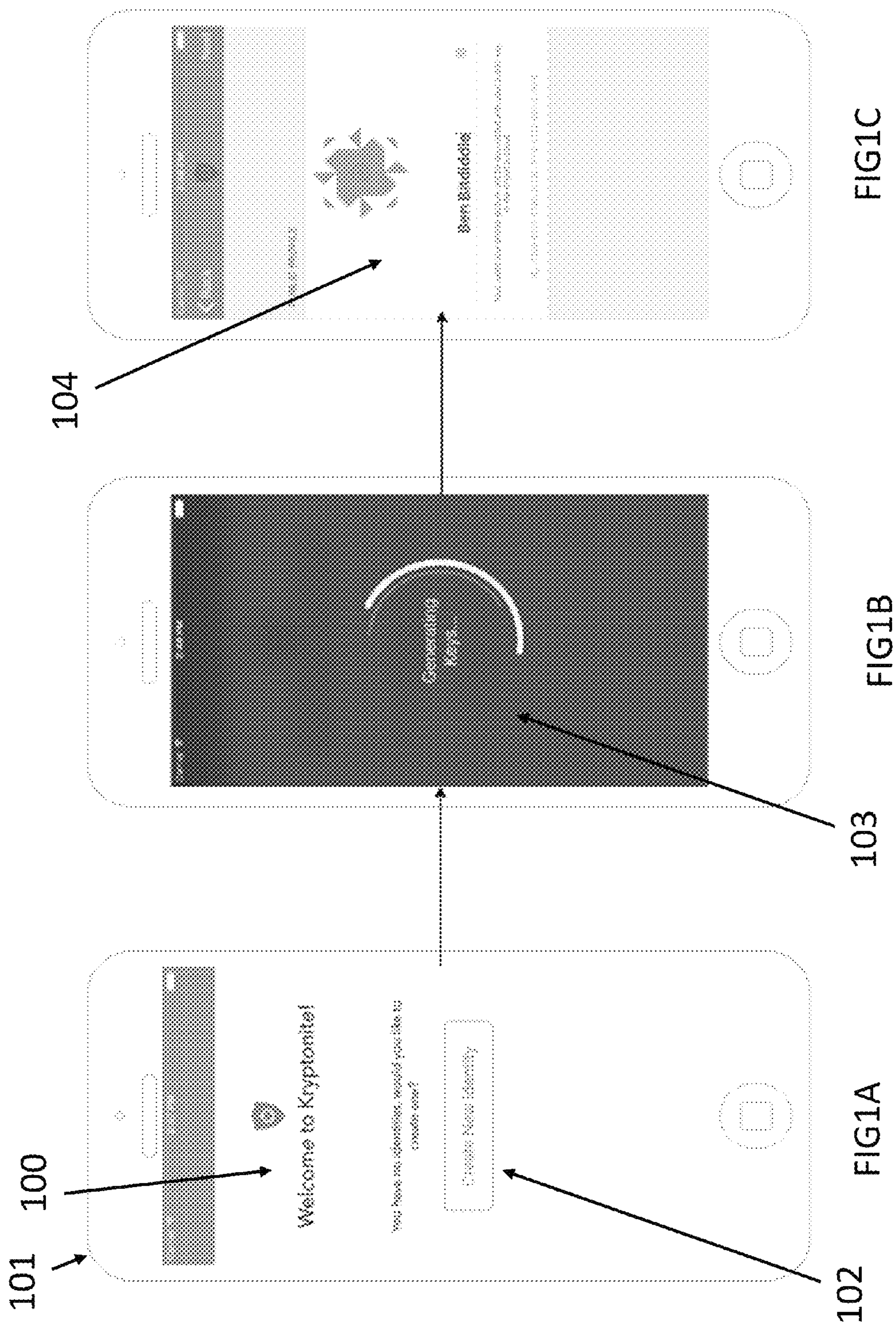
FIGS. 1A through 1C show a process of generating and storing an asymmetric identity key pair according to an exemplary embodiment.

In some embodiments, systems and methods disclosed herein can provide a way to store cryptographic keys and identities in an isolated environment, while providing a device-agnostic delegation framework for giving access to only the outputs of cryptographic operations. In some embodiments, a principal's device can gain verifiable knowledge about the relationship between a real-world entity and its cryptographic identity. In some embodiments, a principal's device can delegate access to its identity to another device. In some embodiments, a set of services enables communication between principals' devices where the services are not trusted; all communication can be private and authenticated independently by the principals' devices. In some embodiments, systems and methods described herein can be applied to enterprise and consumer applications.

In some embodiments, systems and methods disclosed herein can be implemented in software using a memory. The software can run on a processor capable of executing computer instructions or computer code such as the exemplary source code included in the Computer Program Listing Appendix. The processor can be implemented in hardware using an application specific integrated circuit (ASIC), programmable logic array (PLA), digital signal processor (DSP), field programmable gate array (FPGA), or any other integrated circuit. Processors suitable for the execution of a computer program include, by way of example, both general and special purpose microprocessors, digital signal processors, and any one or more processors of any kind of digital computer. Generally, processors receive instructions and data from a read-only memory or a random access memory or both.

In some embodiments, disclosed method steps can be performed by one or more processors executing a computer program to perform functions by operating on input data and/or generating output data. One or more of the modules can be implemented in hardware using an ASIC (application-specific integrated circuit), PLA (programmable logic array), DSP (digital signal processor), FPGA (field programmable gate array), or other integrated circuit. In some embodiments, two or more modules can be implemented on the same integrated circuit, such as ASIC, PLA, DSP, or FPGA, thereby forming a system on chip. Subroutines can refer to portions of the computer program and/or the processor/special circuitry that implement one or more functions.

In some embodiments, modules can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

In some embodiments, a computing device can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

In some embodiments, a computing device can include user equipment such as a mobile device. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

In some embodiments, a computing device can include a server. The server can operate using an operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

Background on the Secure Shell protocol (SSH) for accessing remote hosts can be found in Network Working Group Request for Comments 4254, Internet Engineering Task Force, January 2006 at www.ietf.org as well as the OpenSSH manual, found at https://www.openssh.com/manual.html. Additional background regarding user authentication in SSH can be found in Network Working Group Request for Comments 4252, Internet Engineering Task Force, January 2006 at www.ietf.org.

Background on the Pretty Good Privacy (OpenPGP) message format for signing, encrypting, decrypting, authenticating texts, email, documents, and/or binary data can be found in Network Working Group Request for Comments 4880, Internet Engineering Task Force, January 2006 at https://tools.ietf.org/html/rfc4880.

Background on the signing of git commits and git tags can be found at https://github.com/git/git/blob/master/Documentation/technical/signature-format.txt (hereinafter "GitSignatures").

These and other embodiments are described in further detail below.

Exemplary Explanations of Terms

The following introduces exemplary explanations of terms, according to one or more embodiments, as generally used herein. These explanations are not intended to be limiting.

Key Enclave. In some embodiments, a key enclave is a trusted computing base that is responsible for managing one or more asymmetric private keys, public keys corresponding to the identity of other principals, and symmetric keys. In some embodiments, the private key does not leave the key enclave. The private key can be generated inside a key enclave or imported. In some embodiments, the key enclave runs in an isolated environment on devices such as: mobile phones, enterprise servers, cloud servers, desktops, laptops, and other workstations. The key enclave can delegate private key operations to outside authorized parties. In some embodiments, the computation takes place inside the key enclave, where only the result of the computation is released from the enclave.

Delegate. In some embodiments, a delegate is any machine (e.g., workstation, mobile, cloud server, virtual machine, etc. . . . ) that a Key Enclave could delegate its identity to.

Principal. In some embodiments, a principal is a party that has an identity corresponding to one or more public keys. A principal can, for example, be an end-user, like a person, or an organization like a company.

Signature. In some embodiments, a signature refers to a cryptographic signature. Two popular schemes are, for example, the RSA PKCS#1v15 and ECDSA signature schemes.

Protected Object. In some embodiments, a protected object is an arbitrary sequence of data bytes that is encrypted with a randomly generated nonce symmetric key. Protected objects can have Access Control Lists attached to them that determine which Principals can decrypt the object.

Protected Resource. In some embodiments, a protected resource is a computational facility with controlled access that can only be accessed by Principals that possess specific private keys. Examples of protected resources include the ability to log into and execute commands at remote SSH hosts. Protected Resources can have Access Control Lists attached to them that determine which Principals can access the resource.

Level of trust or trust status. In some embodiments, a level of trust is associated with a public key, message, or data. A level of trust may indicate to a user or Key Enclave how likely a message or data is to be authentic. A level of trust may indicate what measures have been taken and verified in order to ascertain whether a cryptographic identity such as a public key is associated with a real-world identity such as an email, phone number, or name. Levels of trust may be used as part of verification of signed messages or data, for example a Key Enclave may trust signed messages from a public key with a verified email level of trust that matches the email in the from field of the message. The Key Enclave may store levels of trust so that a compromise of a delegate will not necessarily result in modifications of levels of trust. A level of trust may be referred to as a trust status.

For background on cryptographic techniques, see, e.g., David K. Gifford, *Cryptographic Sealing for Information Secrecy and Authentication*, Communications of the ACM, Vol. 25, No. 4, April 1982, incorporated by reference herein. In some embodiments, the systems and methods described herein can utilize cryptographic techniques such as those described in this paper.

A Key Enclave Safeguards Identity

In some embodiments, a mobile phone Key Enclave allows users to bring their identity wherever they go. In some embodiments, the identity's asymmetric key pair is generated using the phone's crypto co-processor (e.g., a general or special purpose CPU and memory for performing cryptographic operations) and stored in the phone's secure storage. In some embodiments, the private key of the identity is not communicated outside of the device. Upon generating a profile, the profile is, for example, published to the Web-of-Trust PKI (WOTPKI), allowing other users' devices to find it.

FIG. 1A through 1C illustrate a process of generating and storing an asymmetric identity key pair according to some embodiments. As illustrated in FIG. 1A, in some embodiments, a mobile app 100 on mobile device 101 prompts a user to create an identity. The user can create an identity by selecting the "create identity" button 102 on the app 100 interface. The app 100 can then display a message 103 (e.g., "Generating Keys") to notify the user that it is generating and storing an asymmetric identity key pair as illustrated in FIG. 1B. Finally, as illustrated in FIG. 1C, after generating and storing an asymmetric identity key pair, the app 100 can provide an interface 104 for the user to create a public profile.

In some embodiments, each principal has access to one or more key enclaves. Their key enclave can run on their mobile phone, a cloud virtual machine, or any other computer. Each principal's device generates or imports a public/private key pair inside their key enclave. Next the principal creates a profile object containing one or more of the following items of information:

X.509 Certificate
Name
Public Key
SHA-256 Hash of Phone Number
SHA-256 Hash of Email Address
Profile Image URL
SHA-256 Hash of Profile Image
Current Time
Digital Signature of any or all of the above with the private key In some embodiments, the profile object above is publicly published to the Web-of-Trust PKI Service.

In some embodiments, this profile along with the public key are also stored locally in the key enclave. The private key is stored securely in the key database in the key enclave. In some embodiments, there is no function to export the private key from the key database. In some embodiments, special hardware or software is used to prevent or detect the extraction of private keys even with physical access to the Key Enclave.

In some embodiments, an organization may have a pre-existing PKI. A principal from the organization's PKI may be imported into a Key Enclave (along with the principal's private key). Trust relationships in the organization's PKI (e.g., X.509 certificate signatures) may be imported into the WOTPKI and used by Key Enclaves as X.509 Certificate Signature witness statements.

Figures 2A, 2B, 2C, 2D, 2E:
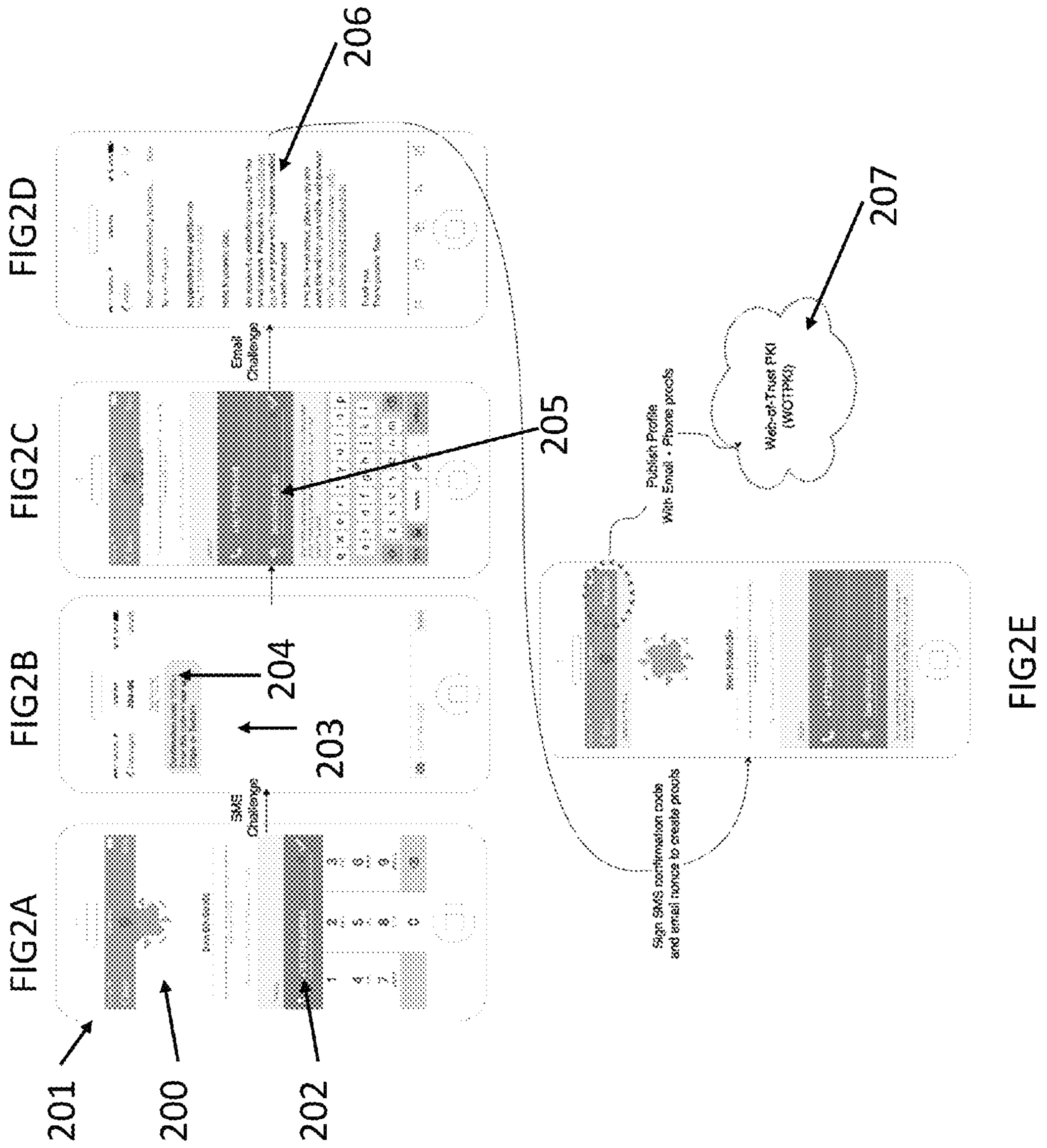
FIGS. 2A through 2E show a process for setting up a mobile app according to some embodiments where the user's device can complete phone and email proofs of ownership according to an exemplary embodiment.

FIG. 2A through 2E illustrate a process for setting up a mobile app 200 on a user's mobile device 201 according to some embodiments where the user's device can complete phone and email proofs of ownership. For example, as illustrated in FIG. 2A, the app 200 can prompt the user to enter a phone number 202. The app 200 can then send a message 203 (e.g., via SMS) to the user's device 201 with a confirmation code 204, which the user's device 201 uses to verify the phone number 202. The app 200 can additionally prompt the user to enter an email address 205 (FIG. 2C) and provide a verification link 206 via email (FIG. 2D), which the user's device 201 can use to verify his or her email address. Once the user's device 201 has signed the SMS confirmation code and email nonce to create proofs (FIG. 2E), the user's device can publish his or her profile with email and phone proofs to the Web-of-Trust PKI 207.

In some embodiments, systems and methods described herein support principal identities for people and/or for groups of people. A Group principal identity can represent anything from an organization like a corporation or just a set of other principals, for example. As referenced above, Witness statements in WOTPKI as described below can offer proofs of membership in groups.

In some embodiments, Groups have dedicated Key Enclaves which maintain the Group principal's identity (public/private keypair). Typically, a set of group members, denoted for example as "admins", can access the Group Key Enclave and request signatures using the Group Key Enclave's private key. These admins can add/remove principals as members of the organization by publishing witness/revocation statements that are signed by the Group private key.

In some embodiments, Group principals can endorse a message created by a group member principal by appending a signature to the message signed by the Group's private key. A group principal's Key Enclave may implement features that automatically facilitate endorsements.

In some embodiments, an Enterprise Server Key Enclave generates and stores identities in the same manner as a Mobile Phone Key Enclave. In some embodiments, an Enterprise Server can be more suitable when the identity must be used very frequently with high availability or if the identity represents a group or organization as opposed to an individual. While an enterprise enclave can perform the same identity operations as a mobile phone enclave, in some embodiments, some use cases are better suited to an enterprise server deployment.

In some embodiments, delegation of an Enterprise Key Enclave is accomplished using full role-based DNS names (discussed in "Key Enclave Self-Configuration"). Each DNS name serves as a unique identifier for that microservice, its general role in the organization, and a reliable way to contact it (in combination with the ERS DNS service).

In some embodiments, once a Key Enclave has been provisioned, it authenticates the services that will be using the enclave to perform cryptographic operations. For example, in some embodiments, X.509 certificates and the TLS protocol are applied to establish authentication and secure channels between enclaves and peripheral services (delegates) owned by the same organization. We refer to a general machine (e.g., Key Enclave or delegate) as a microservice.

In some embodiments, before provisioning any microservices, the organization first creates a certificate authority which will be used to create the client certificates for each microservice. In some embodiments, the administrative certificate authority is kept in a secure location only accessible by system administrators. In some embodiments, each microservice will only trust client certificates that are issued by this overarching administrative certificate authority. In some embodiments, microservices also have one or more roles associated with their certificate. In some embodiments, each role is encoded in a DNS Subject Alternative Name (SAN) in the X.509 certificate such as in the following way: <public key hash in lowercased base62>.<role name>.dns.krypt.co In some embodiments, each microservice will parse the DNS SANs of other services to identity which roles they have and to decide whether to allow the connection. In some embodiments, once a TLS handshake has been completed and each microservice has verified the other's role, an authenticated and secure connection has been established and can be used in a similar way as the delegated secure sessions.

In some embodiments, the routing service (e.g., Enclave Router Service (ERS)) is a system for discovering Key Enclaves and delegates that are advertising themselves on the internet. In some embodiments, the ERS service can, for example, be used to enable the "self-configuration" aspect of Key Enclaves. In some embodiments, the routing service automatically connects key enclaves with delegates without explicit pairing.

In some embodiments, ERS operates in a semi-trusted model. For example, in some embodiments, ERS is not trusted to maintain any private information about {e.g., Enclave, Edge} servers, however, some or all information sent to ERS is on behalf of an organizational Certificate Authority (CA). In some embodiments, each {e.g., Enclave, Edge} server presents an x509 Certificate, signed by an organizational CA registered with ERS.

In some embodiments, the ERS comprises systems and methods comprising and/or performing one or more of the following. In some embodiments, the ERS comprises a database server maintaining records of type (e.g., Ping, Organization) for a data object. In some embodiments, "Ping" comprises one or more of the following fields: "Name"—the name of the {e.g., Enclave, Edge} server, "Organization Fingerprint"—the hash of the organization's public key, "Hostname"—a static URL that the server can be reached on using the ERS DNS server, and/or "Ephemeral URL"—the current, possibly temporary, IP address of the server. In some embodiments, "Organization" comprises one or more of the following fields: "Name"—the common name of the organization and/or "Certificate"—the public key certificate the organizational root CA. In some embodiments, the ERS comprises an API to publish, query "Ping" objects, and to "register" organizations. In some embodiments, there exists an API method to publish "Ping" objects. In some embodiments, the incoming Ping from an {e.g., Enclave, Edge} server declares its ephemeral URL and name in the body of the Ping. In some embodiments, the incoming request is Two-way TLS, and the requester presents a client certificate where the client certificate is signed by a valid, registered organization CA. In some embodiments, the organization fingerprint is computed by selecting the public key of the corresponding registered organization CA. In some embodiments, there exists an API method to register an organization with a valid CA certificate presented in a Two-way TLS connection. In some embodiments, the ERS comprises a DNS server maintaining the mapping of ERS DNS names to ephemeral {e.g., Enclave, Edge} IP addresses. In some embodiments, the ERS comprises the ERS DNS name can be of the following exemplary format: "<public key hash in lowercased base62>.<role name>.dns.krypt.co" where the first part is the public key hash of the x509 certificate of this server, the second part is the is the server type {Enclave, Edge, etc.}, and the remaining parts constitute the hostname of the DNS server.

In some embodiments, Key Enclave and delegates that have been provisioned with identities use the routing service (e.g., Enclave Router Service) to discover other services within the same organization. In some embodiments, discovered services are contacted, for example, using the ERS DNS mapping. Trust policies can be configured to automatically accept connections from certain roles such as "edge" or "admin."

A Key Enclave Provides the Trusted Identity of Others

Figure 3A:
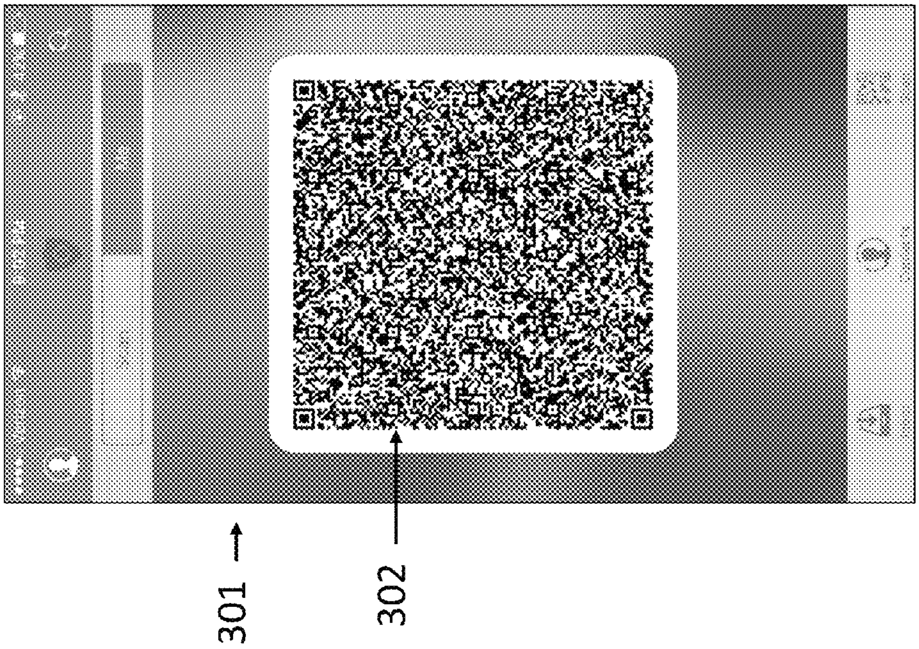
FIGS. 3A through 3B show each user's device presenting a QR code encoding her complete profile, including public key and signature of the profile, according to an exemplary embodiment.
Figure 3B:
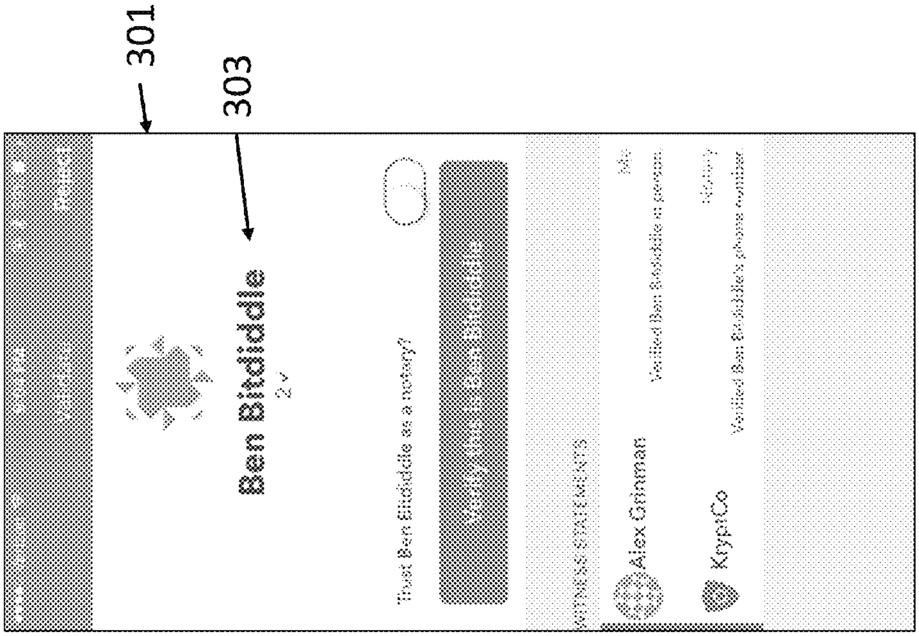

In some embodiments, a simple way for two identities to establish trust with each other is to meet in person and use an in-person witnessing feature. As illustrated in FIGS. 3A and 3B, in some embodiments, each user's device presents a QR code 302 encoding her complete profile, including public key and signature of the profile. After scanning the other user's device's QR code 302, the scanned profile 303 can be displayed in the app 301 and one can choose whether to trust this profile 303. If a user's device decides to trust the displayed profile 303, an "In-Person" statement witnessing the profile is signed and published to the WOTPKI. FIG. 3A shows an example of a QR code 302 representing the bytes of the principal's profile, containing the principal's public key according to some embodiments. As illustrated in FIG. 3B, in some embodiments, upon scanning a QR code 302 with the scan feature, the user is presented with the option to trust this principal and post an in-person witness statement.

Meeting in person is not always feasible. As an alternative, in some embodiments, users' devices may also verify identities through other communication side-channels such as SMS and email as illustrated in FIG. 4A-4C and FIG. 5A-5C. In some embodiments, a side-channel challenge comprises some or all of the following steps:

1. The challenging user's device specifies the identity's public key to challenge and a side-channel address to challenge it through, such as a phone number or email address.
2. The challenging user's app generates a random nonce and stores it with the challenged public key and side-channel address.
3. The challenging user's app sends the random nonce, challenged public key, and challenger public key over the side channel (auto-filling an email or SMS message for the user or automatically sending in the background if possible). The challenge is encoded in a URL (e.g., beginning with "kryptonite://").
4. The challenged user's device receives the challenge over the specified side-channel on the mobile phone with the app installed and clicks the link (e.g., a "kryptonite://" link).
5. The challenged user's app completes the challenge by signing the nonce and sending the signature in a message to the challenger.
6. The challenger's app receives the signed challenge and verifies the signature of the nonce matches the challenged public key stored with the nonce.
7. If verification succeeds, the challenger's app signs and publishes a witness statement for the corresponding side-channel address to the WOTPKI.

Figures 4A, 4B, 4C:
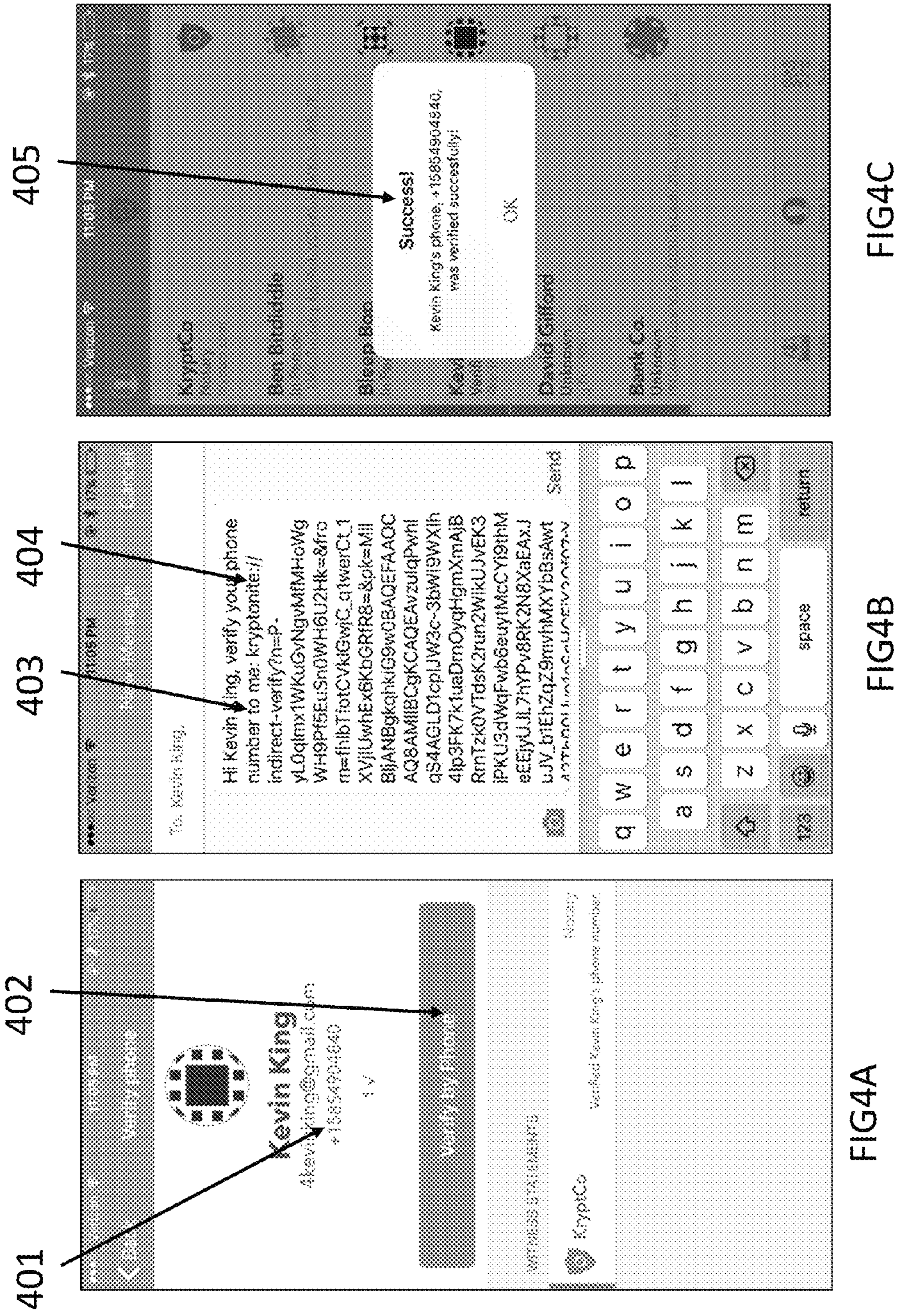
FIGS. 4A through 4C show verification of identities through other communication side-channels according to an exemplary embodiment.

For example, as illustrated in FIG. 4A, in some embodiments, upon selecting a phone number 401 in the phone contact book, a lookup query is made for matching profiles with the hash of the phone number. As illustrated in FIG. 4B, in some embodiments, after selecting "Verify by Phone" 402, a challenge SMS 403 is sent to the target phone number. As illustrated in FIG. 4C, in some embodiments, after the link 404 in the target SMS 403 is tapped, the app opens and sends the response 405 to the challenge. If the signature is valid, the "phone" witness statement is posted, and the principal is added trust base annotated by trusted phone number.

Figure 5C:
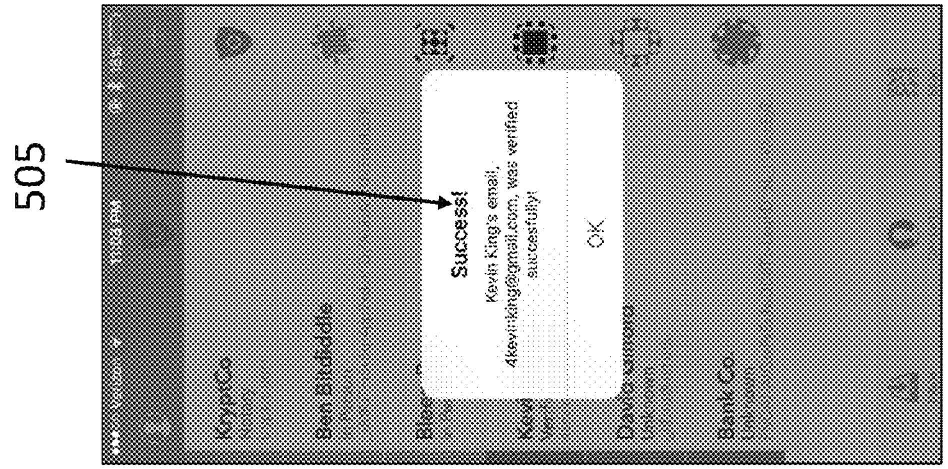
FIGS. 5A through 5C show verification of identities through other communication side-channels according to an exemplary embodiment.
Figure 5B:
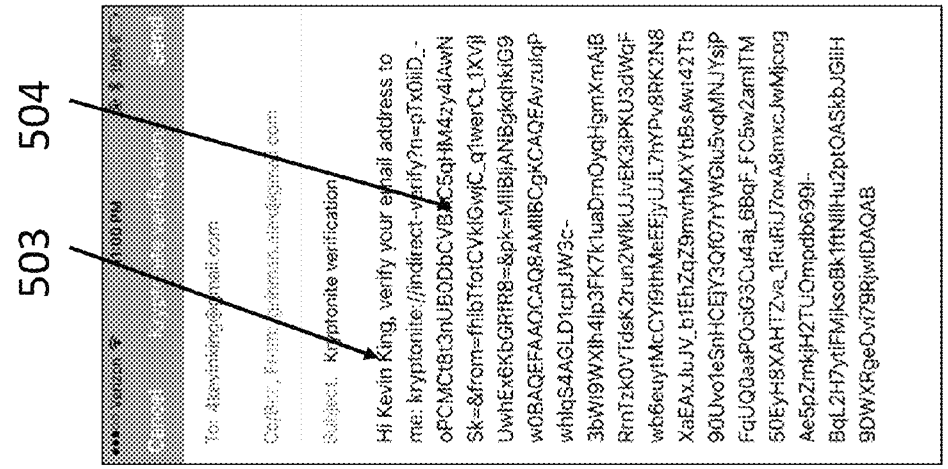
Figure 5A:
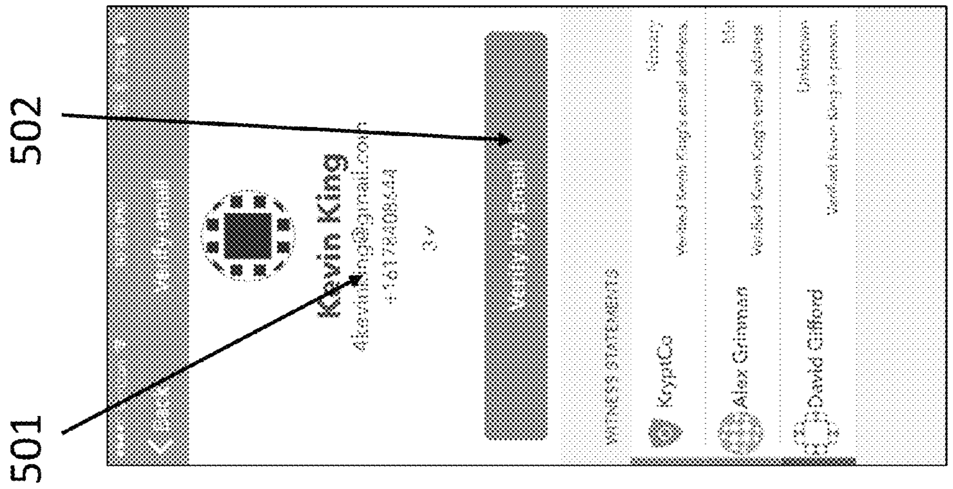

Additionally, as illustrated in FIG. 5A, in some embodiments, upon selecting an email address 501 in the phone contact book, a lookup query is made for matching profiles with the hash of the email address. As illustrated in FIG. 5B, in some embodiments, after selecting "Verify by Email" 502, a challenge email is sent to the target email 503 address 501. As illustrated in FIG. 5C, in some embodiments, after the link 504 in the target email 503 is tapped, the app opens and sends the response 505 to the challenge. If the signature is valid, the "email" witness statement is posted, and the principal is added trust base annotated by trusted phone number.

Figure 6:
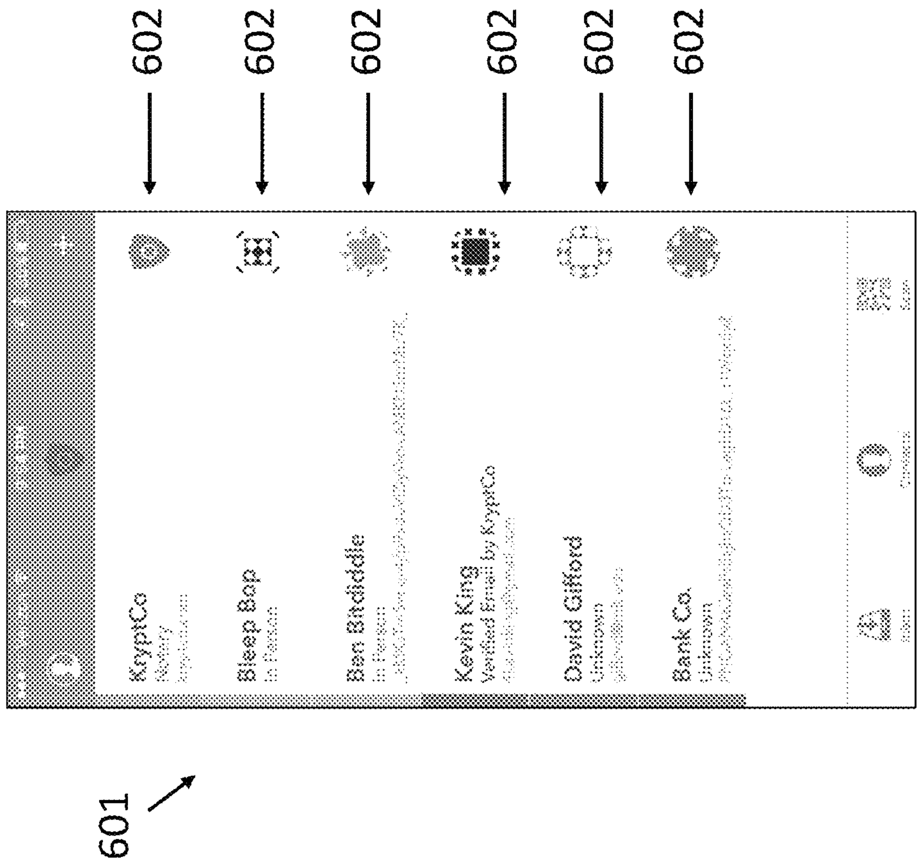
FIG. 6 shows a contact list that demonstrates the trust of each known profile in the principal's mobile enclave according to an exemplary embodiment.

Furthermore, in some embodiments, manually verifying each identity a user wishes to communicate with can be prohibitively cumbersome. For this reason, in some embodiments, a user can mark any trusted identity as a Notary. When a user marks another identity as a Notary, any witness statements signed by the Notary will also be trusted by this user's app. For example, in some embodiments, by default all users' apps trust the KryptCo identity as a notary. KryptCo sends email and SMS challenges to every profile, and publishes corresponding witness statements upon success. If a user is searching for an identity with a specific phone number, she can choose to trust any user KryptCo has witnessed without having to send a challenge herself. For example, FIG. 6 illustrates a contact list 601 according to some embodiments that demonstrates the trust of each known profile 602 in the principal's mobile enclave.

In some embodiments, the task of distributing knowledge of principal's public keys to other principals is accomplished using the "Web-of-Trust" Public Key Infrastructure (PKI). A fundamental unit of this scheme is a Witness Statement or Witnessing. Witness statements publicly published to the Web-of-Trust PKI Service, denoted as WOTPKI.

For example, in some embodiments, one principal can witness another principal by creating a cryptographic digital signature of a statement about the identity. For example, if Alice and Bob meet up and exchange public keys in person both Alice and Bob can each write the following statements:

"I trust that this is Bob's public key because Bob showed me his public key in person."—Signed Alice and "I trust that this is Alice's public key because Alice showed me her public key in person."—Signed Bob.

These are generally referred to as Witness Statements. Each Witness Statement generally has one or more of the following attributes:

Subject's Public Key
Witness Type (e.g. "In Person")
Witness Attributes (e.g. "met on 10/25/2015")
Signer's Signature Hence, in some embodiments, each witness statement is a short cryptographic proof that the Signer trusts the public key of the Subject, acquired in the manner of "Witness Type". The "Witness Attributes" is a special field to include details of attribute type.

In some embodiments, one or more of the following exemplary "Witness Types" and/or other witness types are used. For each of the exemplary "Witness Types" discussed below, an exemplary protocol is described to further illustrate the exemplary "Witness Types."

In some embodiments, the Witness Type is an Email Address Witness Type. In some embodiments, the Email Address Witness Type uses the following statement and exemplary protocol for the signer:

Statement: A subject who can send/receive emails at the email address in question has knowledge of the private key corresponding to "Subject's Public Key".

Exemplary Protocol for Signer i. Send an email to Subject containing Signer's public key, a one-time random token nonce ii. Subject receives email, and uses private key to sign nonce, Signer's public key, and their email address and sends the signed object to the signer through any communication channel iii. Signer verifies the subject's signature, and if the signature is valid the Signer creates the Witness Statement as specified above, typed by "Email", and publishes the witness statement to the WOTPKI.

In some embodiments, the Witness Type is a Phone Number Witness Type. In some embodiments, the Phone Number Witness Type uses the following statement and exemplary protocol for the signer:

Statement: A subject who can send/receive SMS (Short Message Services) messages using the phone number in question has knowledge of the private key corresponding to "Subject's Public Key".

Exemplary Protocol for Signer i. Send an SMS message to Subject containing Signer's public key, a one-time random token nonce ii. Subject receives SMS, and uses private key to sign nonce, Signer's public key, and their email address and sends the signed object to the signer through any communication channel iii. Signer verifies the subject's signature, and if the signature is valid the Signer creates the Witness Statement as specified above, typed by "Phone", and publishes the witness statement to the WOTPKI.

In some embodiments, the Witness Type is an In Person Witness Type. In some embodiments, the In Person Witness Type uses the following statement and exemplary protocol for the signer:

Statement: A subject who can meet in person with Signer has knowledge of the private key corresponding to "Subject's Public Key".

Exemplary Protocol for Signer i. Meet in person, subject show's signer public key ii. Signer creates the Witness Statement as described above, typed by "In Person", and publishes the witness statement to the WOTPKI.

In some embodiments, the Witness Type is an Organization Membership Witness Type. In some embodiments, the Organization Membership Witness Type uses the following statement and exemplary protocol for the signer:

Statement: A subject is a member of the organization with principal identity: Signer.

Exemplary Protocol for Signer i. Obtain subject's public key through, e.g., in person, or other organization specific method ii. Signer creates the Witness Statement as described above, typed by "Profile", attributed with membership details, and publishes the witness statement to the WOTPKI.

In some embodiments, the Witness Type is a Postal Address Witness Type. In some embodiments, the Postal Address Witness Type uses the following statement and exemplary protocol for the signer:

Statement: A subject who can receive postage using the postal address in question has knowledge of the private key corresponding to "Subject's Public Key".

Exemplary Protocol for Signer i. Send a paper letter to addressed to the postal address in question, containing Subject's Public Key and a one-time random nonce encoded in a QR code.

ii. Subject receives letter, subject's device scans the QR code on the enclosed letter and sends a signed object to Signer through any communication channel.

iii. Signer creates the Witness Statement as described above, typed by "Profile", attributed with physical address, and publishes the witness statement to the WOTPKI.

In some embodiments, the Witness Type is an X.509 Certificate Signature Witness Type. In some embodiments, the X.509 Certificate Signature Witness Type uses the following statement and exemplary protocol for the signer:

Statement: A subject who was issued an x.509 Certificate containing "Subject's Public Key" by a Certificate Authority Exemplary Protocol for Signer i. "Subject's Public Key" shared with a Certificate Authority in some manner up to the discretion of the Certificate Authority ii. Certificate Authority issues an x.509 certificate for "Subject" which contains subject's public key iii. Certificate chain containing the x.509 subject certificate, along with the full chain signature and the Certificate Authority's x.509 certificate is published as "x.509 Witness" statement to the WOTPKI In some embodiments, the Witness Type is a Revocation Witness Type. In some embodiments, the Revocation Witness Type uses the following statement and exemplary protocol for the signer:

Statement: The Subject's public key should not be trusted anymore according to Signer.

Exemplary Protocol for Signer i. Obtain subject's public key through, e.g., in person, or other organization specific method ii. Signer creates the Witness Statement as specified above, typed by "Profile", attributed with membership details, and publishes the witness statement to the WOTPKI.

In some embodiments, the Revocation Witness Type can address the following special case: If the Subject is the Signer, meaning the signer and the subject are the same principal, then this is known as a self-signed revocation statement. Self-signed revocation statements can always be trusted, as they are self-contained.

In some embodiments, the Witness Type is a General Statement Witness Type. In some embodiments, in general, any witness statement, of type "General", can be issued by a principal describing knowledge of a subject's public key with a relation of attributes to the subject's identity. In some embodiments, in general, when the Signer verifies an attribute about the subject principal, the Signer can declare this attribute in a statement of trust about the subject principal, sign this general witness statement, and publish it to the WOTPKI.

Note that the communication channel in the protocol descriptions above is not necessarily required to be secure or private.

In some embodiments, each Key Enclave maintains a list of trusted principals and associated trust status. The trust status is based on the witness statements of a principal. The Key Enclave can implement policies for specifying which principals to trust based on what witness statements they have or user-entered preferences. A user or organization may configure these Key Enclave policies to automatically trust or distrust an identity meeting certain criteria. Some examples include:

Trust any principal that is witnessed by organization "Apple"

Trust any principal that is witnessed by principal "Bob"

Trust any "in person" principal witnessed by {self, organization, custom, etc. . . . }

Trust any "email" or "phone" principal witness by {self, organization, custom, etc. . . . }

In some embodiments, when a principal is trusted according to a configured Key Enclave policy, an indication is displayed to the user and/or certain features for interacting with the trusted principal are enabled.

In some embodiments, the Key Enclave verifies and stores Witness Statements regarding another public key or principal. In some embodiments, the Key Enclave trusts some public keys with a trust-on-first-use model, where the first public key to claim a phone number, email address, name, and/or other real-world identity is trusted by the Key Enclave to have that identity. In some embodiments, the Key Enclave determines a level of trust of a principal based on the verified Witness Statements regarding that principal. For example, a Key Enclave may automatically trust signed messages from a principal with a verified Email Witness Type that the Key Enclave created and verified. On the other hand, a Key Enclave may, for example, explicitly not trust messages signed by a principal with a Revoked Witness Type issued by another trusted principal. In some embodiments, a delegate requests cryptographic operations from the Key Enclave that use other principals' public keys. In some embodiments, the Key Enclave performs the requested cryptographic operations taking into account its trust of other principals' public keys. In some embodiments, principal public key trust policies are configurable by the user. In some embodiments, principal public key trust settings are configured by a computer distinct from the key enclave and the delegate computer such as a remote server, team administrator, or another Key Enclave.

Figure 29:
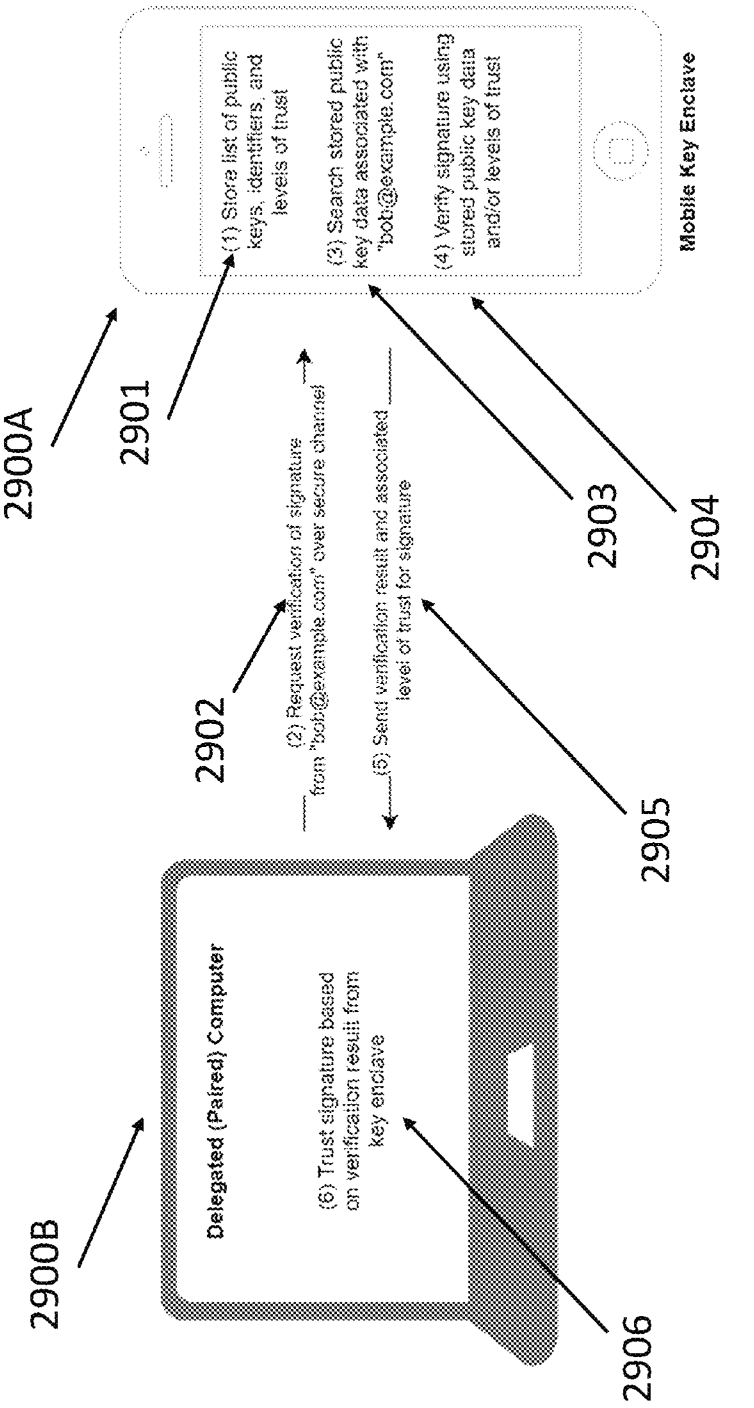
FIG. 29 shows a key enclave device storing one or more public keys according to an exemplary embodiment

In some embodiments, a key enclave device 2900A stores one or more public keys, as in FIG. 29 at step 2901. In some embodiments, the key enclave 2900A communicates with a delegate computer 2900B over a secure channel and both the key enclave 2900A and delegate computer 2900B use cryptography to enforce secrecy and authentication of messages over the channels and the secure channels utilize at least one communication link using wireless data transport. The key enclave 2900A receives a request from a delegate computer 2900B for verification of data and an associated signature at step 2902 and the key enclave verifies the signature using one or more stored public keys at steps 2903 and 2904 and the key enclave returns the result of the verification to the delegate computer over the secure channel at step 2905. In some embodiments, a key enclave device 2900A includes in its result a level of trust associated with the public key as defined by their trust status. In some embodiments, the verification result returned from the key enclave 2900A determines the delegate computer 2900B's trust of the signature in step 2906.

Figure 30:
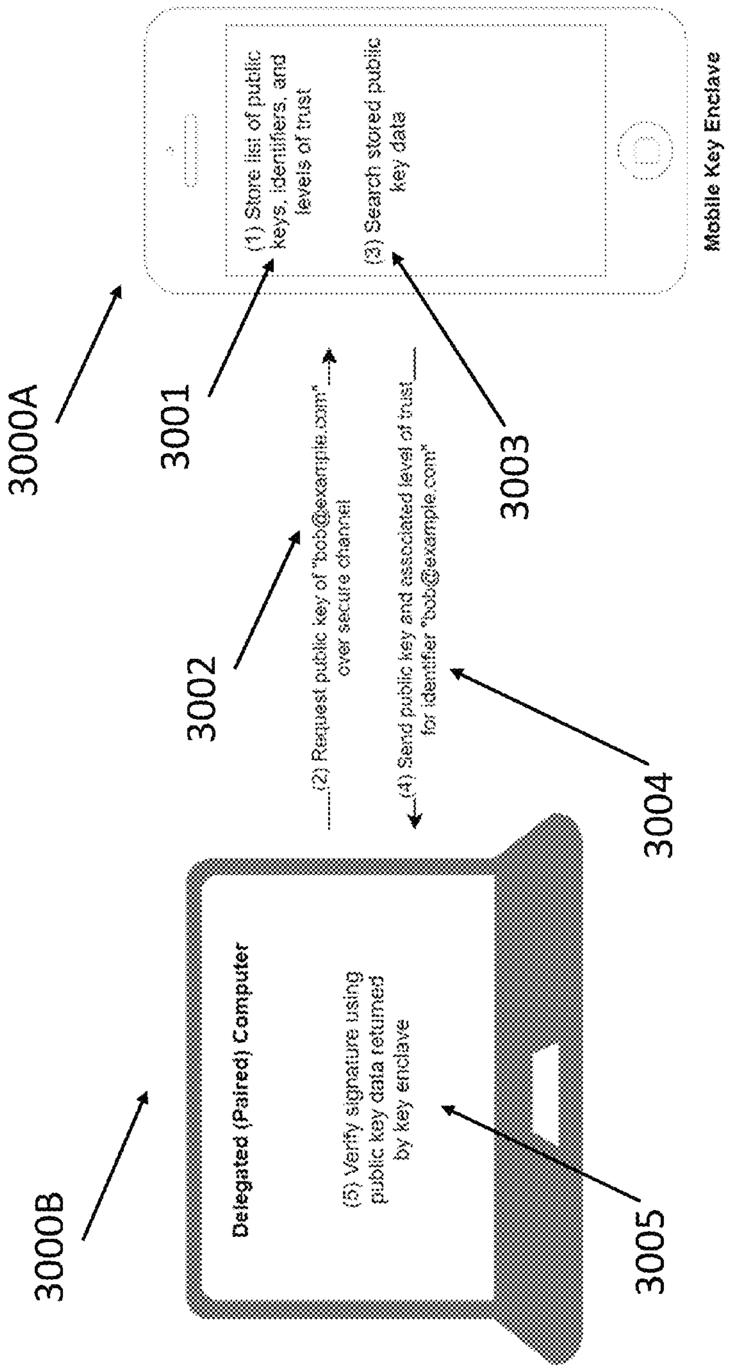
FIG. 30 shows a key enclave device storing one or more public keys and associated principal identities according to an exemplary embodiment.

In some embodiments, a key enclave device 3000A stores one or more public keys and associated principal identities, as in FIG. 30 in step 3001. The key enclave 3000A communicates with the delegate computer 3000B over secure channels and both the key enclave 3000A and delegate computer 3000B use cryptography to enforce secrecy and authentication of messages over the channels and the secure channels utilize at least one communication link using wireless data transport. The key enclave 3000A receives a request from a delegate computer 3000B for the public key associated with a principal identity or public key hash in step 3002, and the key enclave 3000A returns the result of the verification to the delegate computer 3000B over the secure channel in steps 3003 and 3004. In some embodiments, a key enclave device 3000A includes in its result a level of trust associated with the public key as defined by their trust status. In some embodiments, the delegate 3000B then uses the returned public key data and level of trust to verify and determine the authenticity of one or more signatures in step 3005.

In some embodiments, the Web of Trust Public Key Infrastructure (WOTPKI) service comprises a system for maintaining the mapping between a principal's self-signed profile and a corresponding collection of witness statements about the principal, serving as proofs of identity. In some embodiments, a purpose of this system is to query a principal's identity (e.g., public key) by attributes like name, hash of email, hash of phone, and evaluate the trustworthiness of this profile by the witness statements other principals have made. In some embodiments, every witnessing connects an edge between two principals' identities, thereby building a graph or web of trust.

In some embodiments, WOTPKI service comprises and/or performs one or more of the following. In some embodiments, a database server maintaining records of type (e.g., Profile, Witness) for a data object where "Profile" is, e.g., the object described in "Public-Key Generation and Publishing" and where "Witness" or "Witness Statement" is, e.g., the object described in section "Web of Trust Public Key Infrastructure" above.

In some embodiments, an API for publishing and searching records to the database server comprises an API method for querying profiles by "name", "hash of phone number", and "hash of email." In some embodiments, the API for publishing and searching records to the database server further comprises an API method for publishing profiles whereupon the service cryptographically verifies the self-signed profile signature and rejects the request if the verification fails. In some embodiments, the API for publishing and searching records to the database server further comprises an API method for querying witness statements about a subject principal by supplying the principal's public key hash. In some embodiments, the API for publishing and searching records to the database server further comprises an API method for publishing witness statements to a profile whereupon any principal can publish a witness statement about another principal and the service cryptographically verifies the witness statement signature and rejects the request if the verification fails.

Self-Signed Statements of Revocation Protect Against Enclave Loss or Compromise

In some embodiments, the revocation service comprises a system that stores encrypted self-signed revocation witness statements (e.g., described in Web-of-Trust Public Key Infrastructure). In some embodiments, a purpose of this system is to publish self-signed revocation witness statements on behalf of a principal even if the principal loses access to their Key Enclave.

For example, in some embodiments, a use case of this service allows a principal to revoke their identity if they lose their mobile key enclave. The self-signed revocation witness statement indicates that other principals should no longer trust the identity key pair.

In some embodiments, it should not be easy for the revocation service to maliciously publish these revocation statements without the consent of the principal. The following protocol shows an example of how this can be accomplished according to some exemplary embodiments.

In some embodiments, principals interact with the revocation service by, for example, performing one or more of the following steps:

1. Initialization.
   a. Principals create a self-signed revocation witness statement, and
   b. Use a standard password-based key derivation algorithm to derive a symmetric key from a passphrase of their choosing
   c. Next, the self-signed revocation witness statement is encrypted symmetrically with this key
   d. The encrypted object is published to the revocation service
2. Revocation. If the principal wishes to revoke their identity:
   a. Post a message to the revocation service with the passphrase
   b. The revocation service decrypts the self-signed revocation witness statement
   c. The revocation service publishes the self-signed revocation witness statement to the WOTPKI In some embodiments, the revocation service comprises a database server maintaining records of type "String" for a data object where the string represents an encrypted, self-signed revocation witness statement. In some embodiments, the revocation service comprises an API method for publishing records to the database server. In some embodiments, the revocation service comprises an API method for publishing a passphrase and an identifier to find the record where if the passphrase decrypts the referenced data object successfully the service publishes the decrypted object to the WOTPKI.

In some embodiments, a Principal can email a self-signed revocation statement to an email account where the revocation statement is contained in a URL associated with the revocation service. Later, if a Principal initiates revocation by clicking on link the revocation service will publish the self-signed revocation witness statement to the WOTPKI.

Figure 7B:
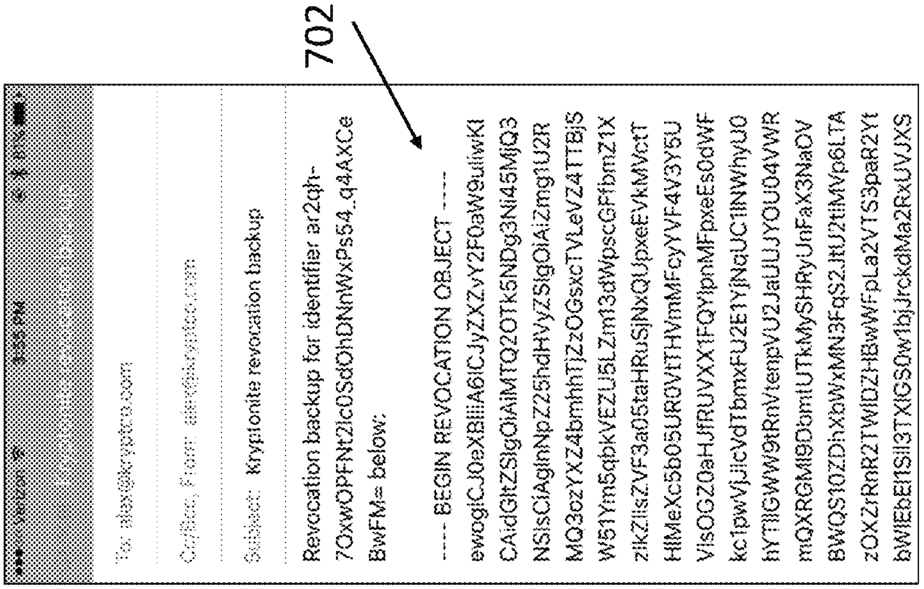
FIGS. 7A through 7B show users' devices publishing a self-signed revocation statement from within the phone app if it is believed the phone was compromised according to an exemplary embodiment.
Figure 7A:
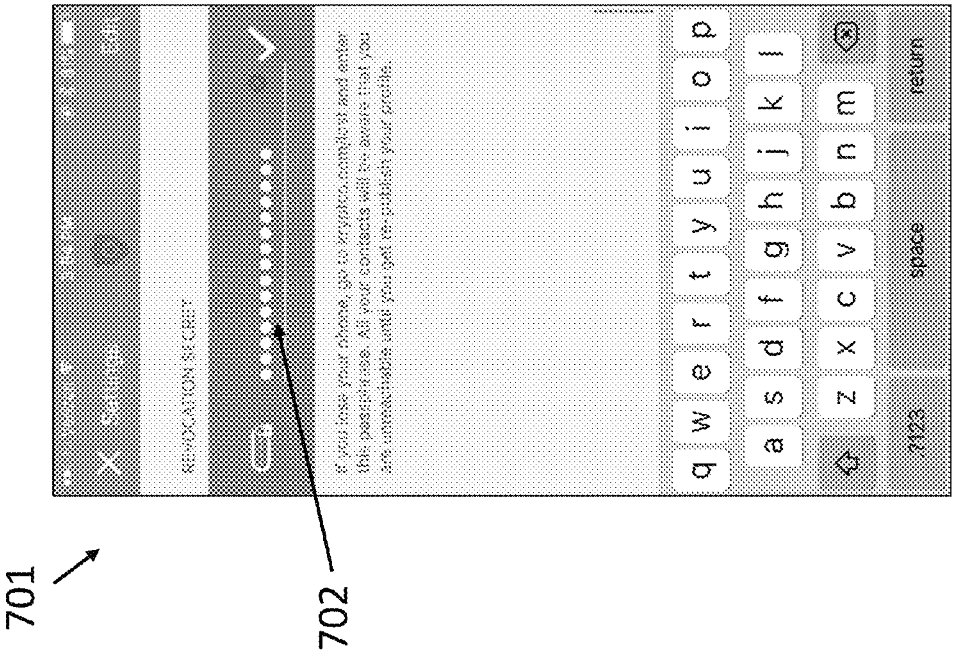
Figure 8:
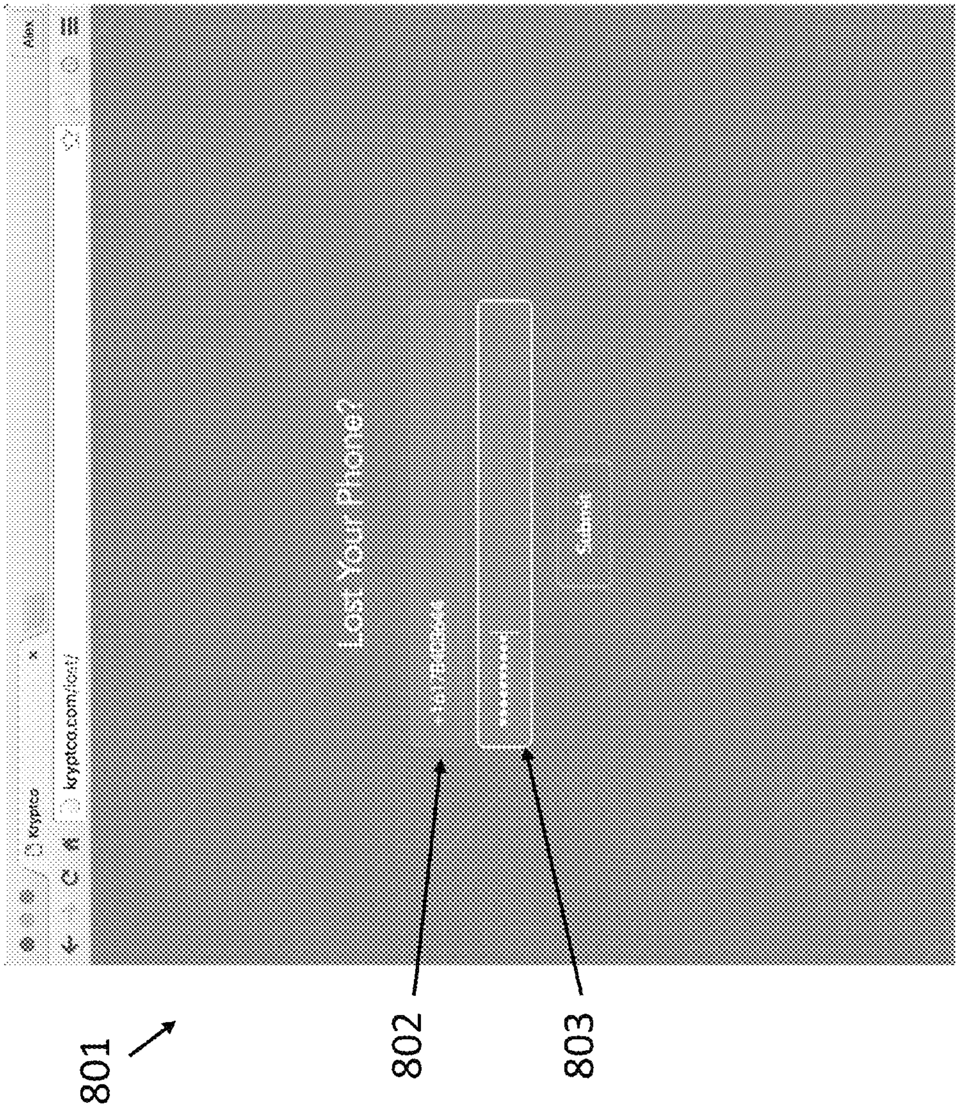
FIG. 8 shows users' devices publishing a self-signed revocation statement from within the phone app if it is believed the phone was compromised according to an exemplary embodiment.

In some embodiments, users' devices can publish a self-signed revocation statement from within the phone app if it is believed the phone was compromised, as illustrated for example in FIG. 7A-7B and FIG. 8. The revocation statement may also be sent to an email in the form of a link that will revoke the identity when clicked. Users' devices can also encrypt a self-signed revocation statement with a passphrase and publish it to the WOTPKI so that in the event the phone is lost, the stored identity may be revoked with the knowledge of the passphrase by visiting a lost phone webpage.

For example, as illustrated in FIG. 7A, in some embodiments, in the profile screen 701, the user's device can create self-signed revocation statements 702 that are encrypted with a passphrase 703 and published to the revocation service. As illustrated in FIG. 7B, in some embodiments, the self-signed revocation object 701 can be emailed somewhere as a backup method for instantly publishing the revocation.

FIG. 8 illustrates a "Lost" webpage 801, hosted by the Revocation Service, according to some embodiments. In some embodiments, the page allows the user to publish the locked self-signed revocation after specifying the phone number 802 of the principal (the reference id) and the passphrase 803 (to decrypt the locked revocation).

In some embodiments, when evaluating the trust of an identity, the app checks if this identity has been revoked using the WOTPKI. If the identity has been revoked, the app can alert the user. For example, the app can alert the user by coloring the profile red and displaying a prominent warning to the user, among other methods.

In some embodiments, after revocation, a principal's device can recover their identity by generating a new key pair and re-publishing the profile. The principal's device can then re-do witness proofs via the protocols described above for each type of witness statement thereby re-establishing trust with previously trusted principals.

A Key Enclave Enables Secure Messaging

In some embodiments, the app can be used to message both trusted and untrusted identities securely. In some embodiments, a secure message comprises a Protected Object where an opener is encrypted to the destination public key and the object is signed by the sender's identity. Messages may contain arbitrary text, images, files, a location, a Yes/No approval request, and/or a Yes/No approval response. The protected object is sent through a messaging service (e.g., the KryptCo Messaging Service).

Figure 9B:
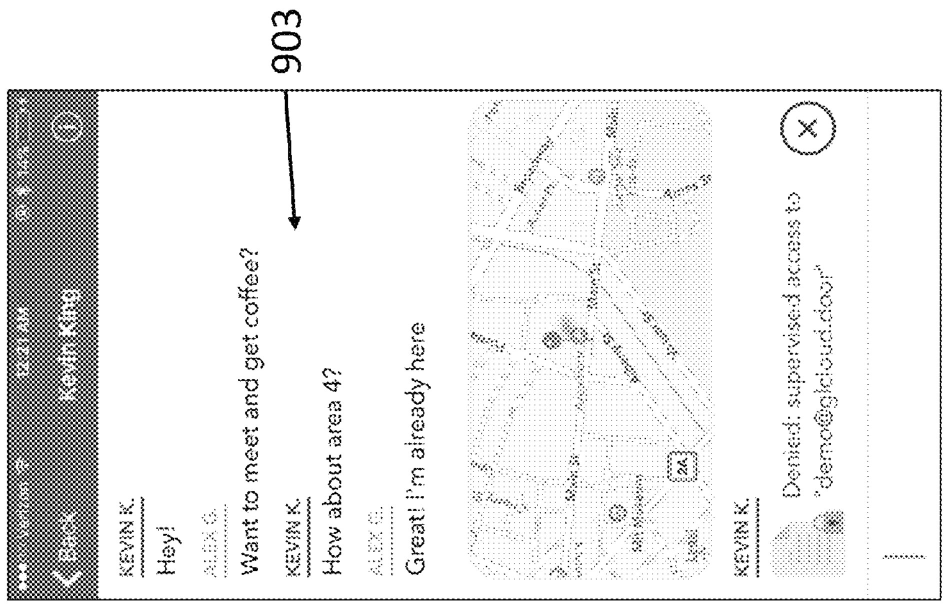
FIG. 9A shows the inbox screen according to an exemplary embodiment and FIG. 9B shows an example conversation showing text, location, and approved or denied request messages according to an exemplary embodiment.
Figure 9A:
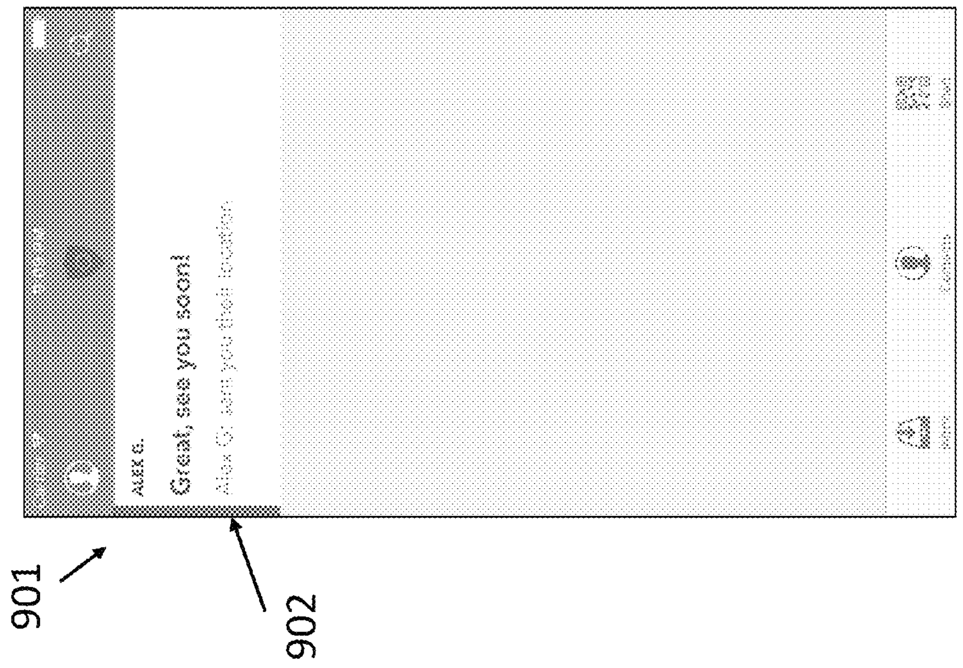

For example, FIG. 9A illustrates the inbox screen 901 according to some embodiments, which shows new messages 902 and manages conversations. FIG. 9B shows an example conversation 903 showing text, location, and approved or denied request messages in accordance with some embodiments.

In some embodiments, the messaging service enables transport of arbitrary messages between principals without necessarily facilitating any key agreement or trust between principals.

In some embodiments, the messaging service comprises a system for storing, publishing, and querying encrypted messages where each message is between two or more principals.

In some embodiments, messages can contain one or more of the following exemplary attributes:

Recipient Principal's Public Key Hash
Sender Principal's Public Key Hash
Encrypted Raw Data Bytes
Creation Date
Sequence Number In some embodiments, a messaging service can be queried for messages containing a certain recipient or sender public key hash, after or before a certain date, after or before a certain sequence number.

A Key Enclave's Identity can be Selectively Delegated

In some embodiments, delegation enables audited, restricted, and monitored access to outputs of cryptographic operations of stored private keys and trusted public keys. In some embodiments, delegation enables the use of a secure, isolated environment to both evaluate trust (e.g., through verifying witness statements or other information) and map principal identifiers (e.g., email addresses, phone numbers) to trusted public keys from any delegate.

In some embodiments, delegated access is device and network agnostic. Delegated access may be automatically forwarded from a delegate to another device through a secure session.

In some embodiments, delegation allows a device that is not a Key Enclave to perform operations on behalf of an identity stored on a Key Enclave. For example, a user may wish to generate and store her identity on a mobile phone Key Enclave, but need to perform a cryptographic signature on her laptop using said identity.

In some embodiments, access to an identity on a Key Enclave can be delegated to another device by initiating the delegation on the Key Enclave and creating a cryptographically secured communication channel between the two devices. Once a secure communication channel is established, the delegated device may request for the Key Enclave to perform cryptographic operations using the contained identity and reply with the outputs. The delegated device only has temporary and controlled access to operations performed using the private key contained within the Key Enclave. In some embodiments, the private key is never provided to the delegated device.

In some embodiments, a user's device delegates a mobile phone identity to a workstation laptop or desktop by, for example, scanning a secret token encoded in a QR code presented by the workstation with the mobile phone camera. The scanning of the QR code is considered a secure channel between the workstation and mobile phone, but is generally only used to exchange the secret token. The secret token may, for example, be a symmetric encryption key, such as for the AES256-GCM algorithm. In some embodiments, requests to and responses from the Key Enclave are encrypted and authenticated using the exchanged secret token. In some embodiments, the secure session is identified by the SHA256 hash of the secret token. This identification can be used by the Courier Service to connect the two devices over the internet. In some embodiments, the secret token is a public key necessary to establish the secure channel. The token may, for example, include an asymmetric encryption key, such as for the Curve25519 algorithm. In some embodiments, requests to and responses from the Key Enclave are encrypted and authenticated using a symmetric key established, for example, using X25519 key exchange. In some embodiments, sequence numbers and message authentication codes are included in messages communicated over the secure session to ensure they are authentic.

Figure 10:
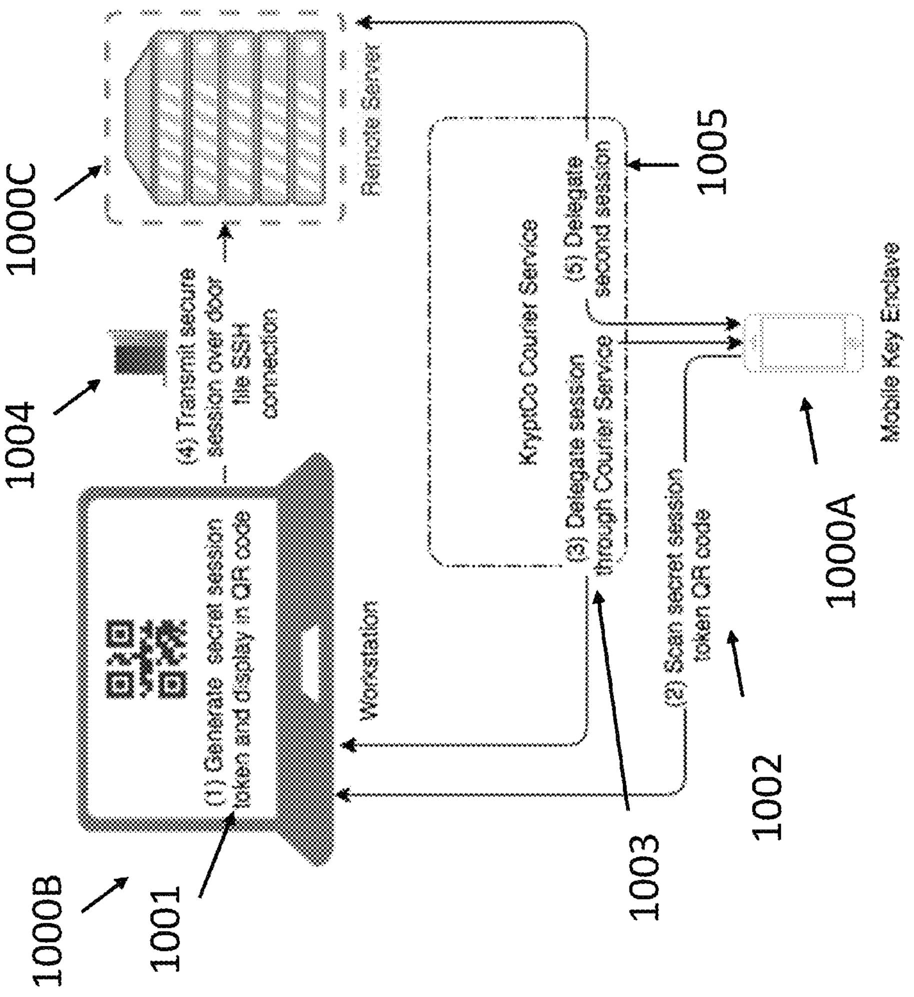
FIG. 10 shows delegation from a mobile enclave to a workstation accomplished by scanning a QR code according to an exemplary embodiment.

In some embodiments, the app can delegate access to its stored identity using the aforementioned QR code scanning interface. A user can view all delegated sessions and the logs of the operations performed by each on the app. A user or a user's app can choose to revoke a delegated session at any time. For example, FIG. 10 illustrates an example of delegation from a mobile enclave to a workstation accomplished by scanning a QR code in accordance with some embodiments, as discussed further below.

In some embodiments, communication between a Key Enclave device and delegated device occurs through an Internet hosted communication service such as Amazon Web Services Simple Queue Services (SQS) via the Internet and/or by Bluetooth Low Energy (BLE) wireless communication. In some embodiments, communication is simultaneously attempted over multiple channels to find a channel that functions with the lowest latency. In some embodiments, a Key Enclave connects to the Internet wirelessly, for example, via mobile phone wireless data service or via WiFi.

In some embodiments, when a user logs into virtual machines from a workstation that has been delegated, the secure session between the workstation and mobile phone may be further propagated to the virtual machine through any secure connection to that machine, such as through the Secure SHell (SSH) protocol, or using a door file for a two-way authenticated SSH session as described below.

In some embodiments, communication between a Key Enclave device and delegated device occurs through a hosted Courier Service, described below, allowing communication in the presence of any inbound firewall rules and network address translation induced IP address changes.

In some embodiments, a delegated device does not learn the underlying private key of the delegated identity. Instead, in some embodiments, each operation requiring the private key is performed through the established secure channel to the Key Enclave. In some embodiments, the Key Enclave has complete control over which individual operations are performed and communicated back to any delegated device.

In some embodiments, the Key Enclave logs every operation requested by a delegated device, allowing the owner to audit the operations requested by other devices. In some embodiments, since the private key is not learned by a delegated device, no operation may be performed on behalf of the identity without the Key Enclave having the knowledge of it and the ability to log or prevent it.

In some embodiments, a delegated device's access may be revoked at any time on the Key Enclave. Upon revocation of a delegated device, the corresponding secure session is terminated and no further operations will be granted to the once-delegated device.

In some embodiments, a delegated device's access is also governed by configured policies that can automatically restrict the operations performed. These policies can encompass metrics such as frequency of operations, types of operations, origin IP address of requests, or types of data to be operated on, among others. If a policy is violated, the delegated device session may be limited or terminated by the Key Enclave. In some embodiments, policies may also permit automatic approval of certain operations requested by a delegated device, including a request for an operation within a given configured time interval from the last explicit user approval input, the identity of the delegated device, the type of operation requested, or any combination of attributes of the operation requested.

In some embodiments, a delegated session may be passed over a connection to use the identity from a remote server. In some embodiments, a device (e.g., a workstation 1000B) can generate a secret session token and display a QR code as illustrated in step 1001 in FIG. 10. The workstation 1000B can verify the identity of the remote server 1000C using a door file as described below. The workstation 1000B can transmit the secure session over a SSH connection as illustrated in step 1004 in FIG. 10. Additionally, a mobile key enclave 1000A (e.g., a mobile device running the app) can scan the secret session token QR code as illustrated in step 1002 in FIG. 10. As illustrated by steps 1003 and 1005 in FIG. 10, in some embodiments, a session can be delegated through a Courier Service (e.g., KryptCo Courier Service). For example, the Courier Service can delegate a session to a workstation 1000B and a mobile key enclave 1000A (e.g., in step 1003 in FIG. 10) and can delegate a second session to a remote server 1000C and a mobile key enclave 1000A (e.g., in step 1005 in FIG. 10).

In some embodiments, the mobile key enclave can operate the delegated session as a background process allowing the app to not run in the foreground. Furthermore, the delegated session background process enables the mobile key enclave to respond to delegate requests even when the device is in a "locked" or inactive state.

In some embodiments, one or more of the following exemplary cryptographic identity operations among others may be requested by a delegate:

Providing the public key and identity of the key enclave

Decryption of an Opener

Computing or verifying the hash of an object, and then signing the resulting hash Signing of an object's hash Sending of an encrypted message to a trusted identity Evaluation of trust of another identity Listing or searching trusted identities In some embodiments, to request an operation be performed, a delegate sends the requested operation and inputs to the Key Enclave over the established secure communication channel. If the Key Enclave accepts the request, it performs the operation and responds with only the operations outputs over the same secure channel.

In some embodiments, the courier service enables the use of a globally-addressable secure communication channel in which the Courier Service operator does not learn the contents of the communication.

In some embodiments, a courier service comprises a system for establishing a secure connection between two or more remote devices over the internet. In some embodiments, the system comprises and/or performs one or more of the following. In some embodiments, the a courier service comprises a module called a Courier Session that identifies the connection comprising a randomly generated session identifier and/or a randomly generated secret cryptographic key. In some embodiments, the courier service comprises a module that allows two or more devices to identify and connect to a group of devices comprising: an untrusted middleware server that accepts connections from devices and broadcasts messages to each device in the group and/or client devices that connect to the middleware server and identify a device group using the session identifier (e.g., the randomly generated session identifier). In some embodiments, the courier service comprises a method for creating and identifying a device group and encrypting and authenticating the messages (e.g., messages broadcast) by generating a Courier Session, opening a connection with the middleware server and registering with the connection identifier (e.g., the randomly generated session identifier), processing outgoing messages using an authenticated encryption scheme with the key (e.g., the randomly generated secret cryptographic key), and sending the processed messages to the middleware server, receiving incoming messages over the internet from the middleware server, and decrypting and authenticating the incoming messages using the authenticated encryption scheme and the cryptographic secret key (e.g., the Courier Session). In some embodiments, the courier service comprises a method for joining a registered group of devices by: obtaining a Courier Session through a secured channel, opening a connection to the middleware server, and sending and receiving messages, for example, by processing outgoing messages using an authenticated encryption scheme with the key (e.g., the randomly generated secret cryptographic key), and sending the processed messages to the middleware server, receiving incoming messages over the internet from the middleware server, and decrypting and authenticating the incoming messages using the authenticated encryption scheme and the cryptographic secret key (e.g., the Courier Session).

In some embodiments, the courier service is the primary mechanism for delegation, specifically the Key Enclave creates courier session to a delegated device. This courier session provides a private, authenticated channel for the delegated device to request asymmetric private key operations on the Key Enclave.

A Desktop Application Implements Delegate Operations

Figure 11A:
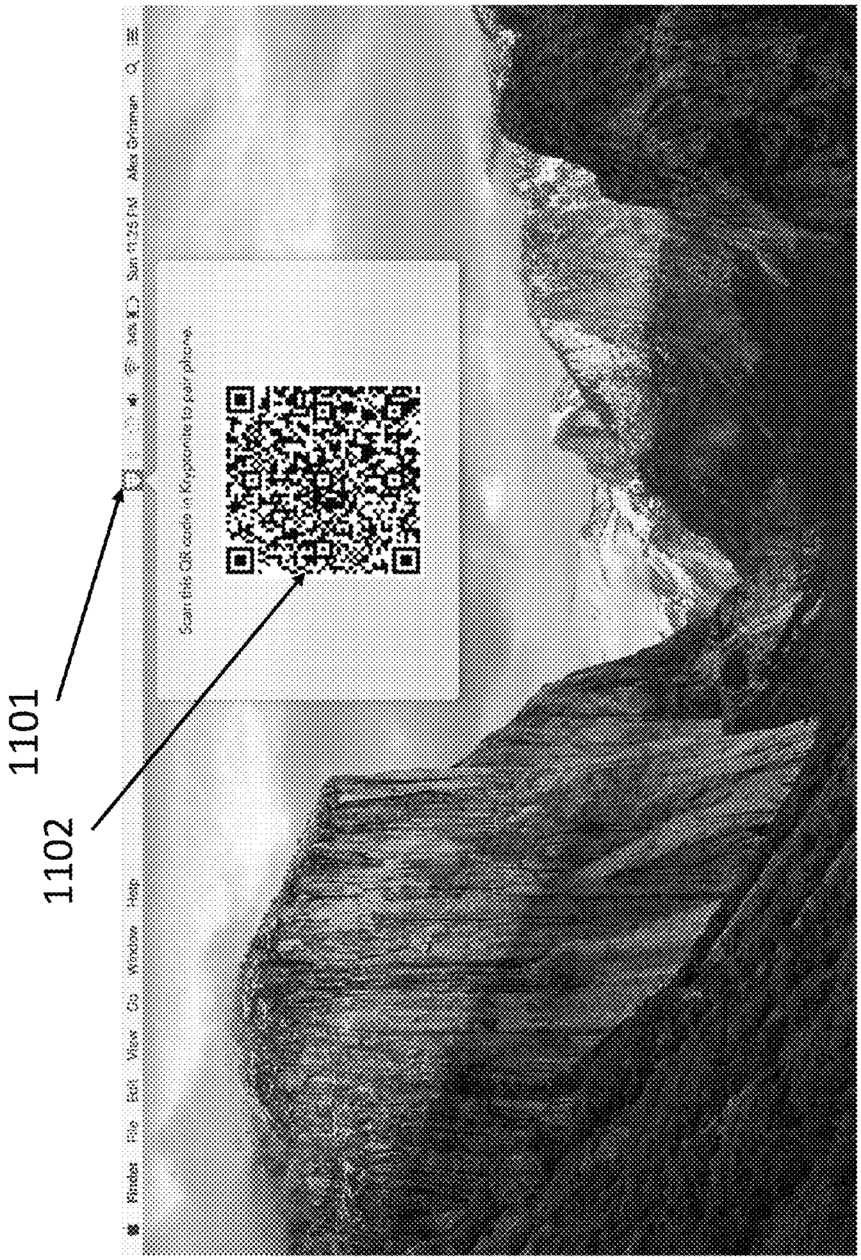
FIG. 11A shows users pairing their mobile key enclave with the desktop by scanning the QR code according to an exemplary embodiment and FIG. 11B shows after devices connected via the delegation framework after the code is scanned according to an exemplary embodiment.
Figure 11B:
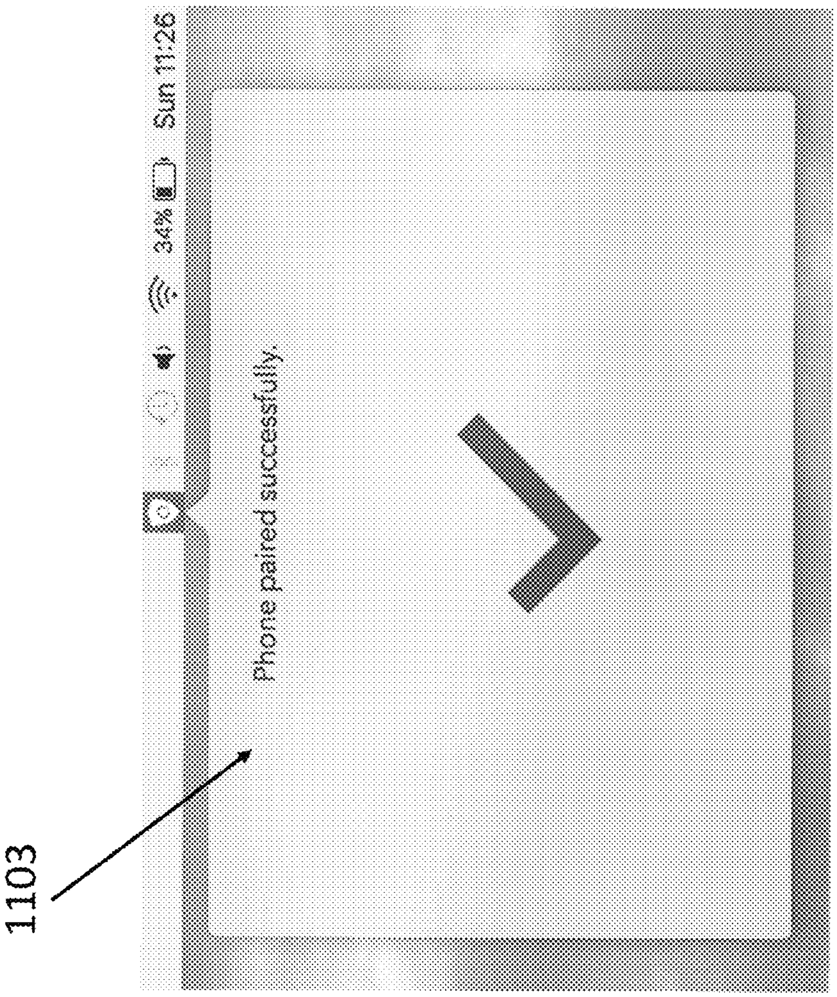

In some embodiments, users can install a desktop version of a delegate in order to use their identities from their workstations. In some embodiments, upon starting the application, it displays a QR code used for delegation. The user's mobile phone Key Enclave then scans the QR code. For example, as illustrated in FIGS. 11A and 11B, in some embodiments, when starting the desktop application 1101, in FIG. 11A users pair their mobile key enclave with the desktop by scanning the QR code 1102, and in FIG. 11B after the code is scanned, the devices are now connected via the delegation framework as illustrated by the display 1103.

Figure 12B:
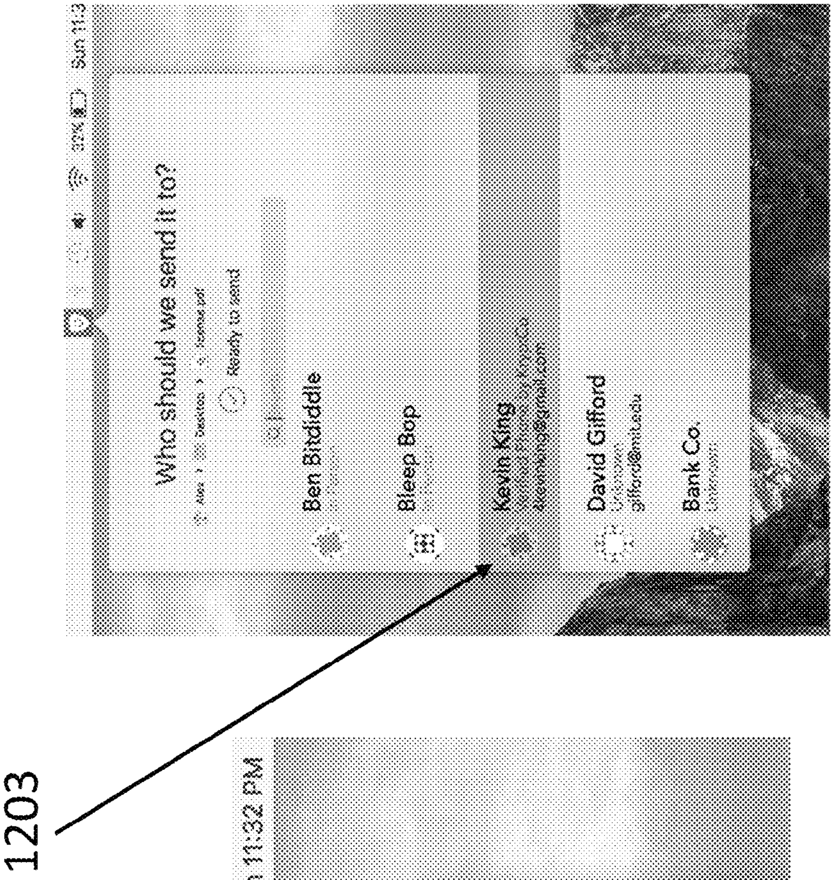
FIG. 12B shows a user picking from any of the trusted contacts sent from the Key Enclave according to an exemplary embodiment.
Figure 12A:
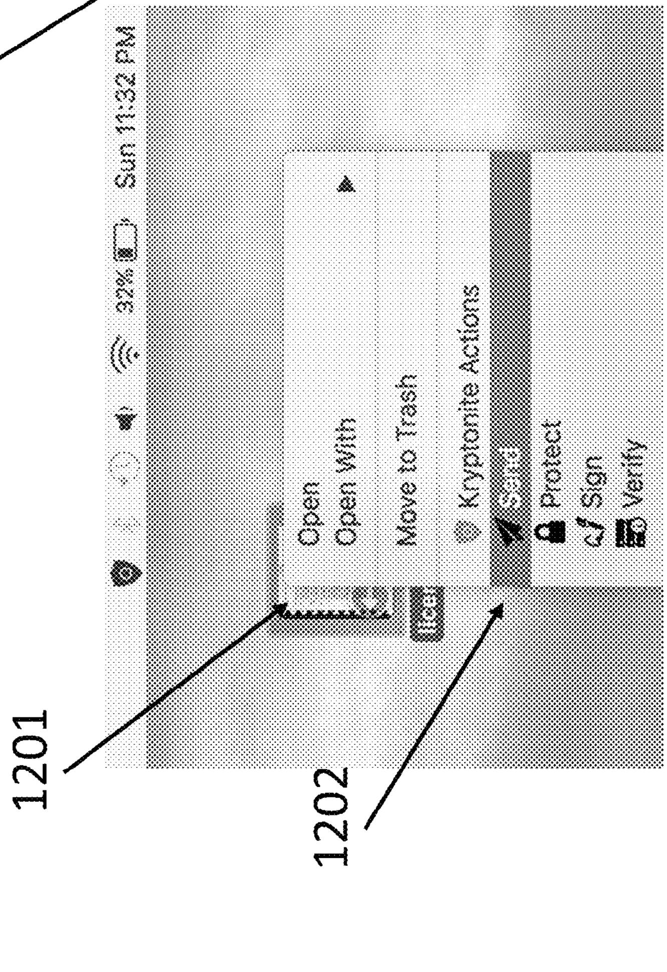
FIG. 12A shows right clicking any file on a user's machine to bring up the option to Encrypt, Send, Sign, Verify, or Decrypt it using a delegated identity according to an exemplary embodiment

In some embodiments, right clicking any file 1201 on a user's machine brings up the option 1202 to Encrypt, Send, Sign, Verify, or Decrypt it using a delegated identity as illustrated in FIG. 12A. The user can then pick from any of the trusted contacts 1203 sent from the Key Enclave as illustrated in FIG. 12B.

Figure 13B:
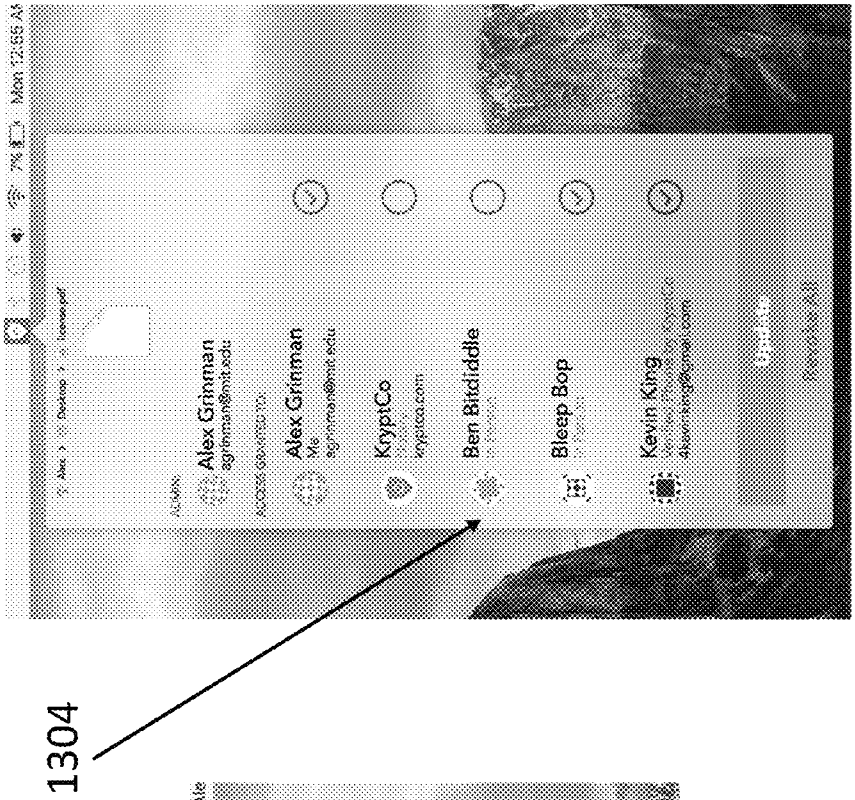
FIG. 13A shows options that appear when dragging a file into an icon according to an exemplary embodiment and FIG. 13B shows an access control list for any Protected Object can also be viewed and modified within the desktop application according to an exemplary embodiment.
Figure 13A:
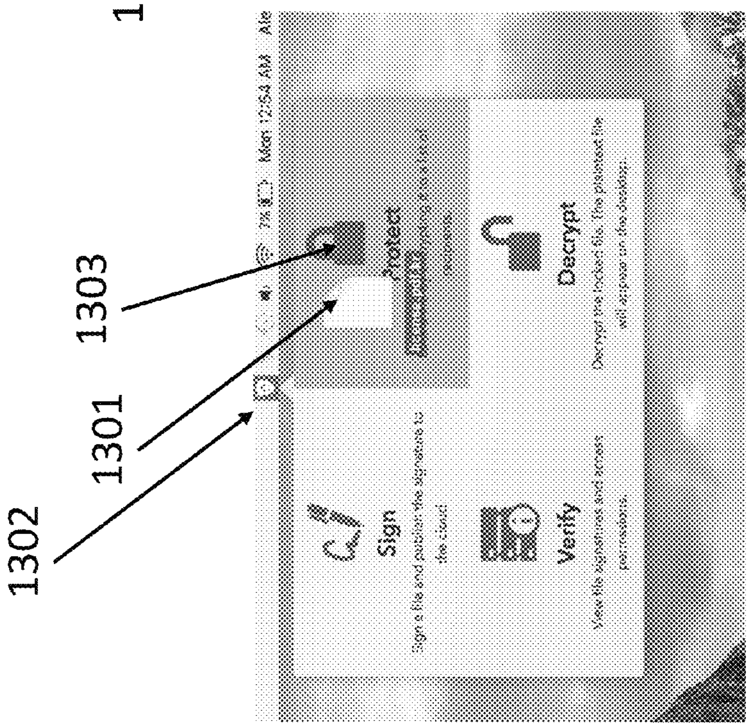

In some embodiments, when the Key Enclave receives a file attachment, it is also sent to the desktop application allowing the user's device to decrypt and the user to view it as illustrated in FIG. 13A. In one embodiment, FIG. 13A shows the options that appear when dragging a file 1301 into the app icon 1302, and in this figure protecting a file is selected with the protect icon 1303. The access control list 1304 for any Protected Object can also be viewed and modified within the desktop application as illustrated in FIG. 13B.

In some embodiments, the desktop app may integrate with the operating system to automatically encrypt and/or sign any files in a specified folder or mounted volume and publish these openers and/or signatures to an Opener Service and/or Signature Service.

kr Command Line Interface

In some embodiments, the functionality of the desktop application is also offered in a command-line form as an application referred to here as "kr" (spelled uncapitalized). In some embodiments, kr provides viewing and altering of access control lists, encryption and decryption of protected objects, and signing and verification of object signatures, all using a delegated identity as illustrated in FIG. 14. FIG. 14 shows one embodiment where kr commands show the currently delegated identity 1401, an access control list on a file 1402, and the filtered decryption of a file 1403. In some embodiments, kr presents a QR code printed using ASCII characters in the terminal to encode the same secret delegation token as the desktop application. In this way, a user can pair a mobile phone key enclave with any environment kr in a console.

Door Files

In some embodiments, when a user's device connects to a remote machine for the first time using the SSH protocol, the user's device may or may not trust the SSH public key presented by the remote machine. In practice, users often trust the SSH public key without checking its correctness, allowing the potential for a Man-in-the-Middle attack between the user's device and the remote machine. Door files can include the fingerprint of the expected SSH public key of a remote machine, enabling automatic verification of the remote machine's SSH public key and rejection if the fingerprint of the presented SSH public key does not match the fingerprint in the door file. In this way, the SSH public key of a remote machine may be verified once by the creator of the door file and automatically verified by any devices using the door file.

In some embodiments, kr also allows the creation and use of door files. In some embodiments, a door file contains the information for creating a two-way authenticated SSH session between the user's device and a remote machine. In some embodiments, a door file comprises the following elements:

User: the user name on the remote machine to log in to
Host: the host of the remote machine (a DNS name or IP address)
Private Key: the SSH private key used to authenticate to the remote machine for this user
Remote Public Key: the expected public key fingerprint used to authenticate the remote server Using kr, a user's device can, for example, create a door file that provides two-way authenticated access to a virtual machine she already has access to. The user may then send the door file to another identity to grant them access, or turn the door file into a Protected Object with an associated access control list. Signing the door file allows other users' devices to verify the door file is endorsed by a certain identity or group of identities.

In some embodiments, when a user's device connects to a virtual machine using kr and a door file the user's principal has access to, any delegations granted to kr may optionally be passed on to the virtual machine through the SSH session.

Figure 15:
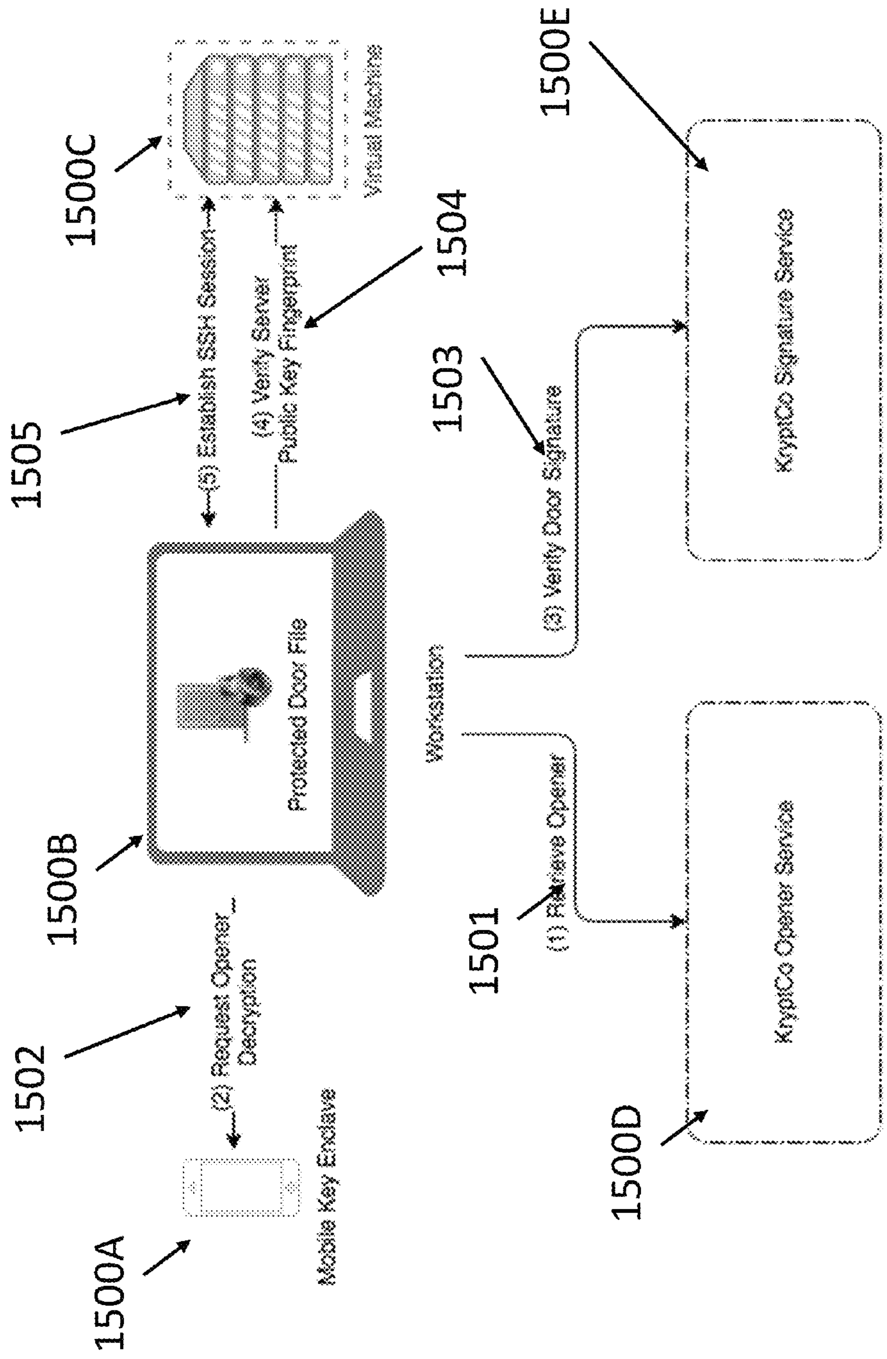
FIG. 15 shows a virtual machine's access control list used by decrypting and verifying its door file according to an exemplary embodiment.

For example, as illustrated in FIG. 15, in some embodiments, a virtual machine 1500C's access control list is used by decrypting and verifying its door file. A computer such a workstation 1500B can (1) Retrieve Opener from an Opener Service 1500D (e.g., KryptCo Opener Service) in step 1501, (2) Request Opener Decryption from a mobile key enclave 1500A in step 1502, (3) Verify Door Signature from a Signature Service 1500E (e.g., KryptCo Signature Service) in step 1503, (4) Verify Server Public Key Fingerprint with a virtual machine 1500C in step 1504, and (5) establish an SSH Session with the virtual machine 1500C in step 1505.

UNIX Streaming Compatibility

In some embodiments, when kr is run on a machine with terminal support for standard input and output file descriptors, inputs and outputs to kr can be directed using pipes. For example, a protected object can be decrypted, streamed into a search program like grep, and further streamed back into kr to securely send the results to another identity. In some embodiments, the pipe interface allows users' devices to perform streaming encryptions and decryptions in real time as new parts of the protected object arrive, for example in an audio and/or video stream.

Third-Party Cloud Command Line Utility Compatibility

In some embodiments, third party cloud hosting services provide command line applications to store arbitrary files and objects in their storage facilities. kr can be integrated with these command line utilities so that data is automatically protected when it is sent to the third-party storage, and decrypted when it is downloaded and accessed locally, all using a delegated identity as illustrated in FIG. 16. In one embodiment, FIG. 16 shows kr functionality and delegated identities accessed using third-party cloud command line tools, such as Google Cloud's gsutil.

Key Enclaves can Create Digital Signatures

In some embodiments, a delegated device will request that a key enclave provide a digital signature of an object of a specific type, and in some embodiments the key enclave will display to the user that owns the key enclave the type of signature requested when seeking user approval to perform the signature. In some embodiments, the key enclave will display all or a portion of the object to the user on a display such as a mobile phone screen so the user can visually validate what object signature has been requested. In some embodiments, the key enclave will compute a hash of the object and ensure that the hash it signs corresponds to the object displayed on the screen for user approval.

Examples of specific object signatures include SSH session data, and a document signature that does not include the ability to use the signature for authorization purposes. In one embodiment, the type of an object to be signed can be derived using rules that identify the kind of signature requested given the format of the object presented for signature, such as SSH session data. Alternately, the type of signature requested can be directly encoded in an identifier field in an object to be signed. In some embodiments, a key enclave will only perform signatures when the user of the key enclave explicitly approves the type of signature to be performed. In some embodiments, a key enclave can include a role identifier in the signature it creates, where the role identifier restricts the operations that can be performed by the delegate with the signature in a role based access control system. In some embodiments, a key enclave contains different private or symmetric keys for different types of signatures, and a database is maintained that allows the key enclave to use the proper key based upon the type of signature requested. In some embodiments, a key enclave contains secret keys specific to at least one of the roles of a principal, and uses a role specific key to sign requests based upon the role for which the key enclave's user wishes to authorize a delegate, thus limiting the delegate to operations authorized for that role in a role based access control system. In some embodiments, the enclave uses one or more keys to perform cryptographic operations to establish the types of operations that may be performed by other keys. For example, one key stored in the enclave (a "master" key) may be used to sign other keys ("sub-keys") with a statement of the type of operations each sub-key may perform. Operations performed using a sub-key may only be trusted if the sub-key has been appropriately signed by a master key.

A Signature Service Publishes Signatures

In some embodiments, a signature service comprises a system for storing, publishing, and searching cryptographic signatures, indexed by the cryptographic hash of the data being signed. In some embodiments, a signature service operates a database server maintaining records of type (e.g., Hash, Public-Key, Signature) for a data object where "Hash" comprises the cryptographic hash of a data object, "Public-Key" comprises the public-key of the principle signing the data-object, and "Signature" comprises the cryptographic digital signature of the hash of the data object unknown to the server. In some embodiments, the signature service implements an API for publishing and searching records to the database server comprising: an API for querying cryptographic signatures for a data object by specifying a cryptographic hash of the data object and an API for publishing a signature record by specifying a cryptographic hash, a principal's public-key, and/or the digital signature of the hash by the principal's private-key in which the server cryptographically verifies the signature of the hash.

In some embodiments, when a digital object or file is signed, the signature is added to the file or object. Then this modified file or object is sent with the attached signature to any interested parties. In some embodiments, the app and kr achieve non-mutating signatures in the sense that a file or object can be signed without modifying the file itself. In some embodiments, a user's device signs some data by first hashing that data, then publishing a signature of the hash to a Signature Service (e.g. the KryptCo Signature Service). To verify which identities have signed a file or object, in some embodiments, a user's device computes the hash and looks up some or all of the signatures in the same Signature Service. In this way, one user's device may sign a file or object on a machine, and any other user devices that verify the same data will quickly or instantly find the signature without any further interaction from the signer.

Figure 17:
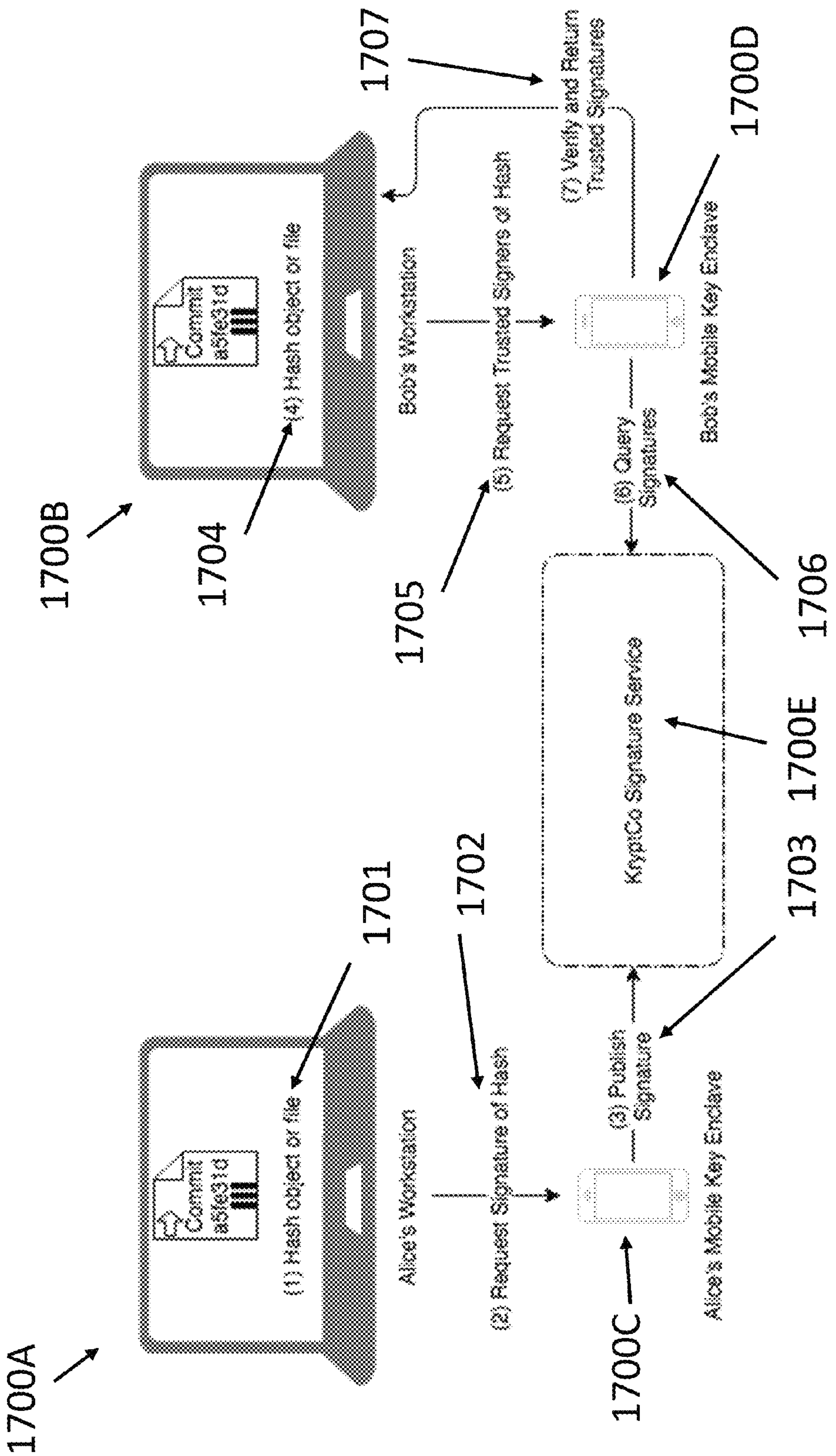
FIG. 17 shows a user's device signing an object such as a code commit using a delegated mobile enclave session according to an exemplary embodiment.

For example, as illustrated in FIG. 17, in some embodiments, a user Alice's device 1700A signs an object such as a code commit using a delegated mobile enclave session, which publishes to a Signature Service. Another user Bob's device 1700B seeks to verify the same commit and does so without interacting directly with Alice's devices 1700A or 1700C. In particular, in some embodiments, Alice's workstation 1700A (1) computes a hash objection or file in step 1701, (2) requests signature of the hash from Alice's mobile key enclave 1700C in step 1702, which (3) publishes the signature to a signature service 1700E such as the KryptCo Signature Service. Bob's Workstation 1700B (4) computes a hash of an objection or file in step 1704, (5) requests trusted signers of the hash from Bob's mobile key enclave 1700D in step 1705, which (6) queries signatures from the signature service 1700E in step 1706 and (7) verifies and returns the trusted signatures to Bob's workstation 1700B in step 1707.

Enterprise Server Key Enclave

Cloud Storage Access Control

In some embodiments, an enterprise enclave can be used to control access to objects stored in a cloud storage service. In some embodiments, any application reading or writing objects is first delegated an identity. In some embodiments, when creating a new object, the application creates the object in cleartext form, generates a nonce key, encrypts the new object with the nonce key, and stores the resulting ciphertext in the cloud storage service. The nonce key is then encrypted into openers depending on the desired access and published to the Opener Service. The delegated enclave connection is used to determine the public keys of trusted identities.

Database Column Encryption

In some embodiments, encrypting specific columns of a database, such as credit card and social security numbers, operates similarly to cloud storage access control. The database client can be integrated with the kr API to automatically encrypt columns containing sensitive data, granting access only to a subset of desired trusted identities. Since, in some embodiments, only the sensitive columns are encrypted, any searches on the data according to such embodiments that do not use these columns specifically will operate normally. When reading data from the database, the integrated kr API can automatically use any delegated identities to decrypt the protected columns for normal application use. In some embodiments, this integration does not require any change to the application code using the database client.

Figure 18:
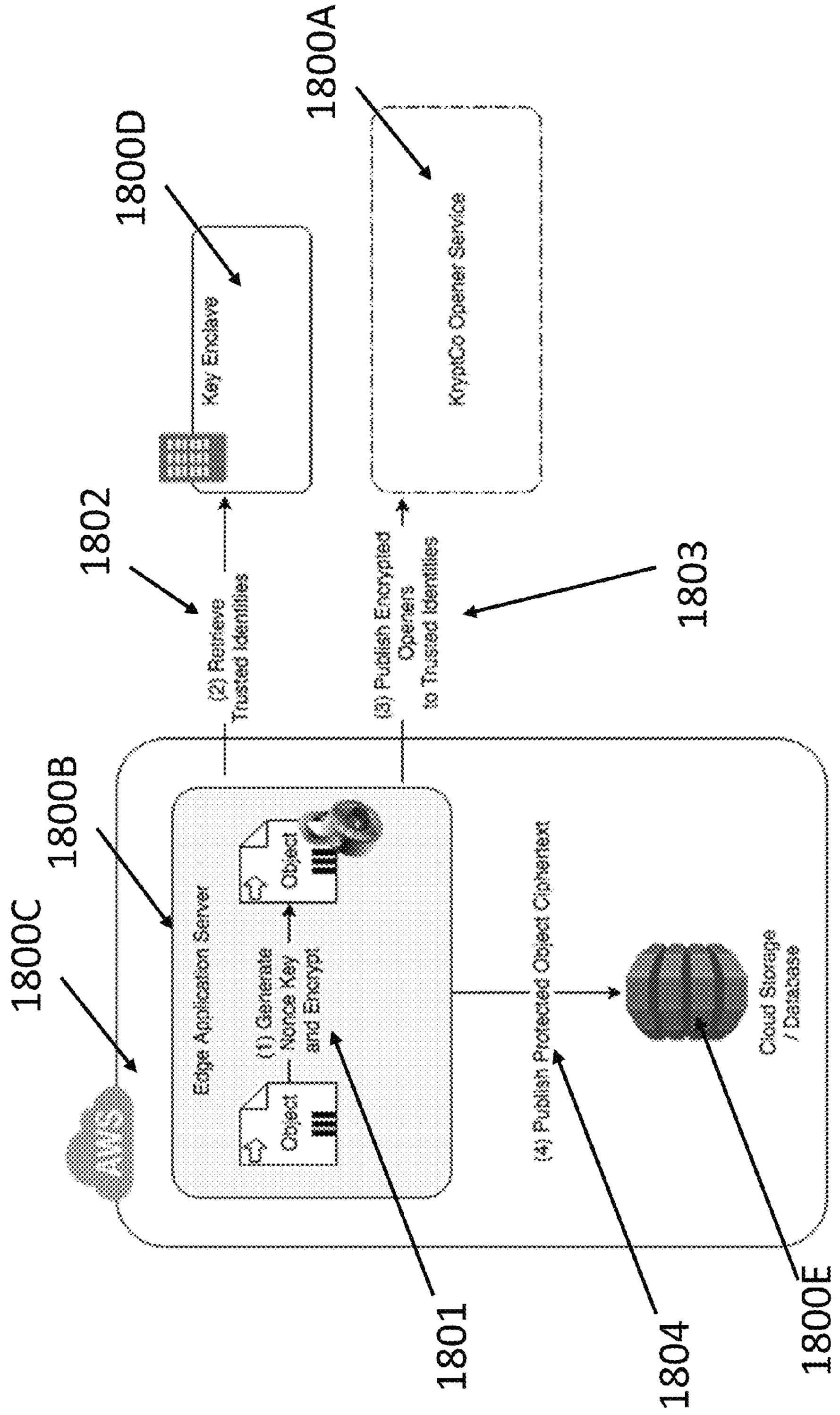
FIG. 18 shows a Protected Object encrypted with a nonce key and published anywhere according to an exemplary embodiment.

For example, FIG. 18 illustrates, in accordance with some embodiments, a Protected Object encrypted with a nonce key and published anywhere, where an Opener Service 1800A such as KryptCo Opener Service only stores the constant-size openers. An Edge Application Server 1800B running, e.g., in a cloud-based platform such as Amazon Web Services (AWS) 1800C, (1) generates a nonce key and encrypts an object at step 1801, (2) retrieves trusted identities from a key enclave 1800D in step 1802, (3) publishes encrypted openers to trusted identities via an opener service in step 1803, and (4) publishes a protected object ciphertext to cloud storage and/or a cloud-based database 1800E in step 1804.

Figure 19:
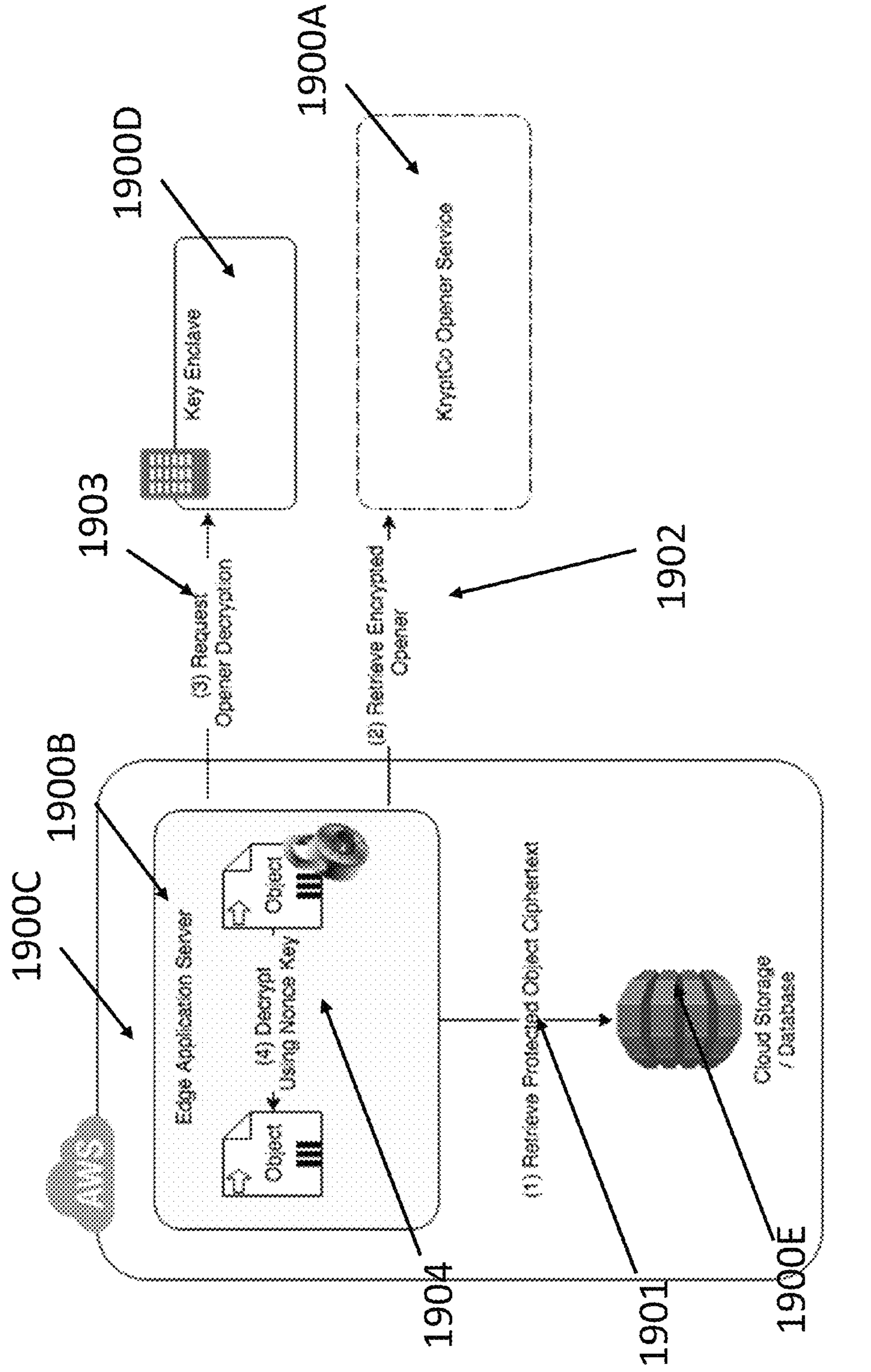
FIG. 19 shows ciphertext of a Protected Object stored anywhere (including the cloud) and decrypted using an opener service (e.g., the KryptCo Opener Service) according to an exemplary embodiment.

FIG. 19 illustrates, in accordance with some embodiments, the ciphertext of a Protected Object may be stored anywhere (including the cloud 1900C) and decrypted using an opener service 1900A (e.g., the KryptCo Opener Service). The Edge Application Server 1900B can (1) retrieve a protected object ciphertext from cloud storage and/or a cloud-based database 1900E in step 1901, (2) retrieve an encrypted opener from an opener service 1900A in step 1902, (3) request opener encryption from a key enclave 1900D at step 1903, and (4) decrypt the object using the nonce key at step 1904.

SSL/TLS Handshakes

SSL/TLS certificates may be used as enterprise identities. Web servers can use certificates to authenticate to visitors by completing a SSL/TLS handshake. In order to complete the handshake, the server performs either a signature or a decryption using the private key of the identity associated with the certificate. Traditionally, this private key was stored on the web server machine. If this web server is hosted at a third-party cloud hosting provider, the key is no longer in complete custody of the renter of the web server. In addition, any software running on the same machine as the private key may contain a vulnerability that leads to the compromise of the key. Accordingly, in some embodiments, the devices and methods disclosed herein overcome one or more of these shortcomings associated with the traditional approach.

Handshake Offloading

In some embodiments, an enterprise key enclave may be used to generate or store a certificate private key, while allowing edge web servers to use the key without risk of compromise. The enclave can be hosted in another cloud provider or on the premises of the key owner to maintain custody and isolation of the key.

In some embodiments, to use an SSL/TLS private key stored in a Key Enclave on a web server, an administrator installs an Edge server application (e.g., Edge). In some embodiments, Edge is automatically provisioned with an X.509 certificate identity with role "edge" on the same machine as any application (including web servers) that require TLS connections. In some embodiments, Edge awaits any delegated sessions from Key Enclaves and maintains the list of certificates and keys it has access to through these sessions. In some embodiments, instead of connecting directly to a web server or other TLS-enabled application, incoming users' devices connect to Edge. Edge then identifies which certificate should be used to perform a TLS handshake and requests that the required private key operation be performed by a delegating Key Enclave. Once an enclave responds, the handshake is completed by Edge with the user's device and plaintext traffic is forwarded to the locally-running web server.

Figure 20:
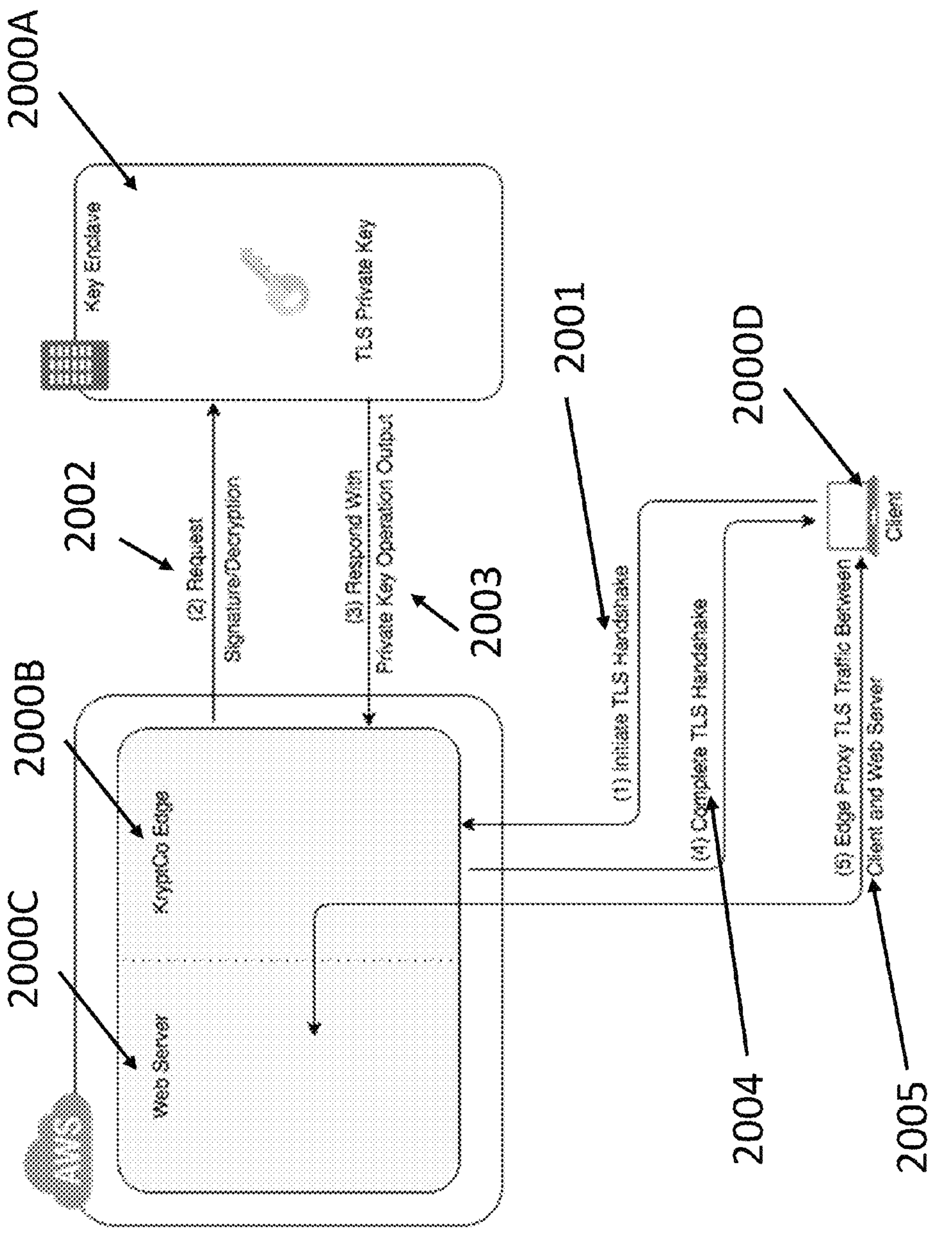
FIG. 20 shows a TLS handshake initiated through Edge then offloaded to the Key Enclave according to an exemplary embodiment.

FIG. 20 illustrates a TLS handshake initiated through Edge then offloaded to the Key Enclave 2000A according to some embodiments, where Edge 2000B then acts as a TLS forward proxy for the application (in this case a Web Server 2000C). For example, a client 2000D (1) initiates a TLS handshake with Edge 2000B in step 2001, (2) Edge 2000B requests a signature and decryption from the key enclave 2000A in step 2002, which (3) responds with private key operation output in step 2003. Edge 2000B (4) computes the TLS handshake with the client 2000D in step 2004 allowing (5) Edge 2000B proxy TSL traffic between the client 2000D and web server 2000C in step 2005.

Automatic ACME CSRs

In some embodiments, the Automatic Certificate Management Environment (ACME) protocol allows users' devices to make Certificate Signing Requests (CSRs) and have these requests automatically fulfilled after proving access to the DNS name in the CSR. In some embodiments, instead of requiring user interaction, the Edge application can automatically initiate a CSR by contacting an Enterprise Key Enclave and forwarding any domain validation requests that reach the Edge machine to the desired Enterprise Key Enclave. As a result, in some embodiments, the CSR is fulfilled at the Key Enclave which stores the new certificate and private key. In some embodiments, a CSR can be initiated by the operator of Edge, or automatically when a user's device requests to handshake with a certificate for a specific domain (e.g., using the Server Name Indication (SNI) TLS feature).

Replication

In some embodiments, since identity operations conducted by the Enterprise Key Enclave are relied upon and used in real time, relying on a single enclave can create a single point of a failure for a system. As a solution, in some embodiments, multiple enclaves may be run anywhere on the internet, with the same or different sets of private keys and identities. In some embodiments, the Edge server will utilize any active enclave connections and load balance between all that are available, allowing enclaves to come up and down freely. In some embodiments, Enterprise Key Enclaves may also be configured to automatically replicate any private keys that are imported or generated to all other trusted enclaves. Automatic key replication can alleviate the risk of the loss of an enclave, which otherwise could render a private key inaccessible forever.

Access Control Lists

In some embodiments, Key Enclaves and the Opener Service can be leveraged to implement cryptographically-enforced access control lists to arbitrary data. In some embodiments, full access is granted to an object by publishing an opener for the protected object encrypted to the authorized identity. Full or otherwise access can be revoked by deleting an opener for the protected object previously authorized to an identity. When a user wants to access a protected object, her Key Enclave queries the Opener Service and decrypts the opener encrypted to her identity.

Supervised Access

In some embodiments, in addition to granting full access to a protected object, users' devices can only grant a special supervised access where some subset of a group of identities must agree to allowing access to a protected object. Supervised access can be granted by generating a symmetric nonce key, encrypting the plaintext object, and then splitting the nonce key into key shares using a threshold secret-sharing scheme such as Shamir's Secret Sharing and/or XOR secret sharing. Each share can be encrypted in an opener to an identity that is part of the access group. When a user's device attempts to access an object under supervision, each supervisor's Key Enclave can be requested to decrypt that principal's key share and send it to the requesting user's device, allowing full decryption of the object if enough supervisors' devices approve. Upon creation, each plaintext key share can be signed by the creator so that supervisors' devices can verify that they are not decrypting arbitrary ciphertexts and sending the results to the requester.

Figure 21:
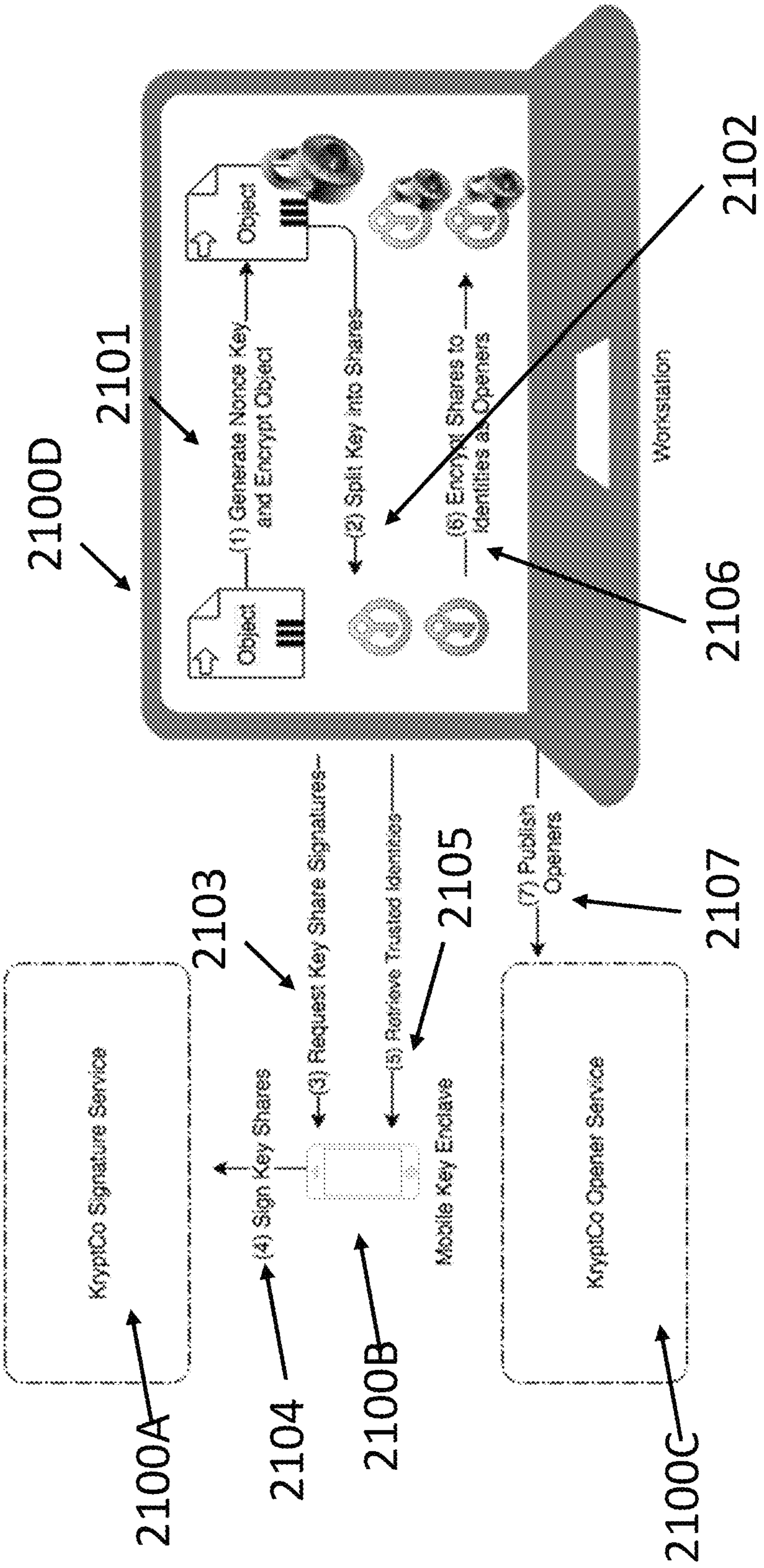
FIG. 21 shows supervised access between two parties accomplished with openers that contain key shares according to an exemplary embodiment.

For example, FIG. 21 illustrates supervised access between two parties accomplished with openers that contain key shares in accordance with some embodiments. As illustrated in FIG. 21, in some embodiments, a workstation 2100D (1) generates a nonce key and encrypts an objection in step 2101, (2) splits the key into shares in step 2102, (3) requests key share signatures from a mobile key enclave 2100B in step 2103, which in turn (4) requests sign key shares from a signature service 2100A in step 2104. The workstation additionally (5) retrieves trusted identities form the mobile key enclave 2100B in step 2105, (6) encrypts shares to identities as openers in step 2016, and (7) publishes the openers to an opener service 2100C in step 2017.

Requesting and Granting Access

In some embodiments, when a user's device accesses a Protected Object but finds that it does not have access, it may request access from the identities' devices that do have access. These identities' devices can be found by querying the opener service, and access can be requested by sending a secure message to each. If an identity's device with access accepts the request, the device with access can download the opener encrypted to its key, decrypt it, and publish a new opener encrypted to the requesting party.

SSH Authentication

Figure 23:
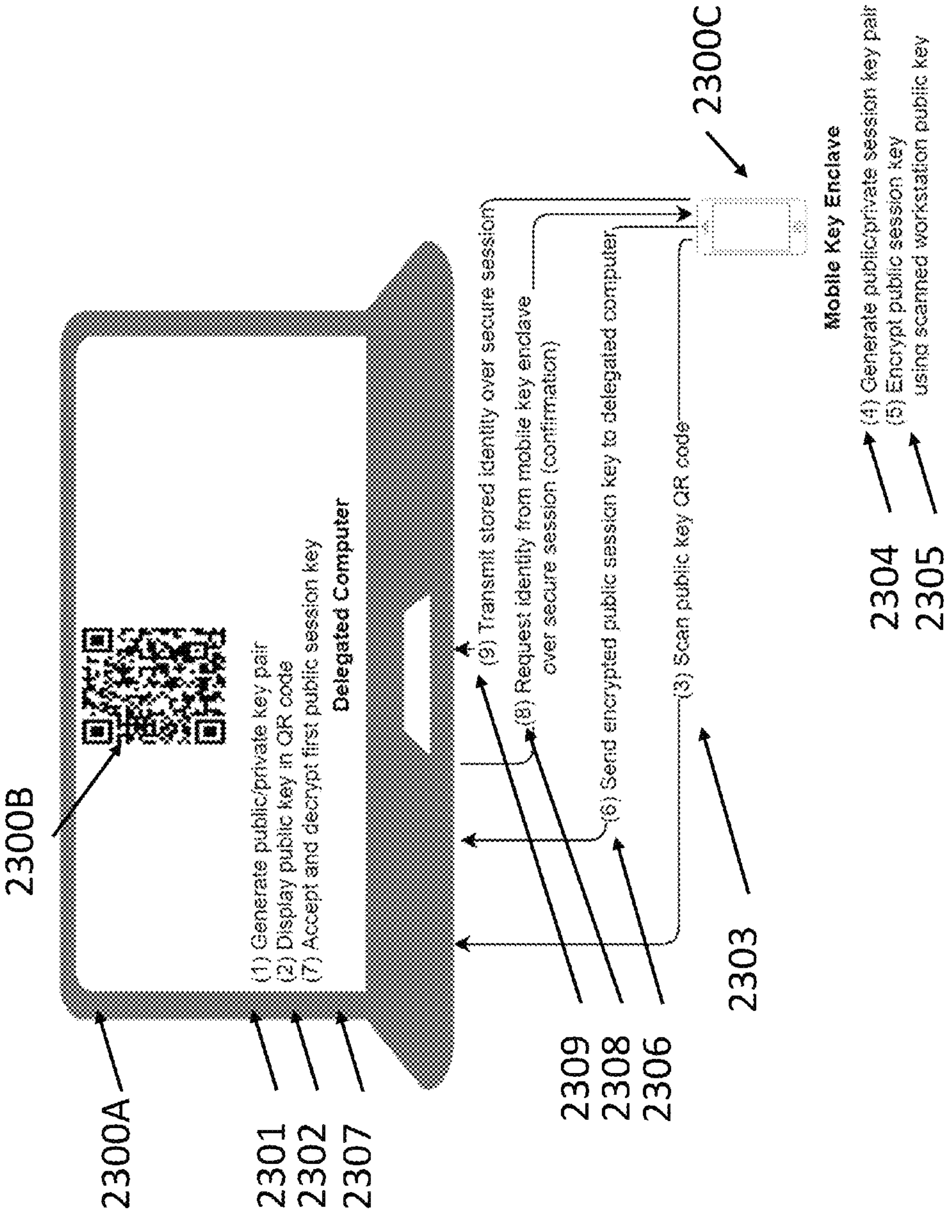
FIG. 23 shows a key enclave pairing with a workstation delegate according to an exemplary embodiment.

In some embodiments, the mobile key enclave generates and stores an SSH key pair and delegates key pair access to a delegate computer, as in FIG. 5. In some embodiments, in order to delegate access to one or more private keys, the mobile key enclave pairs with a computer that displays a newly generate public key in a QR code. Once paired, the delegate computer can request private key operations from the mobile key enclave. For example, as illustrated in FIG. 23, (1) a delegated computer 2300A can generate a public/private key pair in step 2301 and (2) display a public key using a QR code 2300B in step 2302. A mobile key enclave 2300 can (3) scan the public key QR code 2300B in step 2303, (4) generate an enclave asymmetric session key pair in step 2304, and (5) encrypt the enclave public session key using the scanned workstation public key in step 2305. The mobile key enclave 2300C can then (6) send the encrypted enclave public session key to the delegated computer 2300A in step 2306. The delegated computer 2300A can (7) accept and decrypt the first enclave public session key in step 2307 and (8) request an identity from the mobile key enclave 2300C over a secure session in step 2308. The mobile key enclave 2300*c* can (9) transmit the stored identity over the secure session in step 2309. In some embodiments the key enclave may, for example, pair with a cloud instance using the same or similar QR code logic that is used for pairing with a workstation.

Key Generation

In some embodiments, the key enclave generates a public/private SSH key pair. In some embodiments, the key pair stored by the key enclave for SSH authentication is also used for other purposes such as PGP signatures. In some embodiments, the key pair is generated and/or stored in secure hardware designed to prevent extraction of the private portion of the key pair. In some embodiments, the private key is stored in secure hardware that requires user authentication before performing private key operations. In some embodiments, a public and/or private key may be imported by scanning an encoding of it with a mobile phone key enclave camera. In some embodiments, a private key to import may be transmitted over a secure session established between key enclave and delegated computer. In some embodiments, the importing of the private key may be automatically initiated by software running on the computer storing said private key. In some embodiments, the key enclave may require conditions to be met before importing a private key, such as authentication or confirmation from a key enclave administrator, verification of one or more cryptographic signatures by a potentially-trusted party, or receiving of the key over a specific communication channel such as radio or camera.

Pairing

Figure 22B:
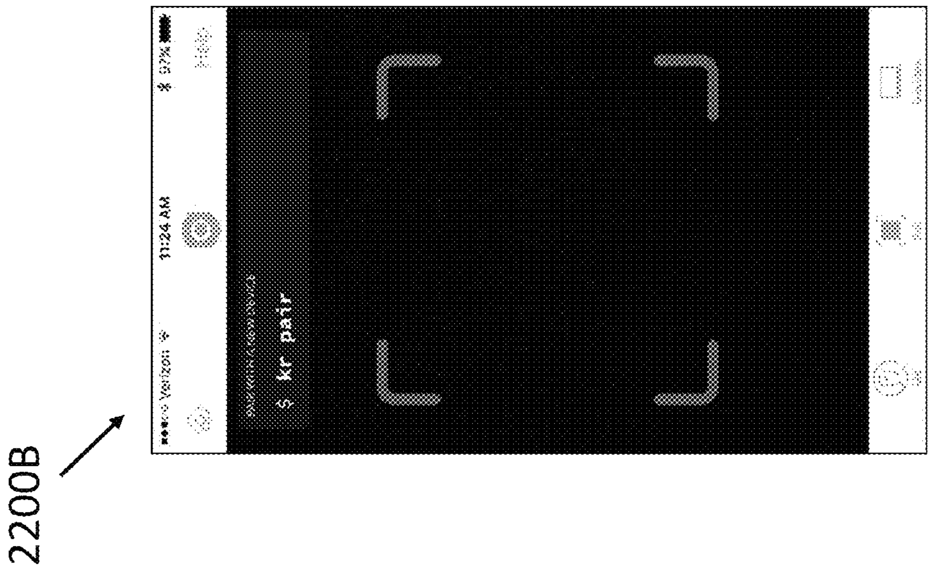
FIGS. 22A through 22H show a key enclave pairing with a workstation delegate according to an exemplary embodiment.
Figure 22A:
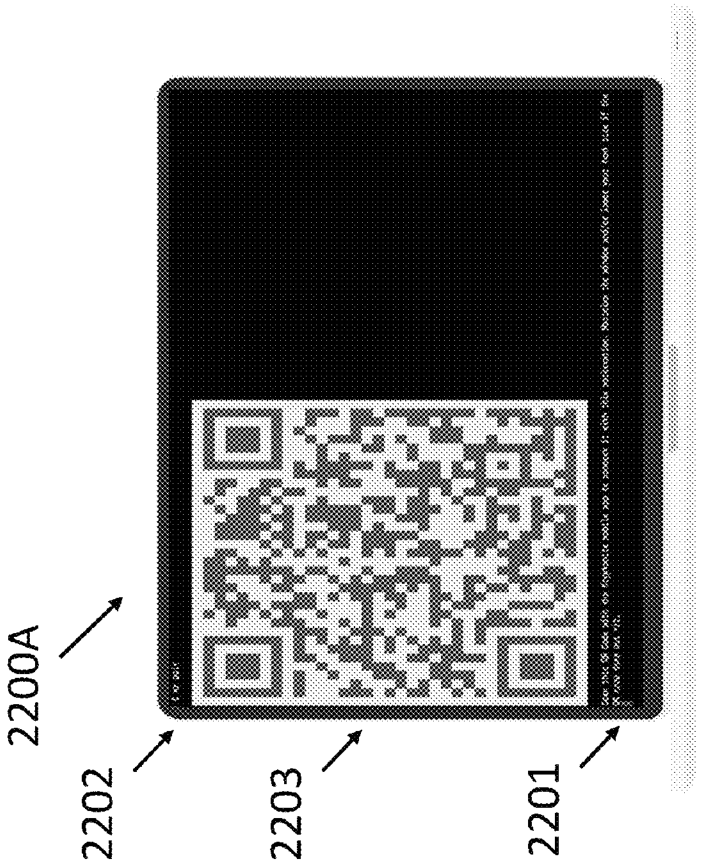
Figures 22C, 22D, 22E:
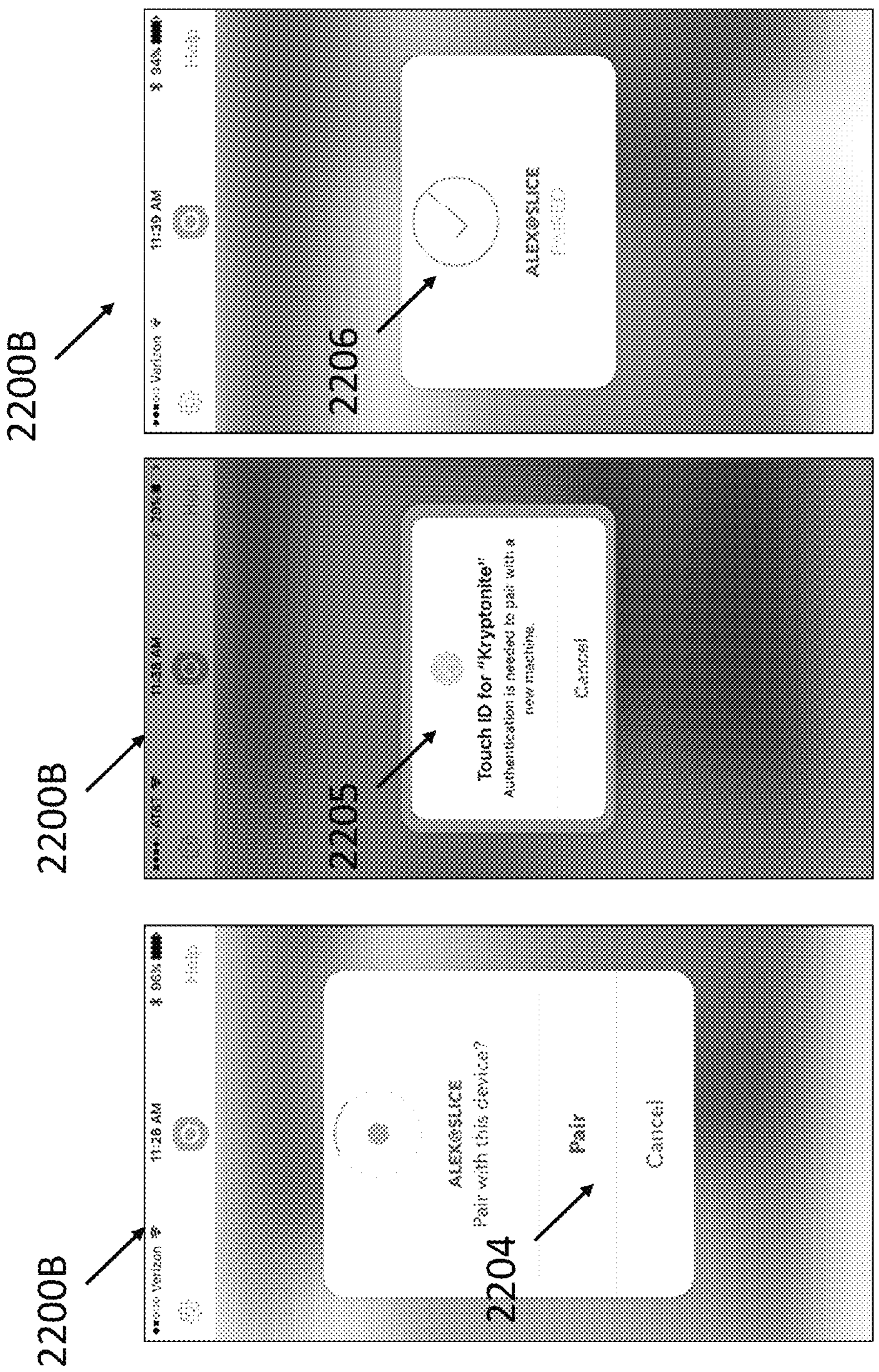

In some embodiments, the key enclave can be paired with a workstation delegate. The key enclave owner initiates a pairing by invoking a command, e.g., the "kr pair" command 2201, e.g., in a terminal shell 2202 on the workstation delegate 2200A as shown in FIG. 22A. In some embodiments, interfaces such a graphical user interface may be used. A QR code 2203 is printed to the terminal shell 2202 as shown in FIG. 22A. In some embodiments, a key enclave 2200B device's camera is used to scan this QR code 2203 as shown in FIG. 22B. In some embodiments, a QR code 2203 encodes a public key corresponding to a private key generated by the workstation delegate 2200A. The key enclave owner confirms their intention to pair with this workstation 2200A by selecting "Pair" 2204 on the key enclave 2200B, shown in FIG. 22C. In some embodiments, this is confirmed by displaying the name of the workstation 2200A in a confirmation dialogue. Upon the positive confirmation by the key enclave owner, local authentication to the key enclave device 2200B is requested from the key enclave owner in display area 2205 as shown in FIG. 22D. In some embodiments, local authentication may require the key enclave owner to enter a passcode or biometric data to authenticate with the key enclave itself. Upon successful local authentication, the key enclave 2200B generates an enclave asymmetric cryptographic session key pair and encrypts the generated public key to the public key presented by the workstation delegate 2200A. In some embodiments, a workstation delegate 2200A receives an encrypted session public key from an enclave and decrypts and stores the public key. In some embodiments, a workstation delegate 2200A generates a new public/private key pair before pairing with a new enclave. In some embodiments, only the first encrypted enclave session public key is decrypted and stored by the workstation delegate 2200A. In some embodiments, a workstation delegate 2200A uses the stored enclave session public key to encrypt and authenticate communication to the key enclave 2200B. In some embodiments, a key enclave 2200B authenticates requests from workstation delegates 2200A using the corresponding workstation session public key presented in the QR code 2203. In some embodiments, a workstation delegate 2200A sends a request to a key enclave 2200B using the stored enclave session public key and awaits a response from the key enclave 2200B to confirm successful pairing with the key enclave 2200B. In some embodiments, the public/private key pair generated by the workstation delegate 2200A is a Curve25519 key pair. In some embodiments, the enclave session public key is encrypted to the workstation delegate 2200A public key using the X25519 algorithm for key agreement, the XSalsa20 cipher for encryption, and Poly1305 for authentication. In some embodiments, the workstation and enclave session public keys are used to authenticate and encrypt the session using the same X25519, XSalsa20, and Poly1305 algorithms. In some embodiments, pairing completion may be shown to the user in display area 2206 as illustrated in FIG. 22E.

In some embodiments, the key enclave can be paired with a workstation delegate. The key enclave owner initiates a pairing by invoking a command, on the key enclave, which displays a QR code on the key enclave. In some embodiments, a workstation's camera is used to scan this QR code. In some embodiments, a QR code encodes a public key corresponding to a private key generated by the key enclave. The workstation owner confirms their intention to pair with this key enclave. In some embodiments, this is confirmed by displaying the name of the key enclave in a confirmation dialogue. Upon the positive confirmation by the workstation owner, local authentication to the key enclave device is requested from the key enclave owner. In some embodiments, local authentication may require the key enclave owner to enter a passcode or biometric data to authenticate with the key enclave itself. Upon successful local authentication, the workstation generates an asymmetric cryptographic session key pair and encrypts the generated public key to the public key presented by the key enclave. In some embodiments, a key enclave delegate receives an encrypted session public key from an enclave and decrypts and stores the public key. In some embodiments, a key enclave delegate generates a new public/private key pair before pairing with a new enclave. In some embodiments, only the first encrypted enclave session public key is decrypted and stored by the key enclave delegate. In some embodiments, a key enclave uses the stored enclave session public key to encrypt and authenticate communication to the workstation delegate. In some embodiments, the public/private key pair generated by the key enclave is a Curve25519 key pair. In some embodiments, the session public key is encrypted to the key enclave public key using the X25519 algorithm for key agreement, the XSalsa20 cipher for encryption, and Poly1305 for authentication. In some embodiments, the workstation and enclave session public keys are used to authenticate and encrypt the session using the same X25519, XSalsa20, and Poly1305 algorithms.

Request Approval and Rejection

In some embodiments, paired delegate devices submit requests to the key enclave to (1) query the enclave's identity and (2) perform private key signatures.

Figure 24:
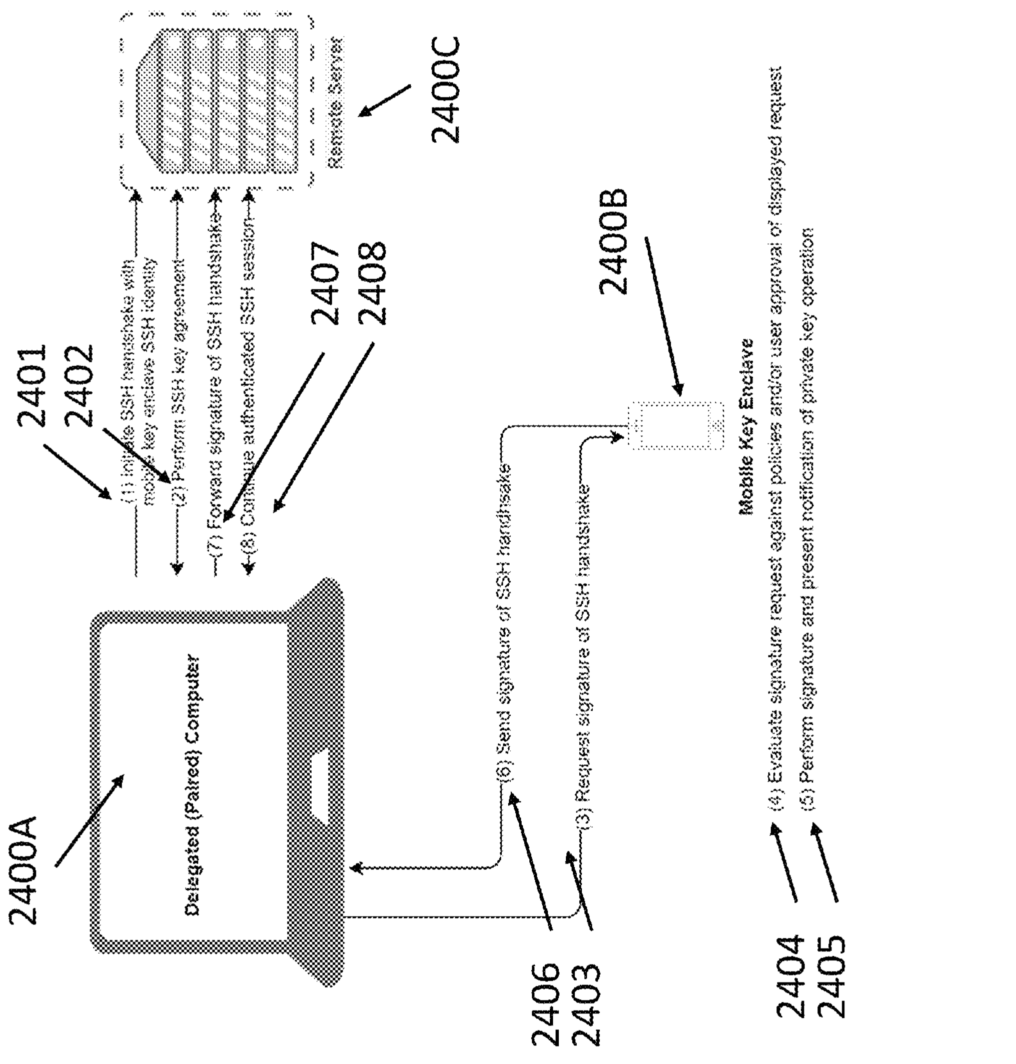
FIG. 24 shows a paired computer performing SSH authentication using the mobile key enclave's identity by delegating private key signatures to the mobile key enclave according to an exemplary embodiment.

In some embodiments, a delegate device 2400A requests signing of SSH session data. As illustrated in FIG. 24, in some embodiments a paired computer 2400A performs SSH authentication using the mobile key enclave 2400B's identity by delegating private key signatures to the mobile key enclave 2400B. Steps 2401 and 2402 depict the original SSH protocol key agreement between the paired delegate device 2400A and a remote server 2400C, steps 2403-2406 depict the signature request, user approval, policy enforcement, and signature response between the delegate device 2400A and the mobile key enclave 2400B, and steps 2407-2408 depict the conclusion of the SSH protocol between the paired delegate device 2400A and the remote server 2400C using the requested signature returned by the mobile key enclave 2400B. The delegated (paired) computer 2400A (1) initiates SSH authentication with a mobile key enclave 2400B SSH identity on a remote server 2400C in step 2401. The delegated (paired) computer 2400A and the remote server 2400C (2) perform an SSH key agreement in step 2402. The delegated (paired) computer 2400A (3) requests a signature of the SSH session data from the mobile key enclave 2400B in step 2403. The mobile key enclave 2400B (4) evaluates the signature request against policies and/or user approval of the displayed request in step 2404 and (5) performs the signature and presents notification of the private key operation in step 2405. The mobile key enclave 2400B (6) sends the signature of the SSH session data to the delegated (paired) computer 2400A in step 2406. The delegated (paired) computer 2400A forwards the signature of the SSH session data to the remove server 2400C in step 2407. The delegated (paired) computer 2400A and the remote server 2400C (8) continue authentication of the SSH session in step 2408. In some embodiments, the SSH session data includes the fields described in the SSH MSG USER-AUTH REQUEST in RFC 4252 section 7. In some embodiments, the SSH session data is the hash of a shared secret between the remote server and user.

Figure 22G:
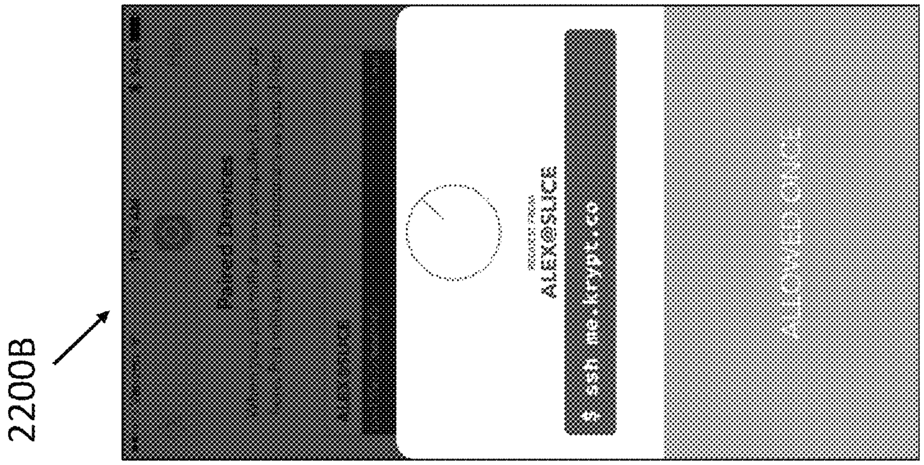
Figure 22F:
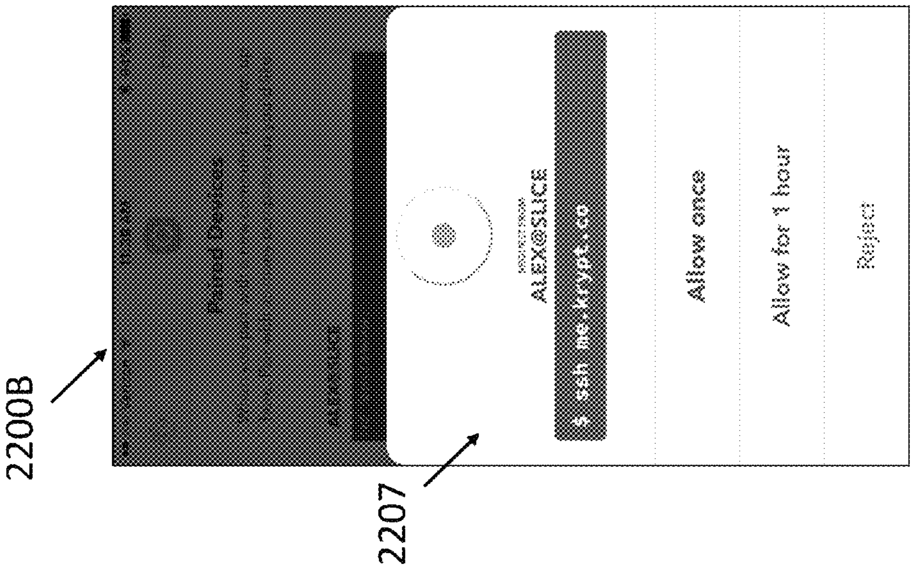

In some embodiments, the enclave 2200B presents the request to the user as shown in FIG. 22F in a display area 2207, the enclave 2200B receives the user's approval or rejection, and upon approval the enclave responds to the delegated device with the signature as shown in FIG. 22G. In some embodiments, the key enclave requires a user to authenticate locally with fingerprint, biometric, or password authentication before processing a user's approval or rejection of a request.

In some embodiments, the workstation delegate sends approval requests over a push notification service such as Apple Push Notification Service or Firebase Cloud Messaging, or over Bluetooth Low Energy. In some embodiments, said notifications awaken the key enclave device even if the key enclave device is not running or is suspended. In some embodiments, these notification payloads contain the request body, encrypted and authenticated with the symmetric session key established in the pairing process.

In some embodiments, requests are transmitted over an outbound-only connection so as not to be filtered by inbound firewall rules.

Policies

Figure 22H:

In some embodiments, the key enclave contains policies to determine whether to accept or reject a request from a delegated computer. In some embodiments, an enclave presents the user with the option to allow a specific type of request for a specified time duration, as in FIG. 3A. In some embodiments, an enclave contains a policy that allows or rejects requests based, for example, on type of transport, IP address, geolocation, the contents of the request, the history of other requests, and/or approval or rejection by other enclaves or computers. FIG. 4 shows an example where a user has selected the option of allowing the request once and a confirmation is displayed. As illustrated in FIG. 22H, in some embodiments, the user may look at a list of approved requests 2208 displayed on the key enclave 2200B sent from a paired workstation 2200A. The user may adjust the frequency of confirmation for approval requests on a per workstation basis. The display may also include an "Unpair" button 2209 which the user taps to remove the paired workstations ability to send approval requests and unpairs the workstation.

Adding Public Key to Services or Servers

In some embodiments, a paired delegate can assist the key enclave owner in uploading the key enclave public key to services such as GitHub, Bitbucket, Amazon Web Services, Google Cloud. In some embodiments, a paired delegate can programmatically login to a server and add the key enclave owner's public key to the access control list on the server. In some embodiments, software on the delegate device authenticates to a remote server through a pre-established authentication method and adds the key enclave's identity to said remote server's access control list, allowing the credential stored in the key enclave to be used to authenticate to said remote server. In some embodiments, software on the delegate device or key enclave then disables one or more pre-existing authentication methods that may be considered less secure than using the key enclave to authenticate.

Audit Logging

In some embodiments, a key enclave may record some or all of the data associated with a private key signature including but not limited to the date and time of the signature, the remote server's IP address, the key enclave's GPS location, and/or the requested SSH command in the request. The key enclave may record this information to produce the key enclave's audit log.

In some embodiments, the key enclave can perform data analysis or machine learning techniques to detect possible intrusions and/or malicious or abnormal SSH logins. In some embodiments, the key enclave performs a clustering analysis on audit log entries to identify potentially abnormal incoming operation requests and prevents an incoming operation or alerts the key enclave administrator as a result of said analysis.

In some embodiments, the key enclave can send the audit log to a remote server and/or computer, and/or another application running on the key enclave. This can allow the audit log to be monitored and/or analyzed by the remote server and/or computer, and/or other application running on the key enclave, for example, to detect possible intrusions or malicious SSH logins.

SSH Client Integration

In some embodiments, an SSH client installed on the workstation delegate communicates with a key enclave. The SSH client may, for example, communicate using a PKCS11 module and/or an SSH agent.

PKCS11 Module

In some embodiments, an SSH client on a delegate computer dynamically links a PKCS11 module that allows communication with a key enclave. In some embodiments, an SSH client links a PKCS11 module that forwards communication to a key enclave through software running on the delegate computer. In some embodiments, an SSH client on the delegate computer is configured to use said PKCS11 module to communicate with the key enclave.

SSH Agent

In some embodiments, an SSH client on the delegate computer communicates with an SSH agent that forwards communication to a key enclave. In some embodiments, an SSH client requests one or more signatures from an SSH agent that requests one or more signatures from a key enclave and returns one or more signatures to the SSH client. In some embodiments, an SSH client is configured to use said SSH agent to communicate with the key enclave.

SSH Host Authentication

Figure 26:
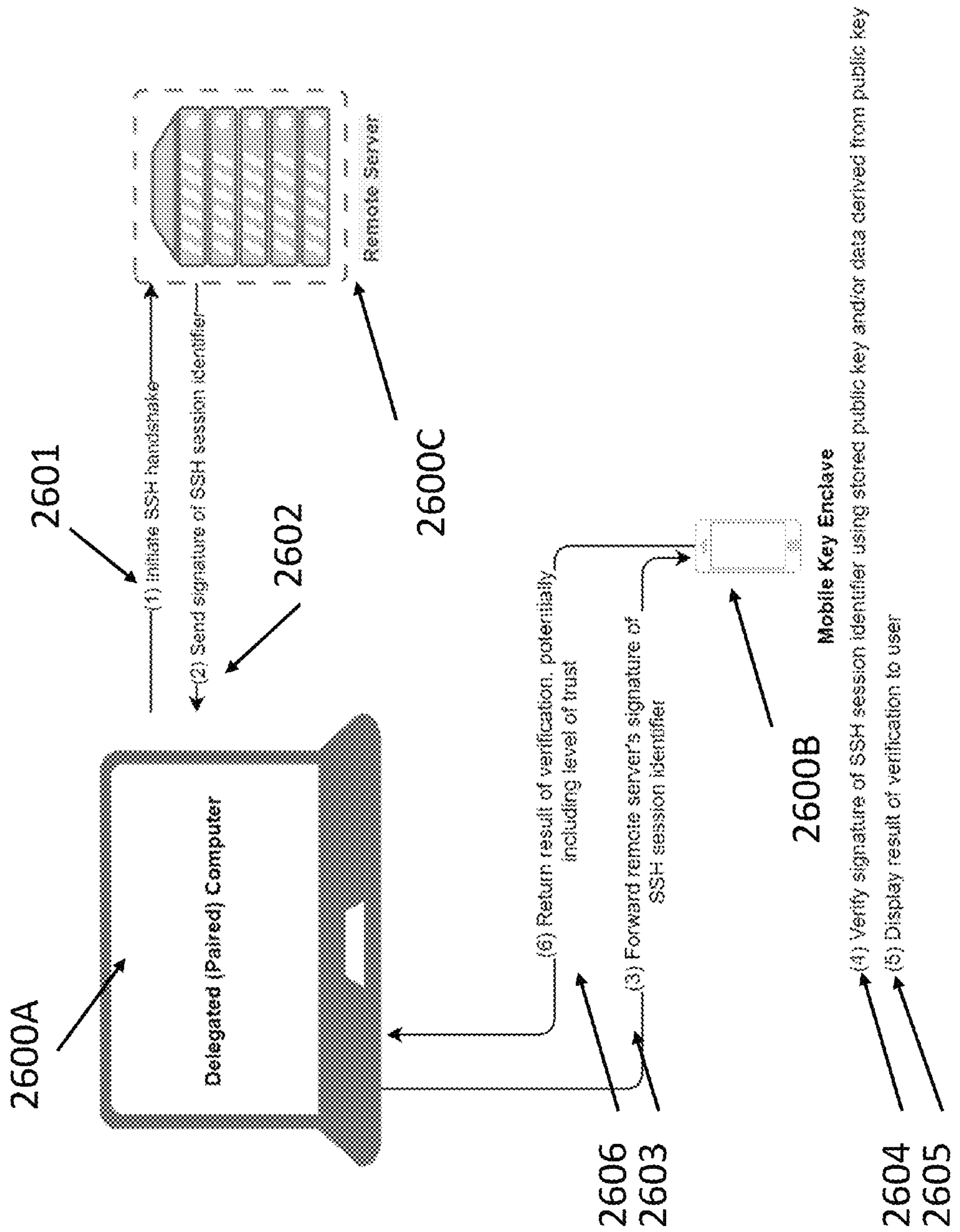
FIG. 26 shows a key enclave that stores one or more public keys or data derived from one or more public keys verifies the signature of SSH session data as requested by a delegate computer according to an exemplary embodiment.

In some embodiments, a key enclave that stores one or more public keys or data derived from one or more public keys verifies the signature of SSH session data as requested by a delegate computer, as in FIG. 26. In some embodiments, the delegate computer 2600A begins an SSH session with a remote server 2600C in step 2601 and the remote server 2600C sends a signature of the SSH session data in step 2602. In some embodiments, an SSH client proxies traffic to another locally-running program on the delegate computer 2600A that forwards the public key and SSH session data signature sent by the remote host that is being accessed via SSH to a paired Key Enclave 2600B in step 2603. In some embodiments, the Key Enclave 2600B verifies that the provided remote host SSH session data signature is a signature made by the provided remote host public key in step 2604 and signs the same SSH session identifier as in the delegate's SSH authentication request. In some embodiments, the Key Enclave 2600B displays to the user the result of the verification in step 2605. In some embodiments, the Key Enclave 2600B verifies the host's signature with at least one public key in a list of known host public keys stored on the key enclave 2600B or remote server 2600C, and the key enclave sends the requested signature only if said verifications succeed in step 2606.

Figures 25A, 25B, 25C:
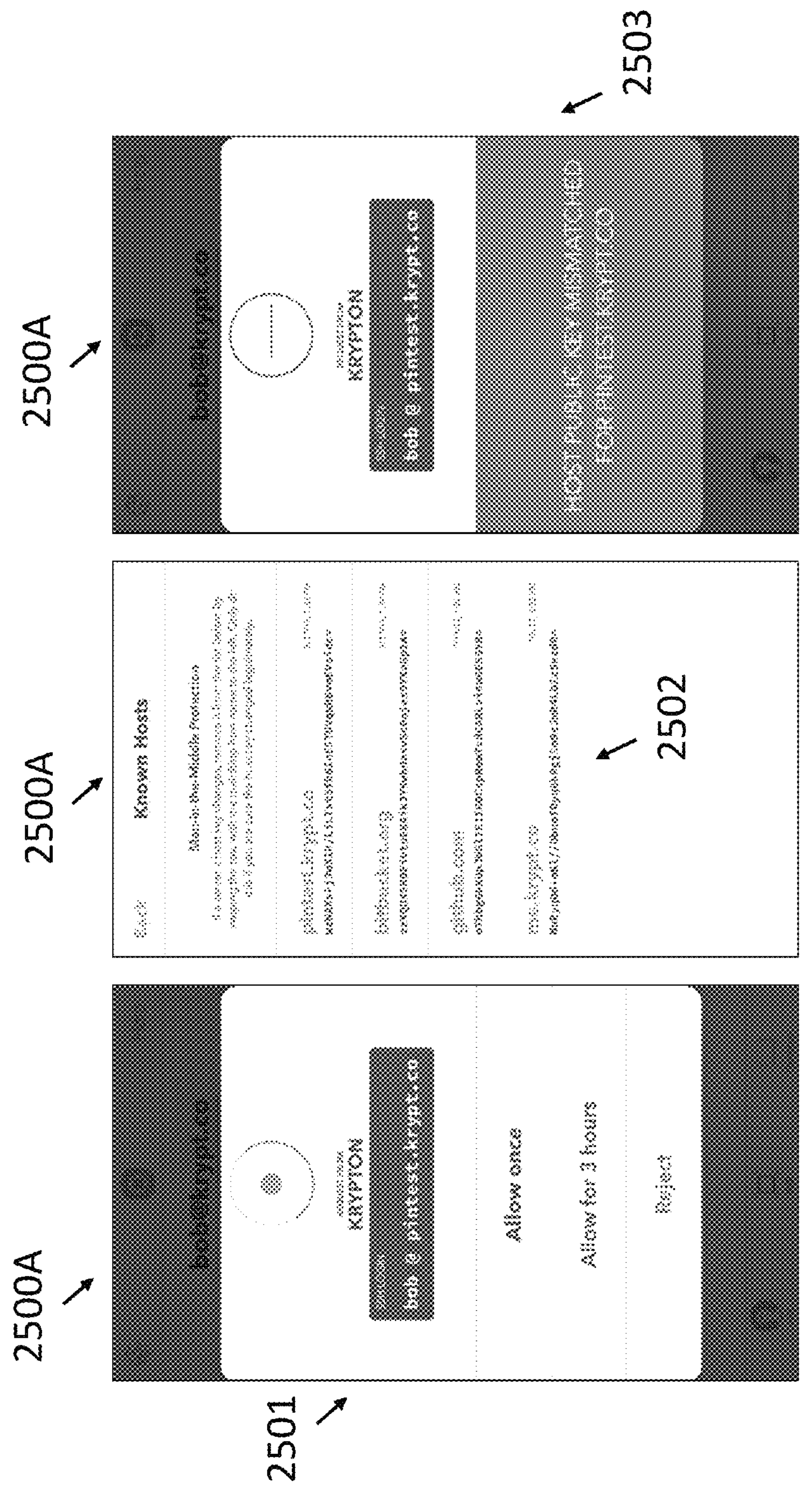
FIGS. 25A through 25C show a process for a key enclave pairing with a workstation delegate according to an exemplary embodiment.

In some embodiments, the Key Enclave 2500A requests permission from the Key Enclave user to approve a request to communicate with a remote host using user interface 2501 and compares the public key offered by the remote host that is the target of the SSH connection to its list of trusted remote hosts as illustrated in FIG. 25A. In some embodiments, the Key Enclave 2500A will display its list of known trusted hosts 2502 as shown in FIG. 25B and a user may edit the list of known trusted hosts. In some embodiments, a Key Enclave 2500A will inform the Key Enclave user if the public key for the remote host being accessed does not match the known hosts via display 2503 as shown in FIG. 25C and will send back a reject message to the delegate computer. In some embodiments, the Key Enclave 2500A will reject a request if the public key of the SSH target machine is not on a permitted list. In some embodiments, the Key Enclave 2500A compares the public key offered by the remote host that is the target of the SSH connection to a list of untrusted remote hosts, and sends back a reject message to the delegate computer if the public key of the SSH target machine is on the untrusted list.

In some embodiments, upon an SSH authentication request from a workstation delegate, the Key Enclave performs the SSH authenticated key agreement with the remote host, performing any configured remote host public key verification, and upon approval, returns the SSH secret session key to the delegate. In some embodiments, the delegated workstation resumes the SSH session with the returned SSH secret session key. In some embodiments, the workstation delegate connects to a remote host and temporarily proxies the traffic to the Key Enclave. In some embodiments, the Key Enclave performs SSH key agreement with the remote server over the delegate's proxy and returns the SSH secret session key to the delegate and the delegate continues the session. In some embodiments, the Key Enclave does not return the secret session key, but instead monitors the contents of the SSH session as a proxy between the delegate and remote server, performing the encryption and authentication in both directions using the SSH secret session key. In some embodiments, the Key Enclave allows the SSH session to continue or stops it based on configured policies and the contents of the session such as the commands being requested by the delegate or the length of the response of the remote server.

OpenPGP Signing

In some embodiments, the delegate computer sends a request to the Key Enclave for an OpenPGP signature of text or binary data. In some embodiments, the Key Enclave requests permission from the Key Enclave user to approve the request, and in some embodiments this request contains the full or partial contents of the text or binary data that is to be signed.

Git Commit and Tag Signing

Figure 27A:
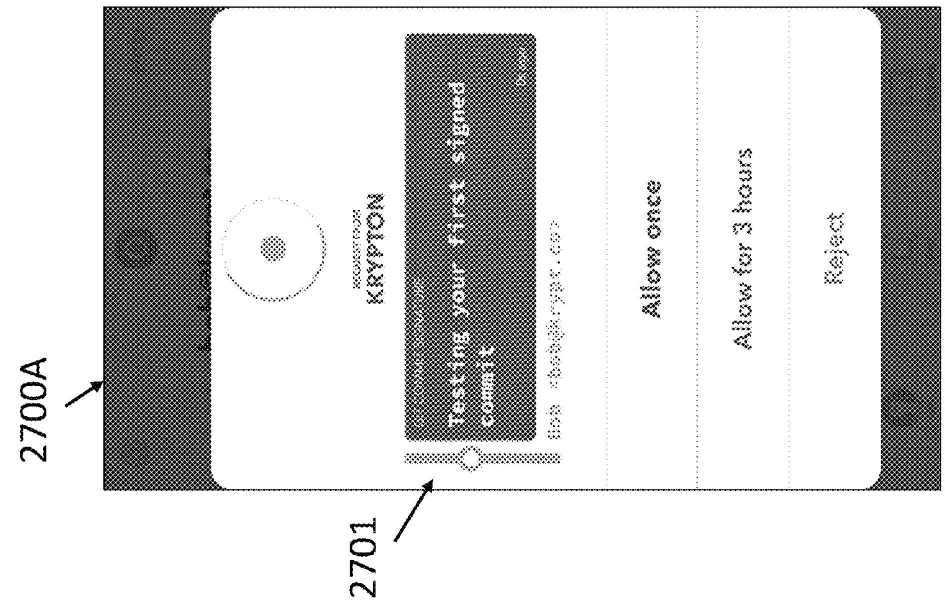
FIG. 27A shows a Key Enclave displaying the commit object to be signed and wait for user approval or rejection according to an exemplary embodiment and FIG. 27B shows a Key Enclave displaying the tag object to be signed and wait for user approval or rejection according to an exemplary embodiment.
Figure 27B:
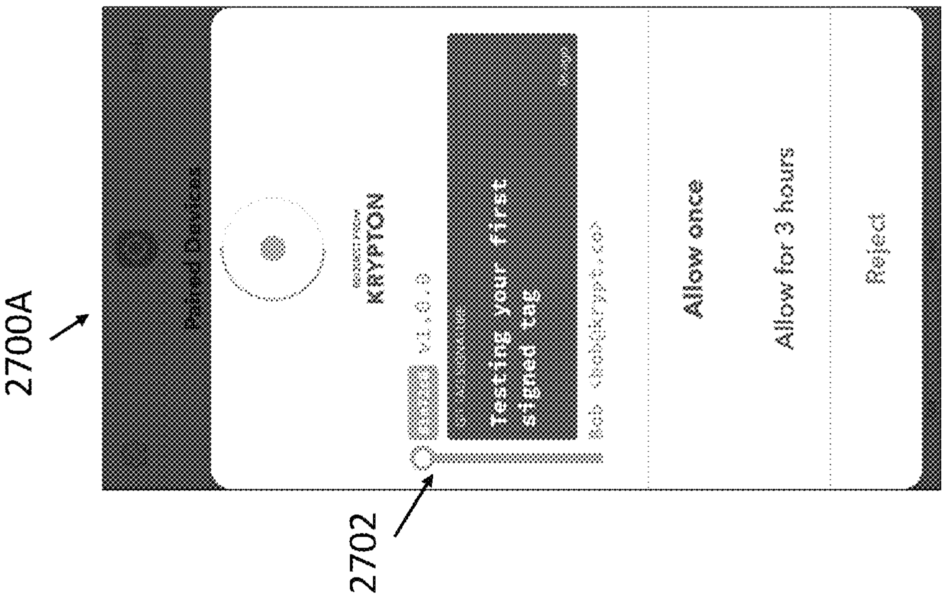

In some embodiments, the delegate computer forwards a request for the signing of a Git commit or tag by sending the object to be signed to the Key Enclave. In some embodiments, a git commit or git tag signature request to the key enclave includes the git commit or git tag data. git commit or git tag data are described further in GitSignatures. In some embodiments, a Key Enclave 2700A will display the commit object 2701 to be signed and wait for user approval or rejection as shown in FIG. 27A. In some embodiments, a Key Enclave 2700A will display the tag object 2702 to be signed and wait for user approval or rejection as shown in FIG. 27B. If the user approves, a hash of the request is computed and signed by a private key held on the Key Enclave. The resulting signature is sent back to the delegate computer for inclusion in the Git commit or tag object.

Multi-Party Authentication

In some embodiments, a key enclave may implement multi-party authentication that uses more than one key enclave to approve a request by signing an object or performing a cryptographic operation with their private keys. In some embodiments of this approach, a delegated computer can request that a key enclave present multiple signatures for a given request such as logging into a specific host. The key enclave may communicate with other key enclaves to coordinate the delivery of sufficient digital signatures for the approval of the request. In such an embodiment, each key enclave may ask for approval from its principal, thus implementing multi-party authorization.

Web Browser Compatibility

Figure 28:
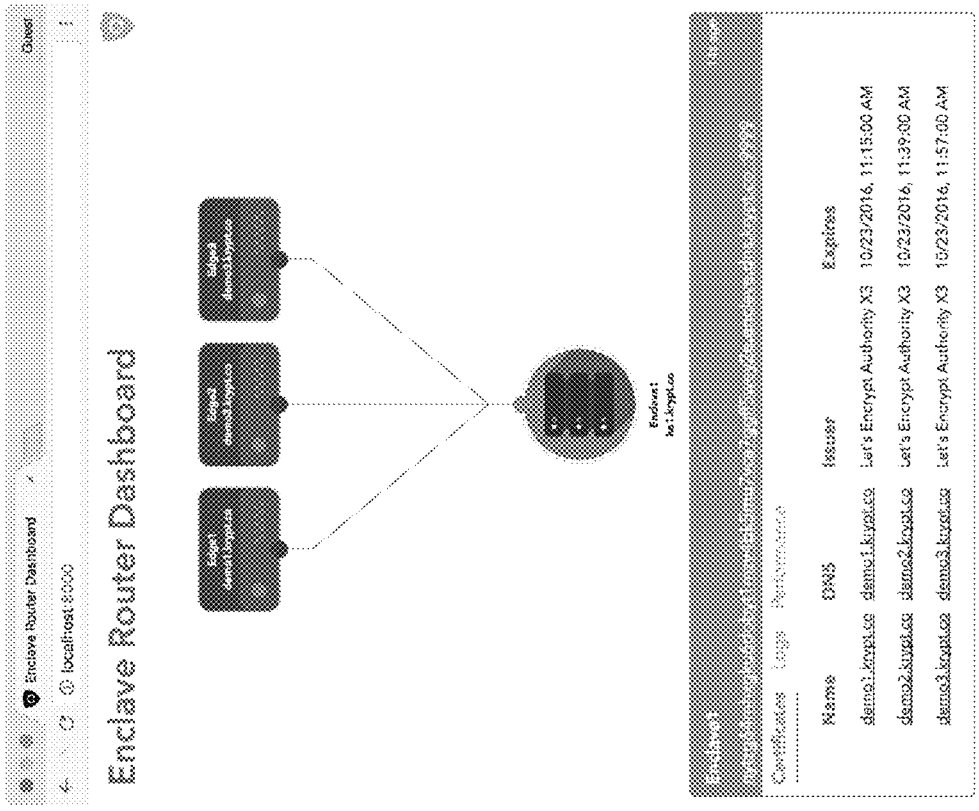
FIG. 28 shows a web-based visual interface for viewing and controlling the delegation between Key Enclaves and delegates according to an exemplary embodiment.

In some embodiments, the use of X.509 certificates and TLS for authentication between microservices affords compatibility with web-browser client certificates. In some embodiments, an "admin" role client certificate can be administered by the organization CA and installed into a web browser to allow administrators to securely access microservices right in their web browsers. In some embodiments, the Enclave Router Dashboard 2800, as shown in FIG. 28, is a web-based visual interface for viewing and controlling the delegation between Key Enclaves and delegates. In FIG. 22A-B A user initiates pairing by typing command "kr pair" in (A) and then scans the QR Code with Mobile Key Enclave in (B). In FIG. 22 C-E User confirms the workstation by tapping "Pair" in (C) then approves the action by authenticating with the Mobile Key Enclave in (D) and then the pairing completion is shown to the user in (E). In FIG. 22F-G when a private key request is initiated by a paired device, the user gets a request detailing the requested operation as shown in (F). Upon the user allowing the request, a confirmation is shown to the user as in (G). In FIG. 22H The user may look at a list of approved requests sent from a paired workstation as shown in (H). The user may adjust the frequency of confirmation for approval requests on a per workstation basis. (H) also shows an "Unpair" button which the user taps to remove the paired workstations ability to send approval requests and unpairs the workstation.

Hash-URL Object Service

In some embodiments, a Hash-URL or HURL is a standard URL that contains a 32-byte hash in the path of the URL. This hash is equal to the hash of the resource located at the URL. Hence, in some embodiments, given only an HURL, one can verify the integrity of the HTTP response by looking only at the data and the 32-byte hash in the URL path.

In some embodiments, the HURL Object Service comprises a system that stores and serves arbitrary data objects where each data object can be accessed by a standard HURL. For example, in some embodiments, the HURL Object Service comprises and/or performs one or more of the following:

1. An API method to publish an arbitrary sequence of data bytes where this resource can be access by the hostname of the HURL Object Service with the hash of the sequence of data bases as the appended path name
2. An API method to retrieve a data object by specifying its hash In some embodiments, the procedure for verifying the integrity of a data object located at an HURL comprises one or more of the following steps:

1. Send an HTTP request to the HURL
2. Hash the response data object
3. Compare the hash with that of the hash in HURL path
4. The data has integrity if and only if the hashes are equivalent Web-Based Public Key Login In some embodiments, App users can log into a website using their app identity. For example, in some embodiments, first, a web site presents a challenge in the form of a QR code that encodes the login URL and a random nonce. The user then scans the QR code, causing app to sign the challenge and send it to the login URL. Upon verifying the signature of the challenge, the website now knows the identity this user has access to, without the entry of any username or password.

In some embodiments, since the app can prove the public key identity of the principal to the website, the website may use the principal's public key to encrypt data for the principal user. In some embodiments, the type of data websites encrypt could be personal information entered on the site and email or other direct communication.

Additionally, in some embodiments, since the app can prove the public key identity of the principal to the website, the website may query the witness statements about a principal and preload account information on the website with attributes from witness statements.

Using Delegated Keys to Implement System Security and Authentication

So far, we have described the identity and trust management system on the Key Enclave in accordance with some embodiments, as well as the framework to delegate an identity to another machine via a secure connection to the Key Enclave in accordance with some embodiments. Next, we will describe services that can be operated by a central authority in accordance with some embodiments. These services do not need to be trusted, meaning that in some embodiments end-clients do not assume the integrity or privacy of data obtained from these services. In fact, in some embodiments, clients can cryptographically verify responses from these services.

In some embodiments, any or all of the services in this section may be hosted by one or more enterprises, individuals, or organizations in a publicly or privately accessible manner. Any devices using these services may use multiple of the same type of service hosted by the same or different parties and combine results from some or all of the accessed services.

In some embodiments, a primary goal of these services is to increase ease of use for end users of the system and to provide reliable communication channels between principals and devices. Thus, in some embodiments, these services are not trusted, and instead all communication along these channels are independently verified.

In some embodiments, encrypted data advantageously does not need to be annotated with instructions on how to decrypt. Hence, an encrypted object can simply be sent around or published publicly.

Similarly, in some embodiments, signed data does not need to be annotated by the cryptographic signature. Any principal can determine which principals have signed an object simply by knowing the object.

Opener Service

In some embodiments, the opener service is a representational state transfer (REST) service that maintains a database of opener objects. This service can be queried to lookup openers or to publish new openers. Openers are associated with an encrypted object, and typically users' devices can lookup openers by taking the hash of an encrypted object and querying the opener service with this hash.

Openers

In some embodiments, an opener can be described as a small cryptographic "program" that decrypts an object. In some embodiments, an opener contains the following properties Public Key Hash
Wrapped Key where the "Public Key Hash" identifies principal that can use this opener, by their public key. In some embodiments, the wrapped key is a nonce object symmetric key encrypted with the principal's asymmetric public key.

In some embodiments, given a list of openers and a protected object, a principal can iterate through the list and find the opener created for them by looking at the public key hash on each opener. Next, the principal asymmetrically decrypts the wrapped key using their private key. Finally, the principal uses the decrypted wrapped key to symmetrically decrypt the protected object.

Openers Indexed by the Hash of the Protected Object

In some embodiments, a main utility of the opener service is that a list of openers is indexed by the hash of a protected object.

For example, in some embodiments, to protect an object for a list of principals {Alice, Bob, Carl}, the following exemplary procedure is followed:

1. Generate a new random nonce object key.
2. Compute the ciphertext by encrypting the object with the nonce key.
3. Compute the hash of the ciphertext
4. Create an opener for each of {Alice, Bob, Carl} by encrypting the nonce object key with each of {Alice, Bob, Carl} respective public keys.
5. Publish the list of openers {$Opener_{Alice}$, $Opener_{Bob}$, $Opener_{Carl}$} indexed by the hash of the ciphertext computed in step (3) to the opener service.

In some embodiments, the creator of the protected object can then, for example, publish the protected object anywhere like a 3rd party cloud storage service (Amazon AWS, Dropbox, Google Cloud), or send it to recipients directly via email, phone, etc.

In some embodiments, upon receiving a protected object, any principal can take the hash of the protected object and query the opener service with this hash. In some embodiments, if this hash has been registered, the opener service returns a list of openers indexed under this hash. For example, if Alice receives the protected object above, she could find the opener with her public key hash, decrypt the wrapped symmetric key using the asymmetric private key, and decrypt the protected object using the decrypted symmetric key.

Openers for Principal Sets

In some embodiments, a key that corresponds to a set of principals is generated as follows:

1. Generate a new nonce public key pair for the principal set.
2. Create an opener for each of the members of the principal set {Alice, Bob, Carl} by encrypting the principal set private key with each of {Alice, Bob, Carl} respective public keys.
3. Publish the list of openers {$Opener_{Alice}$, $Opener_{Bob}$, $Opener_{Carl}$} indexed by the hash of the principal set public key computed in step (1) to the opener service.

The public key corresponding to the principal set can then be published by the WOTAPI, and used by other principals to encrypt keys in openers to grant access to any principal in the principal set. If the user is part of a principal set they can recover the principal set private key from the principal set opener, and use the principal set private key to open other openers. The principals in a set can be updated by changing the set of openers associated with the principal set public key hash. Principal sets can include openers for the private keys of other principal sets, permitting the establishment of hierarchical protection rules.

In some embodiments, as a performance optimization objects can be encrypted with an asymmetric key by first encrypting the object with a nonce symmetric key, and then encrypting the nonce symmetric key with the asymmetric key.

Openers Indexed by Initialization Vector of Encryption

In some embodiments, openers are indexed by the randomly generated token used as the initialization vector of the protected object's encryption. This initialization vector is stored at the beginning of a protected object, followed by the ciphertext. When accessing a protected object, the beginning of the protected object containing the initialization vector is looked up in the Opener Service. Indexing openers by the initialization vector stored at the beginning of the protected object allows the publishing of an opener protecting an object that is still in the process of being fully encrypted, in which case the protected object's hash is not yet computable (e.g. in the case of encrypting a stream of data). In this way, a stream may also be decrypted before the entire ciphertext of the protected object is available. The decrypting party first receives the initialization vector, looks up an opener it has access to in the Opener Service, then begins decrypting the protected object as each part of the ciphertext arrives.

Wrapped Keys for Revoked Principal Keys are Deleted

In some embodiments, a revocation may indicate the compromise of a key. In some embodiments, the Opener Service deletes any wrapped keys encrypted to a public key that has been revoked, preventing any party that has compromised a key from gaining access to protected objects that the compromised key can access. The Opener Service periodically checks for new revocation statements published to the WOTPKI and performs the corresponding wrapped key deletions when finding a new revocation.

In some embodiments, when a key revocation is discovered by the Opener Service, the wrapped key in any openers pertaining to the revoked public key hash are deleted, but the public key hashes inside the openers are kept, allowing the party that created the opener to remember that the principal with the stored public key hash had access to the corresponding Protected Object. Keeping the public key hashes of openers corresponding to revoked public keys allows the creator of the Protected Object to create a new opener for the principal whose key has been revoked. The creation of new openers may occur once the principal whose key has been revoked has established a new profile and the Protected Object creator has established trust that this new profile is owned by the revoked principal.

Indirect Key Protected Objects for Granting Access to a Set of Principals

In some embodiments, an asymmetric private key may be protected to each principal's public key in a set of principals in order to enable granting access to a different protected object using a single opener. To add a user to the set of principals, an opener for the asymmetric private key is encrypted to that user's public key. To grant access to a protected object to the entire set of principals, an opener for the protected object is encrypted to the public key corresponding to the set of principal's private key.

Additional Exemplary Embodiments

In some embodiments, devices can store a private key and trusted public keys in a key enclave, where the private key does not leave key enclave. The key enclave can delegate private key operations to outside authorized parties.

In some embodiments, devices can evaluate trust of principals' public keys in a key enclave. A key enclave can delegate access to its mapping of identifiers (e.g. email and phone) to trusted public keys. A key enclave can determine trust based on configured policies and principals' witness statements.

In some embodiments, a mobile phone acts as key enclave. The mobile phone can be automatically awakened by running the key enclave as a background process. If the device is offline, off, or unreachable, a time-out can occur.

In some embodiments, a user's device can delegate from a secure enclave on mobile phone to a desktop application by scanning a QR code to establish a secure connection.

In some embodiments, a key enclave can be delegated to cloud instances. In some embodiments, the key enclave pairs with a cloud instance using QR code logic.

In some embodiments, a first key enclave may implement multi-party authorization, wherein the first key enclave and one or more second key enclaves approves a request by signing an object and/or performing a cryptographic operation with their respective private keys. In some embodiments, a delegated computer can request that a first key enclave present multiple signatures for a given request. The request may, for example, be for logging into a specific host. The first key enclave may communicate with the one or more second key enclaves to coordinate delivery of the requested digital signatures for the approval of the request. In some embodiments, the first key enclave and the second one or more key enclaves may deliver their signatures to the delegate computer directly, via one or more other devices, and/or via the first key enclave. In some embodiments, each key enclave may ask for approval from a principal associated with the key enclave.

In some embodiments, a key enclave displays the type of signature requested by a delegate when the key enclave requests permission from its user to process a signature request received from a delegate. In some embodiments, the type of signature requested is determined by the format of the object presented for signature by the delegate. In some embodiments, the type of signature requested is determined by a signature type identifier in the object presented for signature by the delegate. In some embodiments, the type of a signature restricts how the signature can be used. In some embodiments, only certain signature types are accepted for the authorization of a delegate to act on behalf of a principal to access remote resources. In some embodiments, the type of a signature can restrict a principal signature to a specific role. In some embodiments, the role can restrict the kinds of operations the delegate may do on behalf of the principal. In some embodiments, a secret key that is used to sign an object depends upon the type of signature request. In some embodiments, the secret key that is used to sign an object depends upon the role to be authorized for a delegate.

In some embodiments, devices can use witness statements with a Web-of-Trust PKI Service. This includes, for example, in person witnessing with key exchange via QR codes, among other methods. Devices can set policies for establishing trust—e.g., based on number, type, source, etc. of witness statements in a Web-of-Trust PKI.

In some embodiments, devices can perform delegation of private key operations and/or trusted mappings from a key enclave to another device. A key enclave and device can form a secure connection, the device can send requests to a key enclave, the key enclave can perform cryptographic operations within the key enclave, and can return operation outputs over the secure connection with the private key remaining within the key enclave. The key enclave can maintain control of what delegated operations it performs and can log what delegated operations it performs. The key enclave can revoke access by terminating the secure connection. The key enclave can reject a specific requested operation based upon policy specifications that control what operations a specific delegate can request.

In some embodiments, openers allow an encrypted key that decrypts an encrypted object to be created for a user, located using the user's public key and the protected object's hash (or initialization vector), and decrypted with the user's private key so that the user's device can decrypt the object. The object can be encrypted with a first key. The first key can then be encrypted with a user's public key to create an opener for that user. For example, a device can encrypt the first key with Alice's public key to create an opener for Alice. Alice's opener can then be published and indexed by a hash of a ciphertext computed by encrypting the object with the first key. When Alice receives the encrypted object, she can compute a hash of the encrypted object (or its initialization vector), use this value to find the list of openers for this encrypted object, use her public key hash to search for her opener, use her private key to decrypt the first key, and use the first key to decrypt the object.

In some embodiments, a Signature Service provides a new way of publishing signed objects. An object can be signed with a private key. The signature service can then create a record with a hash of the object, the public key of the signer, and the signed hash of the object. Users' devices receiving the object can then look up signatures of the object by searching for the record, which has the hash of the object, the corresponding public key and digital signature. The signature service can thus provide a database mapping hashes of objects to signatures of objects so that a user's device can query the database for signatures on arbitrary data.

In some embodiments, a Courier Service can provide secure connections in which the courier operator does not learn contents transmitted over the secure connections by end users where the users' devices encrypt and sign the content before sending the content over the courier service. Clients can be connected using a shared session nonce, providing global addressability. A communication channel can be established between multiple devices by only exchanging the session nonce (derived from session key).

In some embodiments, a Messaging Service allows users' devices to send encrypted messages that cannot be forged and can be decrypted with the recipient's private key and verified using the sender's public key.

In some embodiments, a Web of Trust PKI provides a way of establishing trust by evaluating witness statements vouching for the trustworthiness of a public key. This can solve the problem of needing an initial trust relationship to know that the person providing a public key is in fact who they say they are because one or more witness statements can be used to verify the identity.

In some embodiments, a revocation service can be used. A user's device can sign a revocation statement with a private key and store the signed revocation statement (e.g., in email or encrypted with a password). If a user loses a private key (e.g., cell phone with key enclave lost), then the user's device can publish the signed revocation statement (e.g., via email or by entering password with revocation service).

In some embodiments, a Hash-URL can be used. For example, a server can host a resource addressable by a URL containing its hash. E.g. the path to object could be server-.com/hash_of_object. A user's device can then visit the URL, compute a hash of the data, and compare with the hash portion of the URL to verify the integrity of the data. This can make the data self-authenticating.

In some embodiments, a ERS can provide a gateway where servers broadcast their current network address and learn of other servers in the same or other trusted organizations. This can map a full role DNS name to the latest network address of a server, satisfying browser TLS certificate verification. As new servers are added or existing servers change network locations, ERS can allow other servers to always reach them with their full role DNS name.

In some embodiments, Key enclave self-configuration can use ERS to automatically find and delegate to edge servers within the same organization.

In some embodiments, a mobile phone acts as key enclave. The mobile phone can be automatically awakened by running the key enclave as a background process. If the device is offline, off, or unreachable, a time-out can occur.

In some embodiments, a user's device can delegate from a secure enclave on mobile phone to a desktop application by scanning a QR code to establish a secure connection.

In some embodiments, door files can contain information to create a two-way secure connection to a remote machine—e.g., a verified public key for the remote machine. The door file can be encrypted and distributed and then opened with an Opener. This allows secure access to a remote machine to be granted by providing an opener to open the encrypted door file and allows those granted access to establish secure connections automatically verifying the remote machine's public key.

In some embodiments, a key enclave can be used to sign SSH session data after user approval, providing a mechanism for user authentication. Signing policies can permit a key enclave to automatically approve and sign requests within a time window or based upon other attributes of the request.

In some embodiments, a key enclave can check the public key or its hash presented by a remote SSH server that has been forwarded by a delegate computer and authenticate that the remote SSH server's public key is valid by comparing it with a list of trusted host public keys or trusted hashes.

In some embodiments, a key enclave can display a Git commit or tag object for signature after a Git commit or tag request at a delegate computer. If the user grants approval, the Git object is signed by a private key contained in the Key Enclave, and returned to the delegate computer where it is included in the stored data associated with the Git commit or tagging request.

These and other embodiments are described in further detail above.

COMPUTER PROGRAM LISTING APPENDIX

In accordance with some embodiments, one or more features described herein can be implemented on a computer with software written in source code. Exemplary source code describing and implementing features discussed herein is included in the Computer Program Listing Appendix. It will be apparent to one skilled in the art that the embodiments discussed herein may be implemented using the above disclosure, one or more portions of the exemplary source code included in the Computer Program Listing Appendix, and/or a combination of both. It additionally will be apparent that the exemplary source code submitted herein represents an exemplary embodiment to help illustrate the teachings of the disclosure and is not intended to be limiting. A person of skill in the art will appreciate that the exemplary source code in the Computer Program Listing Appendix is not required to practice the teachings disclosed herein and is included merely for illustrative purposes.

The invention claimed is:

1. An authentication method comprising:
- receiving a request for a digital signature of data from a delegate computer over a secure channel using cryptography to provide authentication, wherein the secure channel comprises at least one wireless communications link;
- displaying information derived from the data;
- prompting a user for approval of the request with information derived from the data;
- in response to receiving approval from the user, creating the digital signature of the data using one or more private keys stored in a key enclave; and
- sending the digital signature to the delegate computer over the secure channel.

2. The authentication method of claim 1, further comprising:
- reading a first key displayed on the delegate computer with a camera, wherein the first key is a public key;
- sending a second key to the delegate computer; and
- securing communication with the delegate computer using at least one of the first and second keys or one or more keys derived from the first and second keys.

3. The authentication method of claim 2, further comprising:
- receiving during a confirmation stage a message from the delegate computer secured using at least one of the first and second keys or one or more keys derived from the first and second keys; and
- confirming the secure channel in response to receiving the message from the delegate computer.

4. The authentication method of claim 1, further comprising:
- displaying a first key, wherein the first key is a public key;
- receiving a second key from the delegate computer; and
- securing communication with the delegate computer using at least one of the first and second keys or one or more keys derived from the first and second keys.

5. The authentication method of claim 4, further comprising:
- sending during a confirmation stage a message to the delegate computer secured using at least one of the first and second keys or one or more keys derived from the first and second keys.

6. The authentication method of claim 1, wherein the data is SSH session data.

7. The authentication method of claim 6, wherein:
- the receiving a request for the digital signature of data from the delegate computer comprises receiving from the delegate computer a signature request that contains a host signature of an SSH session identifier; and
- the sending the digital signature to the delegate computer comprises sending the digital signature to the delegate computer in response to successfully verifying the host signature; and
- the method further comprising:
- verifying that the host signature is a signature of the SSH session identifier, wherein the verifying comprises using at least one public key in a list of known host keys stored on at least one of the key enclave or a computer distinct from the key enclave and the delegate computer.

8. The authentication method of claim 1, wherein one or more approved signature requests are recorded in a log.

9. The authentication method of claim 1, wherein one or more approved signature requests are recorded in a log stored on the key enclave.

10. The authentication method of claim 1, wherein one or more approved signature requests are recorded in a log stored on a computer distinct from the key enclave and the delegate computer.

11. The authentication method of claim 1, wherein the data is a Git commit object.

12. The authentication method of claim 1, wherein the data is a Git tag object.

13. The authentication method of claim 1, further comprising:
- computing a hash of the data; and
- computing the digital signature using the hash.

14. The authentication method of claim 1, further comprising:
- receiving during a specified time interval a request for a second digital signature of second data from the delegate computer over the secure channel; and
- sending the second digital signature to the delegate computer over the secure channel without requiring approval from the user.

15. The authentication method of claim 1, further comprising connecting to the delegate computer using a routing service.

16. A verification method comprising:
- receiving a request from a delegate computer for verification of a digital signature over a secure channel using cryptography to provide authentication, wherein the secure channel comprises at least one wireless communications link;
- verifying the digital signature using at least one of one or more public keys stored in a key enclave or data derived from the one or more public keys stored in the key enclave; and
- sending the delegate computer a response to the request for verification of the digital signature, wherein the one or more public keys are stored with an associated level of trust and the response comprises the level of trust.

17. The verification method of claim 16, further comprising:
- reading a first key displayed on the delegate computer with a camera, wherein the first key is a public key;
- sending a second key to the delegate computer; and
- securing communication with the delegate computer using at least one of the first and second keys or one or more keys derived from the first and second keys.

18. The verification method of claim 17, further comprising:
- receiving during a confirmation stage a message from the delegate computer secured using at least one of the first and second keys or one or more keys derived from the first and second keys; and confirming the secure channel in response to receiving the message from the delegate computer.

19. The verification method of claim 16, further comprising connecting to the delegate computer using a routing service.

20. A verification method comprising:

receiving a request from a delegate computer for at least one of one or more public keys or data derived from the one or more public keys over a secure channel using cryptography to provide authentication, wherein the secure channel comprises at least one wireless communications link and the one or more public keys are stored in a key enclave;

sending at least one of one or more public keys or data derived from the one or more public keys to the delegate computer;

wherein the one or more public keys are stored with an associated level of trust; and sending the at least one of one or more public keys or data derived from the one or more public keys to the delegate computer comprises sending the level of trust.

21. The verification method of claim 20, further comprising connecting to the delegate computer using a routing service.

* * * * *